(12) United States Patent
Weagle

(10) Patent No.: US 7,661,503 B2
(45) Date of Patent: Feb. 16, 2010

(54) VEHICLE SUSPENSION SYSTEM FOR STABLE SQUAT MAGNITUDE RESPONSES

(75) Inventor: David Weagle, Edgartown, MA (US)

(73) Assignee: Orion Dynamics, Inc., Edgartown, MA (US)

( * ) Notice: Subject to any disclaimer, the term of this patent is extended or adjusted under 35 U.S.C. 154(b) by 342 days.

(21) Appl. No.: 11/102,218

(22) Filed: Apr. 7, 2005

(65) Prior Publication Data

US 2006/0225942 A1    Oct. 12, 2006

(51) Int. Cl.
*B60K 25/00* (2006.01)

(52) U.S. Cl. .................. 180/226; 280/283; 280/284; 280/286

(58) Field of Classification Search .................. 180/226; 280/277, 283, 284, 285, 286
See application file for complete search history.

(56) References Cited

U.S. PATENT DOCUMENTS

| | | | |
|---|---|---|---|
| 4,789,174 A | 12/1988 | Lawwill | |
| 5,121,937 A | 6/1992 | Lawwill | |
| 5,217,241 A | 6/1993 | Girvin | |
| 5,244,224 A | 9/1993 | Busby | |
| 5,306,036 A | 4/1994 | Busby | |
| 5,409,249 A | 4/1995 | Busby | |
| 5,441,292 A | 8/1995 | Busby | |
| 5,474,318 A | 12/1995 | Castellano | |
| 5,509,679 A | 4/1996 | Leitner | |
| 5,553,881 A | 9/1996 | Klassen et al. | |
| 5,628,524 A | 5/1997 | Klassen et al. | |
| 5,671,936 A | 9/1997 | Turner | |
| 5,678,837 A | 10/1997 | Leitner | |
| 5,791,674 A | 8/1998 | D'Aluisio et al. | |
| 5,899,480 A | 5/1999 | Leitner | |
| 6,102,421 A | 8/2000 | Lawwill et al. | |
| 6,199,886 B1 | 3/2001 | Guenther | |
| 6,203,042 B1 | 3/2001 | Wilcox | |
| 6,206,397 B1 | 3/2001 | Klassen et al. | |
| 6,237,706 B1 | 5/2001 | Karpik et al. | |
| 6,263,994 B1 | 7/2001 | Eitel | |
| 6,378,885 B1 | 4/2002 | Ellsworth et al. | |
| 6,450,521 B1 | 9/2002 | Turner | |
| 6,471,230 B2 | 10/2002 | Ellsworth et al. | |
| 6,592,108 B1 | 7/2003 | Luede | |
| 6,595,538 B2 | 7/2003 | Ellsworth et al. | |
| 6,698,780 B2 | 3/2004 | Miyoshi | |
| 6,834,877 B2 * | 12/2004 | Lesage et al. | ............... 280/284 |
| 6,843,494 B2 | 1/2005 | Lam | |
| 6,854,753 B2 | 2/2005 | Turner | |
| 6,969,081 B2 | 11/2005 | Whyte | |
| 2001/0024024 A1 | 9/2001 | Klassen et al. | |
| 2003/0038450 A1 | 2/2003 | Lam | |
| 2003/0090082 A1 | 5/2003 | Ellsworth et al. | |
| 2005/0057018 A1 | 3/2005 | Saiki | |

FOREIGN PATENT DOCUMENTS

| | | |
|---|---|---|
| FR | 2 774 966 | 8/1999 |
| GB | 1 498 168 | 1/1978 |
| WO | WO03/018392 | 3/2003 |
| WO | WO03/037701 | 5/2003 |

* cited by examiner

*Primary Examiner*—Ruth Ilan
(74) *Attorney, Agent, or Firm*—Stahl Law Firm

(57) ABSTRACT

A wheel suspension system having under powered acceleration a stable squat magnitude response.

17 Claims, 56 Drawing Sheets

VEHICLE SUSPENSION SYSTEM FOR STABLE SQUAT MAGNITUDE RESPONSES

BACKGROUND

This invention relates to suspension systems capable of maintaining a stable squat response magnitude under powered vehicle acceleration.

Automobiles, bicycles, motorcycles, all terrain vehicles, and other wheel driven vehicles are used for various purposes, including transportation and leisure. These vehicles are designed to use a power source to drive, through a power transmission system, a wheel or wheels, which transfers rotary motion to the ground via tractive force between a wheel or wheels and the ground. Vehicles are also used to traverse even terrain like paved streets, and uneven terrain like off-road dirt trails. Off road trails are generally bumpier and allow for less wheel traction than paved roads. A bumpier terrain is best navigated with a vehicle that has a suspension system. A suspension system in a vehicle is aimed to provide a smoother ride for an operator or rider, and increase wheel traction over varied terrain. Vehicle suspension systems may be employed on forward and on rearward wheels.

One undesirable effect of suspension systems is the loss of energy in the way of suspension compression or extension during powered acceleration. Such energy loss is particularly notable in vehicles that are driven by low energy power sources, for example, bicycles and solar vehicles. For example, the average rider of a bicycle can exert only a limited amount of power or energy for a short period of time and an even lesser amount for an extended period of time. Therefore, even a very small power loss can have a significant effect on rider performance and comfort. Common vehicle tires require high suspension stiffness for optimal traction and bump absorption, and common human physiology requires low suspension stiffness for bearable human comfort levels. Because of the differing requirements for operator comfort, tire traction, and bump compliance, other undesirable effects of suspension systems can include loss of vehicle operator comfort due to a suspension being too stiff for comfort, or loss of traction and bump absorption due to a suspension being too soft for traction and bump absorption. Suspension travel is the distance a suspended wheel travels when the suspension is moved from a fully extended state to a fully compressed state. Suspension systems can exhibit wide variations in squat magnitude as a suspension is compressed. Generally, due to suspension kinematics, the further a typical suspension is compressed, the wider the variation in squat magnitude becomes over the duration of the suspension compression from a fully extended to a fully compressed state. This variation in squat magnitude means that the suspension cannot operate at a point of peak efficiency, or lowest amount of suspension movement, over its entire travel. This variation is squat can further compress or extend the suspension due to acceleration forces at different points in the suspension travel. A suspension must be configured to attain ideal bump apportion, comfort, or performance efficiency traits at a finite point in its suspension travel distance. All other points in the suspension travel distance will exhibit some performance traits that may be undesirable to the vehicle operator. In bicycles, suspension travel has been increased for many designs and with these increases in suspension travel; the aforementioned energy loss has become even more apparent to riders. But even for a vehicle with a high power energy source, any loss in energy reduces the vehicle's efficiency, for example its fuel efficiency. Where vehicles are used in a manner that requires frequent accelerations and deceleration (or positive and negative accelerations), the safety and comfort of the vehicle operator and the efficiency of the vehicle are particularly affected by excess chassis movement resulting from the vehicles geometry, including the geometry and design of its suspension systems.

A suspension system for a vehicle should be designed to minimize the variance in suspension movement due to acceleration forces, and to minimize energy loss, comfort loss, and loss of ability to absorb bumps. Ultimately, the environmental impact of the vehicle is reduced. The need for a suspension system that can better preserve a vehicles efficiency and energy has therefore become more pressing. The present invention provides suspension system designs for vehicles that reduce these energy losses and additionally provided improved operator comfort or improved tire traction.

SUMMARY OF THE INVENTION

Figure 1A:
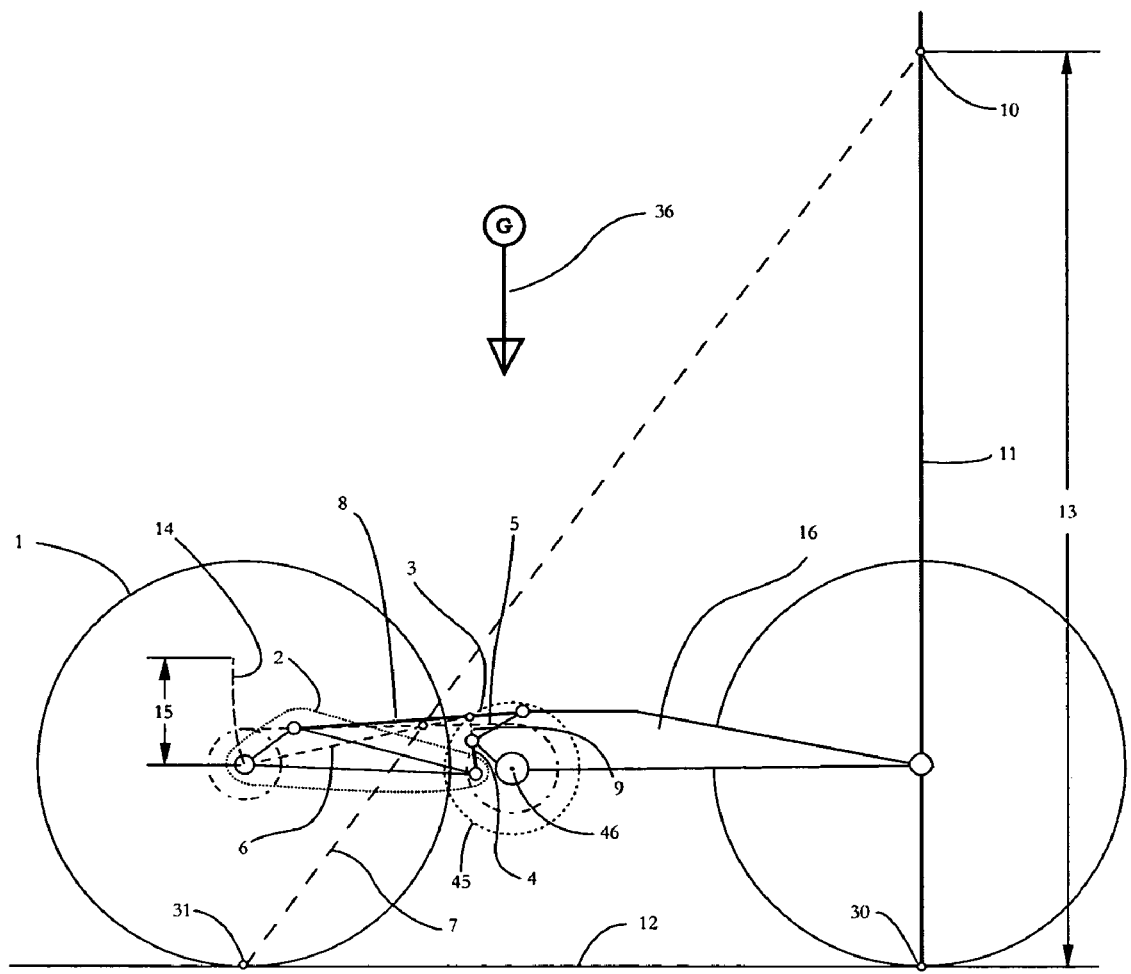
FIG. 1a is a side view of a chain driven vehicle using a driven wheel suspension system that achieves a stable squat magnitude curve according to certain embodiments of the current invention. The vehicle is shown with the driven wheel suspension system in an uncompressed state.

The current invention relates to new suspension systems for vehicles, for example, bicycles, motorcycles, cars, SUVs, trucks, two wheel vehicles, four wheel vehicles, front wheel suspension vehicles, driven wheel suspension vehicles, and any other kind of vehicle with a suspension system. In certain embodiments of the invention, a suspension system of the invention is capable of facilitating a stable squat magnitude response. In certain preferred embodiments, a suspension system of the invention lowers the energy loss during vehicle acceleration. This energy loss can be a result of unwanted suspension extension or compression due to internal chassis forces which are governed by the vehicle suspension kinematics, powertrain layout, vehicle layout, and orientation. In certain preferred embodiments, a suspension system of the invention is capable of lowering energy loss and/or increase vehicle operator comfort resulting from squat by producing a stable anti-squat magnitude response. An anti-squat magnitude response of a suspension system of the invention, in certain embodiments, varies along suspension travel of the vehicle. In certain embodiments of the invention, a wheel suspension system comprises a squat magnitude curve with said squat magnitude curve having a stable rate of squat magnitude as the suspension system moves from a beginning point in the wheel travel to an ending point in the wheel travel.

In certain embodiments of the invention, a compressible wheel suspension system comprises a squat magnitude curve having a stable squat magnitude and with said squat magnitude having a variation varying as the suspension system moves from a beginning point in the wheel travel towards an ending point in the wheel travel increase.

In certain embodiments of the invention, a compressible wheel suspension system comprises a squat magnitude curve with said squat magnitude curve having a stable squat magnitude and with said squat magnitude increasing and decreasing as the suspension system moves from a beginning point in the wheel travel towards an ending point in the wheel travel increase.

In certain embodiments of the invention, a compressible wheel suspension system comprises a squat magnitude curve with said squat magnitude curve having a stable squat magnitude and with said squat magnitude decreasing and increasing as the suspension system moves from a beginning point in the wheel travel towards an ending point in the wheel travel increase.

Certain embodiments of the invention comprise a wheel suspension design that uses a tuned squat magnitude response to reduce powered acceleration induced suspension movement at tactical points during the driven wheel suspension travel. A vehicle designed to use a preferred embodiment of the invention can accelerate under power with a lower amount of energy loss and a more stable vehicle chassis than known systems throughout wheel suspension travel distance.

The present invention provides suspension system designs for vehicles that reduce energy loss during powered acceleration. The present invention provides suspension system designs for vehicles that reduce excess suspension movement and improve operator comfort during powered acceleration.

In certain embodiments of the invention, a wheel suspension system comprises a wheel connected to a wheel carrier link and said wheel carrier link connected to spring damper means; and isolating said wheel from a frame structure with the wheel suspension system having a squat magnitude curve with said squat magnitude curve having a stable rate of squat magnitude as the suspension system moves from a beginning point in the wheel travel to an ending point in the wheel travel.

In certain embodiments of the invention, a compressible wheel suspension system comprises a wheel connected to a wheel carrier link and said wheel carrier link connected to spring damper means; and isolating said wheel from a frame structure with the wheel suspension system having a squat magnitude curve with said squat magnitude curve having a stable squat magnitude and with said squat magnitude having a variation varying as the suspension system moves from a beginning point in the wheel travel towards an ending point in the wheel travel increase.

In certain embodiments of the invention, a compressible wheel suspension system comprises a wheel connected to a wheel carrier link and said wheel carrier link connected to spring damper means; and isolating said wheel from a frame structure with the wheel suspension system having a squat magnitude curve with said squat magnitude curve having a stable squat magnitude and with said squat magnitude increasing and decreasing as the suspension system moves from a beginning point in the wheel travel towards an ending point in the wheel travel increase.

In certain embodiments of the invention, a compressible wheel suspension system comprises a wheel connected to a wheel carrier link and said wheel carrier link connected to spring damper means; and isolating said wheel from a frame structure with the wheel suspension system having a squat magnitude curve with said squat magnitude curve having a stable squat magnitude and with said squat magnitude decreasing and increasing as the suspension system moves from a beginning point in the wheel travel towards an ending point in the wheel travel increase.

In certain embodiments of the invention, a compressible wheel suspension system comprises a shaft driven wheel connected to a wheel carrier link and said wheel carrier link connected to a first link and a second link; with said first and second links rotating together in the same direction, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in an upwards direction as the suspension is compressed.

In certain embodiments of the invention, a compressible wheel suspension system comprises a shaft driven wheel connected to a wheel carrier link and said wheel carrier link connected to a first link and a second link; with said first and second links rotating together in opposite directions, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in an upwards direction as the suspension is compressed.

In certain embodiments of the invention, a compressible wheel suspension system comprises a spindle driven wheel connected to a wheel carrier link and said wheel carrier link connected to a first link and a second link; with said first and second links rotating together in the same direction, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in an upwards direction as the suspension is compressed.

In certain embodiments of the invention, a compressible wheel suspension system comprises a spindle driven wheel connected to a wheel carrier link and said wheel carrier link connected to a first link and a second link; with said first and second links rotating together in opposite directions, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in an upwards direction as the suspension is compressed.

In certain embodiments of the invention, a compressible wheel suspension system comprises a shaft driven wheel connected to a wheel carrier link and said wheel carrier link connected to a first link and a second link; with said first and second links rotating together in the same direction, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in a direction horizontally closer to the driven wheel rotation axis as the suspension is compressed.

In certain embodiments of the invention, a compressible wheel suspension system comprises a shaft driven wheel connected to a wheel carrier link and said wheel carrier link connected to a first link and a second link; with said first and second links rotating together in opposite directions, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in a direction horizontally closer to the driven wheel rotation axis as the suspension is compressed.

In certain embodiments of the invention, a compressible wheel suspension system comprises a spindle driven wheel connected to a wheel carrier link and said wheel carrier link connected to a first link and a second link; with said first and second links rotating together in the same direction, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in a direction horizontally closer to the driven wheel rotation axis direction as the suspension is compressed.

In certain embodiments of the invention, a compressible wheel suspension system comprises a spindle driven wheel connected to a wheel carrier link and said wheel carrier link connected to a first link and a second link; with said first and second links rotating together in opposite directions, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in a direction horizontally closer to the driven wheel rotation axis as the suspension is compressed.

In certain embodiments of the invention, a compressible wheel suspension system comprises a shaft driven wheel connected to a wheel carrier link and said wheel carrier link connected to a first link and a second link; with said first and second links rotating together in the same direction, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in a direction upwards in relation to gravity and horizontally closer to the driven wheel rotation axis as the suspension is compressed.

In certain embodiments of the invention, a compressible wheel suspension system comprises a shaft driven wheel connected to a wheel carrier link and said wheel carrier link connected to a first link and a second link; with said first and second links rotating together in opposite directions, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in a direction upwards in relation to gravity and horizontally closer to the driven wheel rotation axis as the suspension is compressed.

In certain embodiments of the invention, a compressible wheel suspension system comprises a spindle driven wheel connected to a wheel carrier link and said wheel carrier link connected to a first link and a second link; with said first and second links rotating together in the same direction, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in a direction upwards in relation to gravity and horizontally closer to the driven wheel rotation axis direction as the suspension is compressed.

In certain embodiments of the invention, a compressible wheel suspension system comprises a spindle driven wheel connected to a wheel carrier link and said wheel carrier link connected to a first link and a second link; with said first and second links rotating together in opposite directions, and said first and second links connecting said wheel carrier link to a frame structure, isolating said wheel from the frame structure. Said first link and said second link having projected link force lines and said first link projected force line intersecting said second link projected force line to form an instant force center, with said instant force center moving in a direction upwards in relation to gravity and horizontally closer to the driven wheel rotation axis as the suspension is compressed.

In certain embodiments of the invention, a compressible wheel suspension system comprises a chain driven wheel connected to a wheel carrier link and said wheel carrier link connected to a first link and a second link; with said first and second links rotating together in the same direction, and said first and second links connecting said wheel carrier link to a frame structure, isolating said wheel from the frame structure. Said chain driven wheel is connected to a driven cog, which is driven by a driven chain, which is driven by a driving cog. All driving and driven cogs have measurable pitch diameters. Said first link and said second link having projected link force lines and said first link projected force line intersecting said second link projected force line to form an instant force center, with said instant force center transcribing an instant force center path, and with said instant force center path having a variable or constant instant force center path focus, and with said instant force center path focus lying within the area inside the pitch diameter of the driving cog for part or all of the suspension travel.

In certain embodiments of the invention, a compressible wheel suspension system comprises a chain driven wheel connected to a wheel carrier link and said wheel carrier link connected to a first link and a second link; with said first and second links rotating together in opposite directions, and said first and second links connecting said wheel carrier link to a frame structure, isolating said wheel from the frame structure. Said chain driven wheel is connected to a driven cog, which is driven by a driven chain, which is driven by a driving cog. All driving and driven cogs have measurable pitch diameters. Said first link and said second link having projected link force lines and said first link projected force line intersecting said second link projected force line to form an instant force center, with said instant force center transcribing an instant force center path, and with said instant force center path having a variable or constant instant force center path focus, and with said instant force center path focus lying within the area inside the pitch diameter of the driving cog for part or all of the suspension travel.

In certain embodiments of the invention, a compressible wheel suspension system comprises a chain driven wheel connected to a wheel carrier link and said wheel carrier link connected to a first link and a second link; with said first and second links rotating together in the same direction, and said first and second links connecting said wheel carrier link to a frame structure, isolating said wheel from the frame structure. Said chain driven wheel is connected to a driven cog, which is driven by a driven chain, which is driven by a driving cog. Said driven chain has a chain force line, which is altered by a driven idler cog with a measurable pitch diameter. Said first link and said second link having projected link force lines and said first link projected force line intersecting said second link projected force line to form an instant force center, with said instant force center transcribing an instant force center path, and with said instant force center path having a variable or constant instant force center path focus, and with said instant force center path focus lying within the area inside the pitch diameter of the driven idler cog for part or all of the suspension travel.

In certain embodiments of the invention, a compressible wheel suspension system comprises a chain driven wheel connected to a wheel carrier link and said wheel carrier link connected to a first link and a second link; with said first and second links rotating together in opposite directions, and said first and second links connecting said wheel carrier link to a frame structure, isolating said wheel from the frame structure. Said chain driven wheel is connected to a driven cog, which is driven by a driven chain, which is driven by a driving cog. Said driven chain has a chain force line, which is altered by a driven idler cog with a measurable pitch diameter. Said first link and said second link having projected link force lines and said first link projected force line intersecting said second link projected force line to form an instant force center, with said instant force center transcribing an instant force center path, and with said instant force center path having a variable or constant instant force center path focus, and with said instant force center path focus lying within the area inside the pitch diameter of the driven idler cog for part or all of the suspension travel.

DETAILED DESCRIPTION

Vehicles must be accelerated against their environment to propel an operator or rider across terrain. In order to accelerate these vehicles, a certain amount of energy must be exerted and transformed into rotary motion at a wheel or plurality of wheels. Suspended wheeled vehicle energy conversion types are widely varied. Some vehicles like bicycles, tricycles, and pedal cars use converted human energy as the drive unit. Other vehicles use electric motors or combustion engines, as their drive unit. These electric motors and combustion engines extract rotary motion through the controlled release of chemically stored energy.

Almost all vehicle types use some sort of rotary motion transmission system to transfer rotational force from a drive unit to a wheel or plurality of wheels. A simple bicycle or motorcycle or all terrain vehicle uses a chain or belt to transfer power from a drive unit to a wheel. These chain or belt drive transmissions typically use one sprocket in the front which is coupled to a drive system and one sprocket in the rear which is coupled to a wheel.

More complex bicycles, motorcycles, all terrain vehicles, and automobiles use a shaft drive system to transfer power from a drive system to a driven wheel or wheels. These shaft drive systems transfer power through a rotating shaft that is usually reasonably perpendicular to the driven wheel spinning axis, with power transferred to the driven wheel via a bevel, spiral bevel, hypoid, worm gear drivetrain, or some other means. These single sprocket chain and belt, and shaft driven vehicles can use a direct driven single speed arrangement, where drive unit output shaft speed and torque is transferred to the driven wheel at a constant unchanging ratio. These single sprocket chain and belt, and shaft driven vehicles can also use a commonly found multi speed arrangement, where drive unit output shaft speed and torque is transferred to the driven wheel at a variable ratio through operator selected or automatically selected ratio changing mechanisms.

A bicycle with a more advanced design includes gear changing systems that have clusters of selectable front chainrings and rear sprockets. These gear changing systems give the bicycle rider a selectable mechanical advantage for use during powered acceleration. The mechanical advantage selection, allows a rider spinning a front sprocket cluster via crank arms, to attain lower revolution speed and higher torque values, or conversely, higher revolution speed and lower torque values at a driven wheel.

The current invention, in certain embodiments, is directed at suspension systems that can maintain low energy loss under powered acceleration of the vehicle, for example, a bicycle, a motorcycle, a car, an SUV, a truck, or any other kind of vehicle. Suspension systems of the current invention are useful for a large variety of vehicles, including, but not limited to, human powered vehicles, off road use vehicles with long displacement suspension, high efficiency road going vehicles, and other vehicles.

A vehicle suspension system isolates a vehicle chassis from forces imparted on the vehicle when traversing terrain by allowing the vehicle's ground contact points to move away from impacts at the terrain level and in relation to the vehicle chassis by a compressible suspension movement. The compressible suspension movement that isolates a chassis from these impacts is called suspension displacement or suspension travel. Compressible suspension travel has a beginning point where the suspension is in a completely uncompressed state, and an ending point of displacement, where the suspension is in a completely compressed state. Suspension travel displacement is measured in a direction parallel to and against gravity when the vehicle is on level ground with the suspension fully extended. This measurement direction is always measured first with the vehicle on level ground with the suspension fully extended, and remains constant to the vehicle chassis when measuring suspension travel under circumstances where the vehicle is not placed on level ground or when suspension is compressed. In certain preferred embodiments, a suspension system of the invention uses a tuned squat magnitude curve to provide an amount of squat closer to or higher in the range of the squat condition known as anti squat through the duration of a suspension travel displacement. As a suspension system of the invention is compressed, a damper unit is compressed. Throughout this entire disclosure, a damper unit may be discussed using the example of a spring or spring damper, however, it is understood that any type of damper unit may be employed under the various embodiments of this invention and that a spring or spring damper is merely a variation of a damper unit. A suspended wheel has a compressible wheel suspension travel distance that features a beginning travel point where the suspension is completely uncompressed to a point where no further suspension extension can take place, and an end travel point where a suspension is completely compressed to a point where no further suspension compression can take place. Due to the connection between the spring damper unit, and the rear wheel through suspension components, as the suspended wheel moves through its axle path, spring force at the wheel rises. At the beginning of the wheel suspension travel distance, when the suspension is in a completely uncompressed state, the spring is in a state of least compression, and the suspension is easily compressed. As this spring or damper unit is compressed, the force output from the spring damper unit rises.

The Figures in this disclosure use the following numbers and terms; driven wheel (1); wheel carrier link (2); first carrier manipulation link (3); second carrier; manipulation link (4); chain force vector (5); driving force vector (6); squat force vector (7); first carrier manipulation link force vector (8); second carrier manipulation link force vector (9); squat definition point (10); squat layout line (11); lower squat measurement definition line (12); measured squat distance (13); driven wheel axle path (14); driven wheel suspension travel distance (15); vehicle chassis (16); stable squat magnitude curve (17); squat magnitude curve upper bound (18); squat magnitude curve lower bound (19); first link fixed pivot (20); second link fixed pivot (21); first link floating pivot (22); second link floating pivot (23); instant force center (24); driven wheel rotation axis (25); chain force vector and driving force vector intersection point (26); driving cog (27); driven cog (28); driving cog rotation axis (29); center of the forward wheel tire to ground contact patch (30); center of the driven wheel tire to ground contact patch (31); vehicle center of sprung mass (32); 200 percent squat point (33); 200 percent measurement value (34); forward wheel (35); direction of gravity (36); squat magnitude definition point (37); squat magnitude (38); center of mass intersection vector (39); squat magnitude definition vector (40); percent squat magnitude variation (41); first squat magnitude curve slope (42); first squat magnitude curve slope (42); second squat magnitude curve slope (43); third squat magnitude curve slope (44); instant force center path (45); instant force center path focus (46); pitch diameter (47); driven idler cog (48); driven idler cog rotation axis (49); spring damper unit (50); first carrier manipulation track (51); second carrier manipulation track (52); first carrier manipulation slider (53); second carrier manipulation slider (54); first carrier manipulation slider force vector (55); second carrier manipulation slider force vector (56); first carrier manipulation slider force vector uncompressed (57); second carrier manipulation slider force vector uncompressed (58); first carrier manipulation slider force vector compressed (59); second carrier manipulation slider force vector compressed (60); first carrier manipulation link force vector uncompressed (61); second carrier manipulation link force vector uncompressed (62); first carrier manipulation link force vector compressed (63); second carrier manipulation link force vector compressed (64); instant force center position uncompressed (65); instant force center position compressed (66); instant force center upward movement (67); instant force center rearward movement (68); first carrier manipulation slider pivot (69); second carrier manipulation slider pivot (70)

FIG. 1*a* shows certain embodiments of the invention relating to chain driven vehicles and it presents a graphical method useful to attain a squat point measurement, and a graphical method to attain suspension geometry kinematical layout from an existing desired measured squat point. Shown in FIG. 1*a* are the following: driven wheel (1); wheel carrier link (2); first carrier manipulation link (3); second carrier manipulation link (4); chain force vector (5); driving force vector (6); squat force vector (7); first carrier manipulation link force vector (8); second carrier manipulation link force vector (9); squat definition point (10); squat layout line (11); lower squat measurement definition line (12); measured squat distance (13); driven wheel axle path (14); driven wheel suspension travel distance (15); vehicle chassis (16); center of the forward wheel tire to ground contact patch (30); center of the driven wheel tire to ground contact patch (31); direction of gravity (36).

FIG. 1*a* exemplifies that as the driven wheel 1 suspension system is completely uncompressed in its driven wheel suspension travel distance 15; its squat force vector 7 is shown in relation to the vehicle chassis 16. The squat force vector's 7 measured squat distance 13 which is measured as the perpendicular distance between the lower squat measurement definition line 12 and the squat definition point 10, is also shown in FIG. 1*a*. The squat measurement definition line 12 begins at the center of the driven wheel tire to ground contact patch 30, and is plotted parallel to and against the direction of gravity 36, terminating at a further point. As the suspension system is compressed through its driven wheel suspension travel distance 15, change in measured squat distance 13 over the driven wheel suspension travel distance 15 is used to create a squat magnitude curve 17.

Figure 1B:
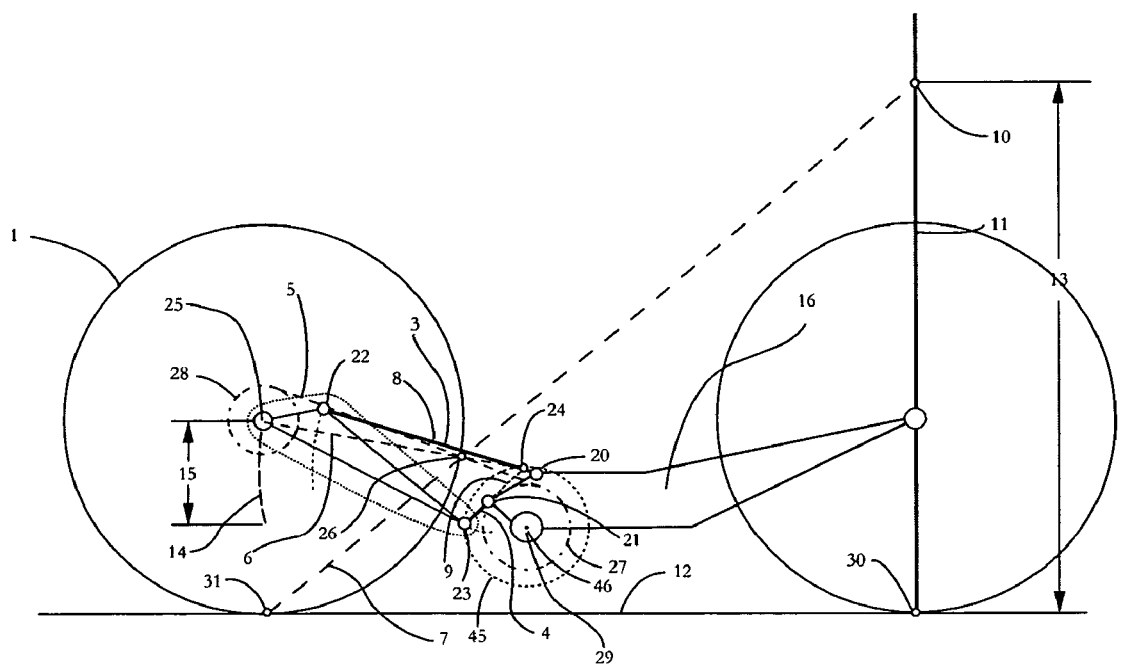
FIG. 1b is a side view of a chain driven vehicle as shown in FIG. 1a with the driven wheel suspension system in a completely compressed state.

FIG. 1*b* shows a side view of a chain driven vehicle as shown in FIG. 1*a* with the driven wheel suspension system in a completely compressed state. Certain embodiments are further exemplified, for example, vectors useful to a graphical method to attain a squat point measurement are shown. Also exemplified is a graphical method useful to attain suspension geometry kinematical layout from an existing desired measured squat point. Shown in FIG. 1*b* in addition to what is presented in FIG. 1*a*, are the following: first link fixed pivot (20); second link fixed pivot (21); first link floating pivot (22); second link floating pivot (23); instant force center (24); driven wheel rotation axis (25); chain force vector and driving force vector intersection point (26); driving cog (27); driven cog (28); driving cog rotation axis (29).

Figure 9:
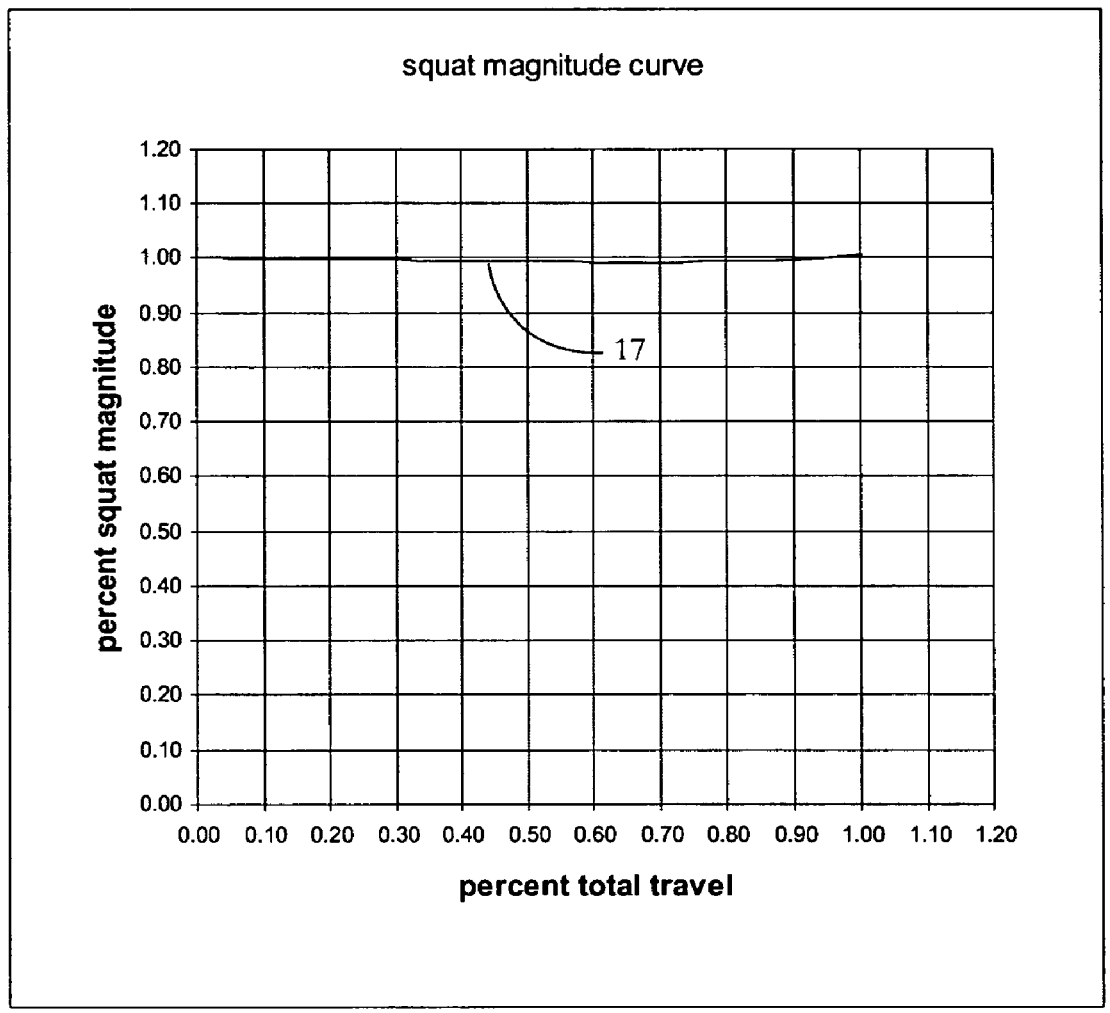
FIG. 9 shows a squat magnitude curve for suspension systems according to certain embodiments of the invention graphed on a squat magnitude curve graph as disclosed herein. This curve is produced by suspension kinematical geometry as shown in FIGS. 1a, 1b, 1c, and 1d.
Figure 10:
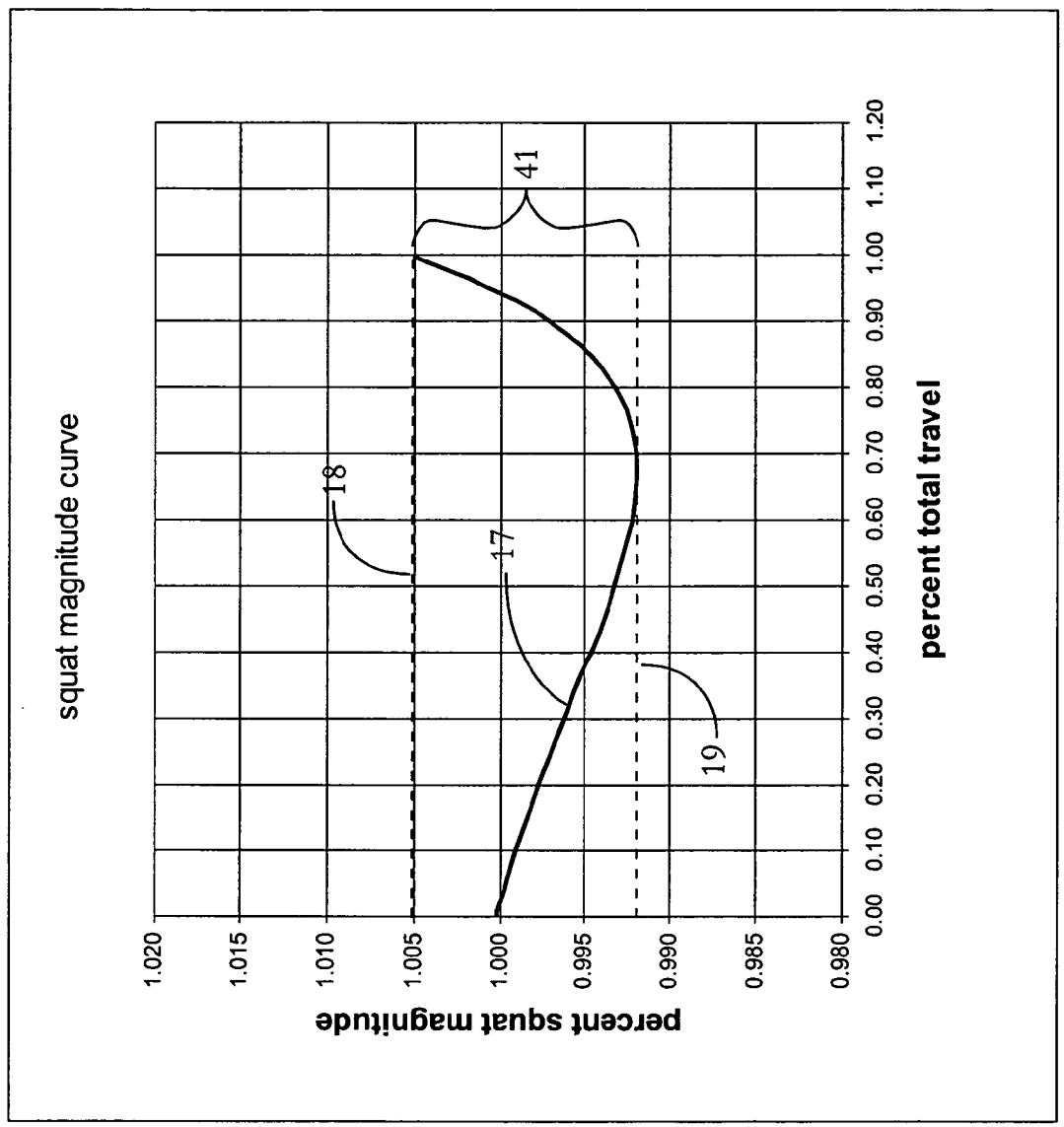
FIG. 10 shows the squat magnitude curve shown in FIG. 9 for suspension systems according to certain embodiments of the invention as graphed on a squat magnitude curve graph as disclosed herein. The curve shown here results from the curve shown in FIG. 9 by changing the scale of the vertical y-axis while maintaining the scale of the horizontal x-axis. This curve is produced by suspension kinematical geometry as shown in FIGS. 1a, 1b, 1c, and 1d and shows upper and lower bounds for determining a percent squat magnitude variation.

FIG. 1*b* exemplifies that as the driven wheel 1 suspension system is completely compressed through its driven wheel suspension travel distance 15, its squat force vector 7 moves in relation to the vehicle chassis 16. The squat force vector's 7 measured squat distance 13, which is measured as the perpendicular distance between the lower squat measurement definition line 12 and the squat definition point 10, decreases in relation to the measured squat distance 13 shown in FIG. 1a. This change in measured squat distance 13 over the driven wheel suspension travel distance 15, in certain preferred embodiments, is used to create a squat magnitude curve 17. FIG. 1b shows the graphical method used to obtain a squat magnitude curve 17 from chain driven vehicle geometry, or chain driven vehicle geometry from a squat magnitude curve 17. In the vehicle shown in FIG. 1b, a driven wheel 1 is attached to a wheel carrier link2, which pivots at one end of an first carrier manipulation link 3. The first carrier manipulation link 3 is pivotally attached to the vehicle chassis 16 at the first link fixed pivot 20. A second carrier manipulation link 4 is also attached to the wheel carrier link2. This second carrier manipulation link 4 is attached to the vehicle chassis 16 at a second link fixed pivot 21. An first carrier manipulation link force vector 8 is graphed coincident to the wheel carrier link2 upper pivot and the first link fixed pivot 20. The first carrier manipulation link force vector 8 is graphed so that it intersects a second carrier manipulation link force vector 9, which is graphed coincident to the wheel carrier link2 lower pivot and the second link fixed pivot 21. The intersection point of the first carrier manipulation link force vector 8 and the second carrier manipulation link force vector 9 is called the instant force center 24. A driving force vector 6 is graphed beginning at the driven wheel rotation axis 25, and passes through the instant force center 24. A chain force vector 5 is drawn tangent to the tops of the driving cog 27 and driven cog 28, and intersects the driving force vector 6 at a chain force vector and driving force vector intersection point 26. The squat force vector 7 is graphed from a beginning point at the center of the driven wheel tire to ground contact patch 31, and passes through the chain force vector and driving force vector intersection point 26, before it terminates on a squat layout line 11. The intersection of the squat force vector 7 and the squat layout line is called the squat layout point 10. The squat layout line 11 is graphed at a perpendicular angle to gravitational force. A lower squat measurement definition line 12 is graphed beginning at the center of the driven wheel tire to ground contact patch 31 and terminating perpendicular and coincident to the squat layout line 11. The perpendicular measurement from the lower squat measurement definition line 12 to the squat layout point 10 is called the measured squat distance 13. This measured squat distance 13 changes as driven wheel suspension travel distance 15 compresses, and is used to create a squat magnitude curve 17 in a squat magnitude curve graph as shown in FIG. 9 and FIG. 10.

Figure 1C:
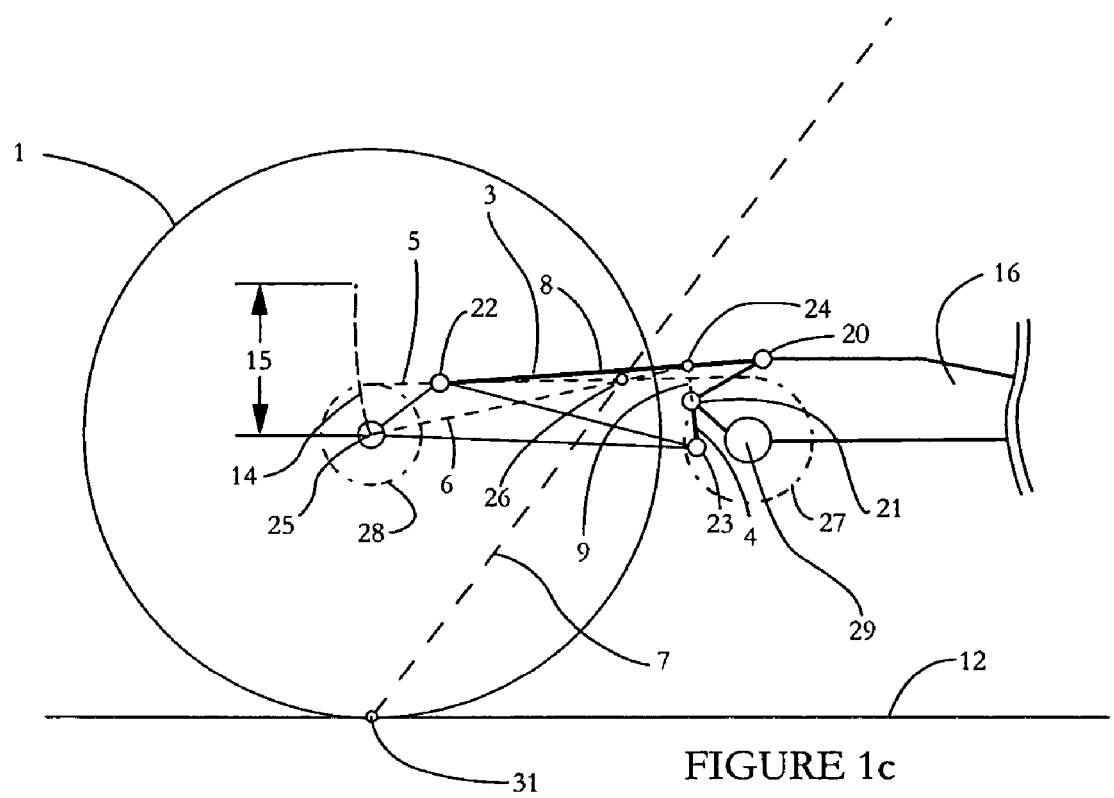
FIG. 1c is an enlarged section of the side view of the chain driven vehicle shown in FIGS. 1a and 1b with the driven wheel suspension system in a completely uncompressed state.

FIG. 1c shows an enlarged section of the side view of the chain driven vehicle shown in FIGS. 1a and 1b with the driven wheel suspension system in a completely uncompressed state.

Figure 1D:
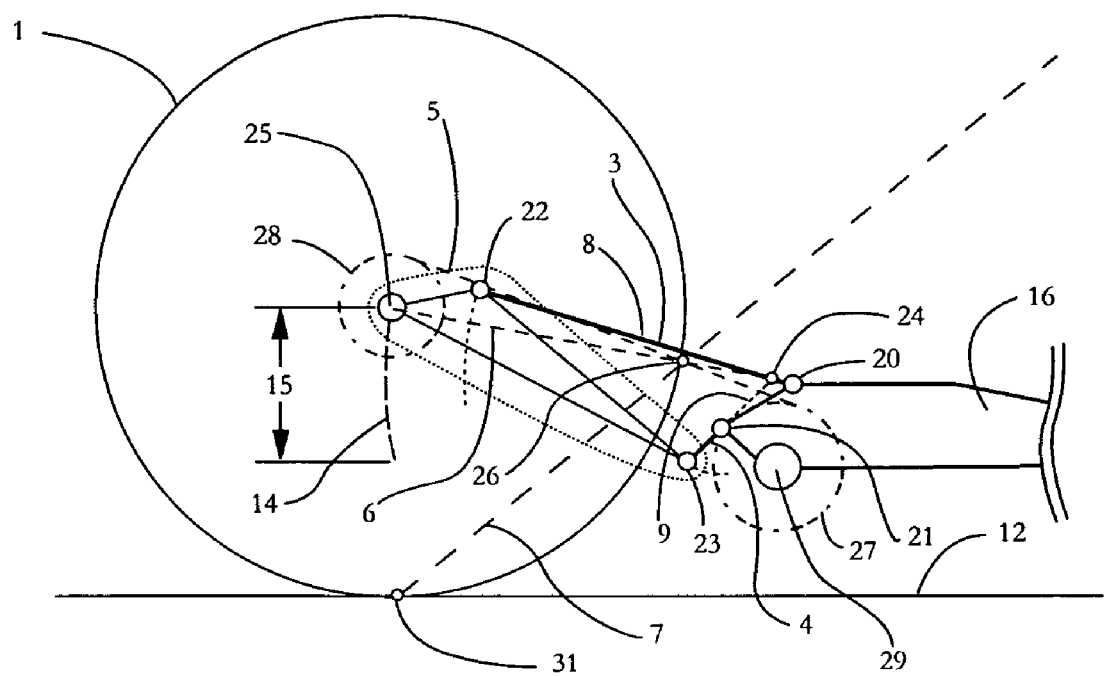
FIG. 1d is an enlarged section of the side view of the chain driven vehicle shown in FIGS. 1a, 1b, and 1c with the driven wheel suspension system in a completely compressed state.

FIG. 1d shows an enlarged section of the side view of the chain driven vehicle shown in FIGS. 1a, 1b, and 1c with the driven wheel suspension system in a completely compressed state. FIGS. 1c and 1d further exemplify certain embodiments, for example, points and vectors useful for a graphical method used to attain a squat point measurement, and a graphical method to attain suspension geometry kinematical layout from an existing desired measured squat point.

Figure 2A:
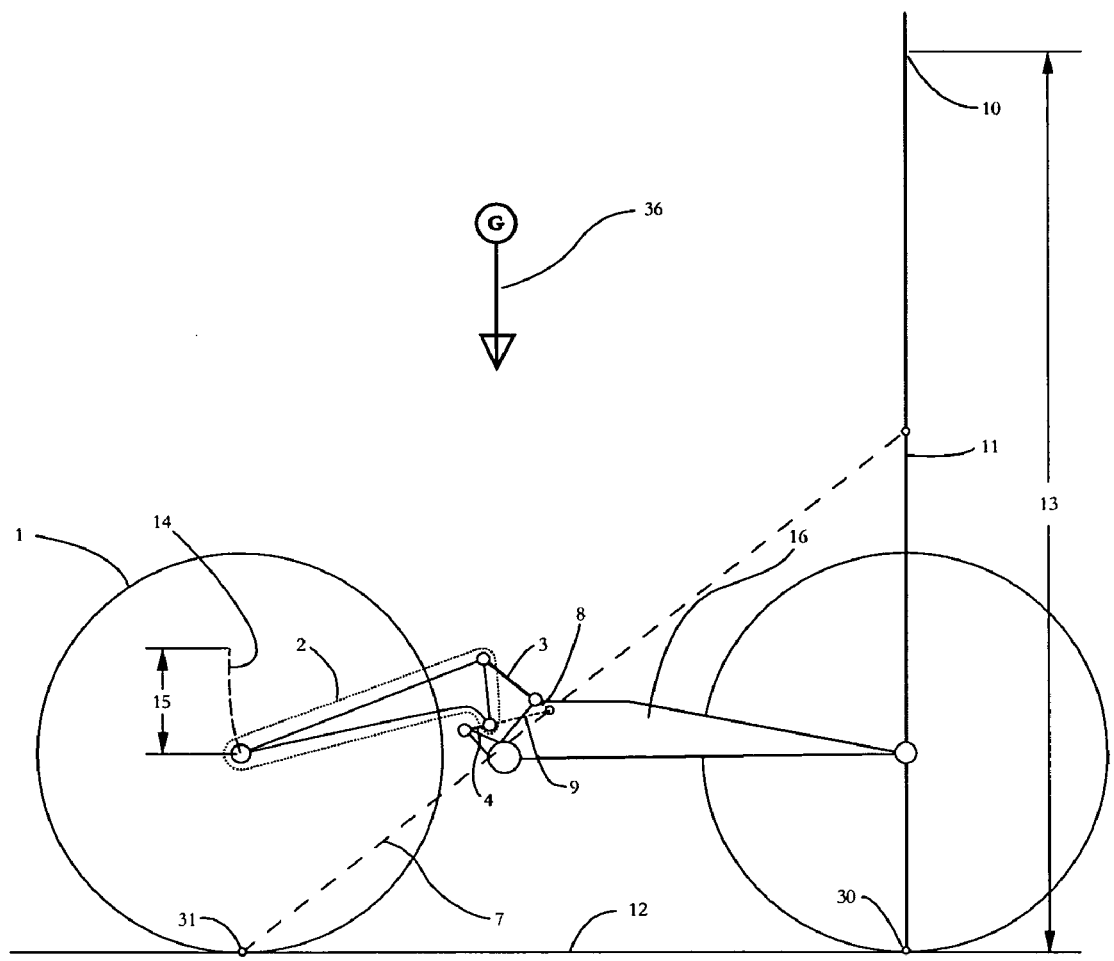
FIG. 2a is a side view of a shaft driven vehicle using a driven wheel suspension system that achieves a squat magnitude curve according to certain embodiments of the current invention. The vehicle is shown with the driven wheel suspension system in an uncompressed state.

FIG. 2a shows certain embodiments of the invention relating to shaft driven vehicles and it presents a graphical method useful to attain a squat point measurement, and a graphical method to attain suspension geometry kinematical layout from an existing desired measured squat point. Shown in FIG. 2a are the following: driven wheel (1); wheel carrier link (2); first carrier manipulation link (3); second carrier manipulation link (4); squat force vector (7); first carrier manipulation link force vector (8); second carrier manipulation link force vector (9); squat definition point (10); squat layout line (11); lower squat measurement definition line (12); measured squat distance (13); driven wheel axle path (14); driven wheel suspension travel distance (15); vehicle chassis (16); center of the forward wheel tire to ground contact patch (30); center of the driven wheel tire to ground contact patch (31); direction of gravity (36).

FIG. 2a exemplifies that as the driven wheel 1 suspension system is completely uncompressed in its driven wheel suspension travel distance 15, its defined squat force vector 7 is shown in relation to the vehicle chassis 16. The squat force vector's 7 measured squat distance 13, which is measured as the perpendicular distance between the lower squat measurement definition line 12 and the squat definition point 10, is shown in FIG. 2a. The squat measurement definition line 12 begins at the center of the driven wheel tire to ground contact patch 30, and is plotted parallel to and against the direction of gravity 36, terminating at a further point. As the suspension system is compressed through its driven wheel suspension travel distance 15, change in measured squat distance 13 over the driven wheel suspension travel distance 15 is used to create a squat magnitude curve 17.

Figure 2B:
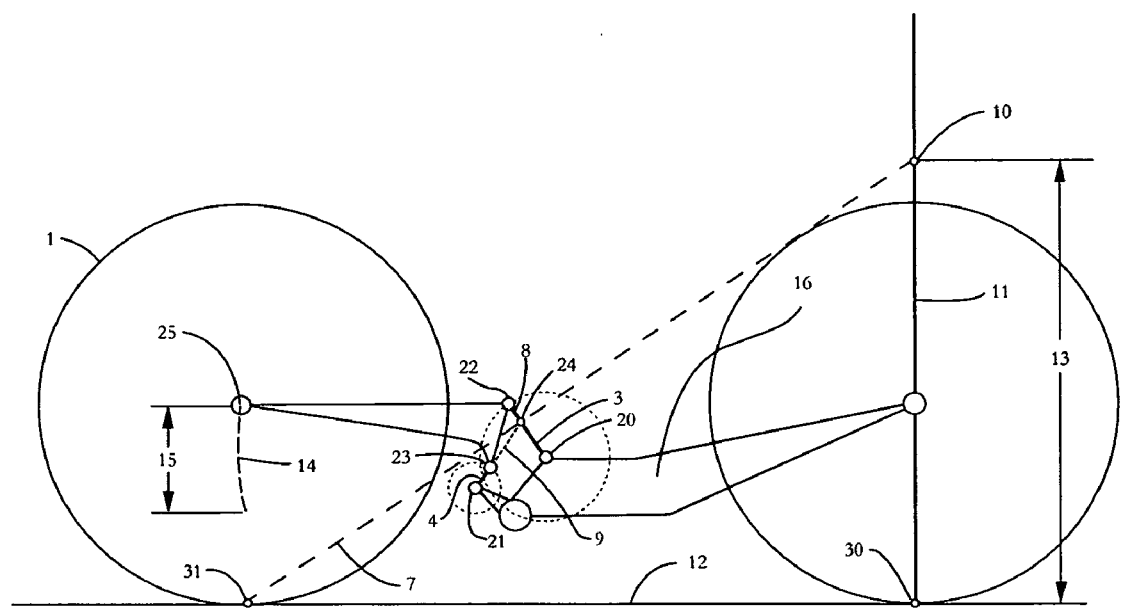
FIG. 2b is a side view of a shaft driven vehicle as shown in FIG. 2a with the driven wheel suspension system in a completely compressed state.

FIG. 2b shows a side view of a shaft driven vehicle as shown in FIG. 2a with the driven wheel suspension system in a completely compressed state. Certain embodiments are further exemplified, for example, vectors useful to a graphical method to attain a squat point measurement are shown. Also exemplified is a graphical method useful to attain suspension geometry kinematical layout from an existing desired measured squat point. Shown in FIG. 2b in addition to what is presented in FIG. 2a, are the following: first link fixed pivot (20); second link fixed pivot (21); first link floating pivot (22); second link floating pivot (23); instant force center (24); driven wheel rotation axis (25).

FIG. 2b exemplifies that as the shaft driven wheel 1 suspension system is completely compressed through its driven wheel suspension travel distance 15, its defined squat force vector 7 moves in relation to the vehicle chassis 16. The squat force vector's 7 measured squat distance 13 which is measured as the perpendicular distance between the lower squat measurement definition line 12 and the squat definition point 10, decreases in relation to the measured squat distance 13 shown in FIG. 2a. This change in measured squat distance 13 over the driven wheel suspension travel distance 15 is used to create a squat magnitude curve 17. FIG. 2b shows the graphical method used to obtain a squat magnitude curve 17 from shaft driven vehicle geometry, or shaft driven vehicle geometry from a squat magnitude curve 17. In the vehicle shown in FIG. 2b, a driven wheel 1 is attached to a wheel carrier link2, which pivots at one end of a first carrier manipulation link 3. The first carrier manipulation link 3 is pivotally attached to the vehicle chassis 16 at the first link fixed pivot 20. A second carrier manipulation link 4 is also attached to the wheel carrier link2. This second carrier manipulation link 4 is attached to the vehicle chassis 16 at a second link fixed pivot 21. A first carrier manipulation link force vector 8 is graphed coincident to the wheel carrier link2 upper pivot and the first link fixed pivot 20. The first carrier manipulation link force vector 8 is graphed so that it intersects a second carrier manipulation link force vector 9, which is graphed coincident to the wheel carrier link2 lower pivot and the second link fixed pivot 21. The intersection point of the first carrier manipulation link force vector 8 and the second carrier manipulation link force vector 9 is called the instant force center 24. The squat force vector 7 is graphed from a beginning point at the center of the driven wheel tire to ground contact patch 31, and passes through the instant force center 24, before it terminates on a squat layout line 11. The intersection of the squat force vector 7 and the squat layout line is called the squat layout point 10. The squat layout line 11 is graphed at a perpendicular angle to gravitational force. A lower squat measurement definition line 12 is graphed beginning at the center of the driven wheel tire to ground contact patch 31 and terminating perpendicular and coincident to the squat layout line 11. The perpendicular measurement from the lower squat measurement definition line 12 to the squat layout point 10 is called the measured squat distance 13. This measured squat distance 13 changes as driven wheel suspension travel distance 15 compresses, and is used to create a squat magnitude curve 17 in a squat magnitude curve graph as shown in FIG. 7a, FIG. 7b, FIG. 7c, and FIG. 8.

Figure 2C:
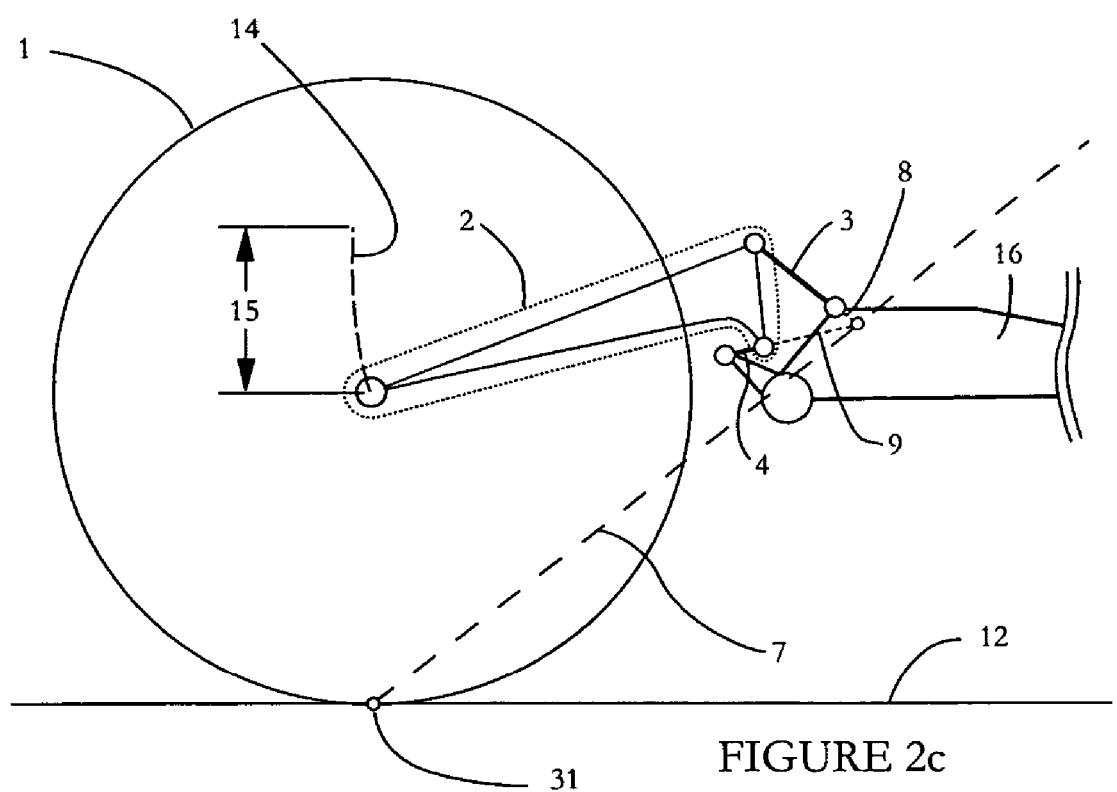
FIG. 2c is an enlarged section of the side view of the shaft driven vehicle shown in FIGS. 2a and 2b with the driven wheel suspension system in a completely uncompressed state.

FIG. 2c shows an enlarged section of the side view of the shaft driven vehicle shown in FIGS. 2a and 2b with the driven wheel suspension system in a completely uncompressed state.

Figure 2D:
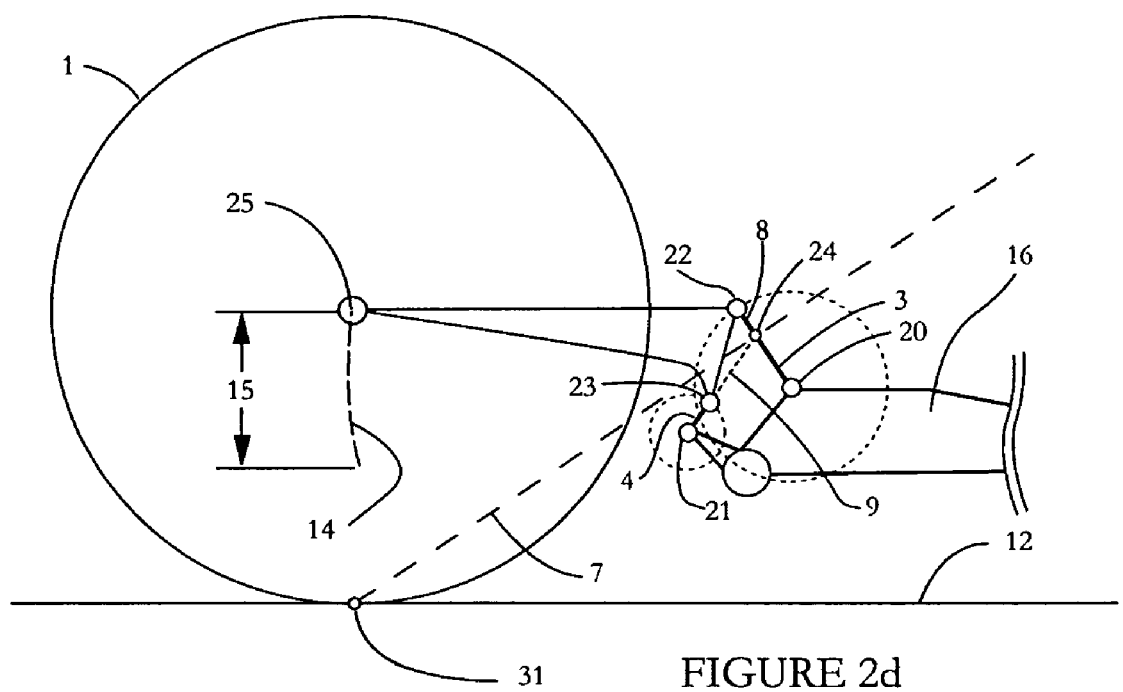
FIG. 2d is an enlarged section of the side view of the shaft driven vehicle shown in FIGS. 2a, 2b, and 2c with the driven wheel suspension system in a completely compressed state.

FIG. 2d shows an enlarged section of the side view of the shaft driven vehicle shown in FIGS. 2a, 2b, and 2c with the driven wheel suspension system in a completely compressed state. FIGS. 2c and 2d further exemplify certain embodiments, for example, points and vectors useful for a graphical method used to attain a squat point measurement, and a graphical method to attain suspension geometry kinematical layout from an existing desired measured squat point.

Figure 3A:
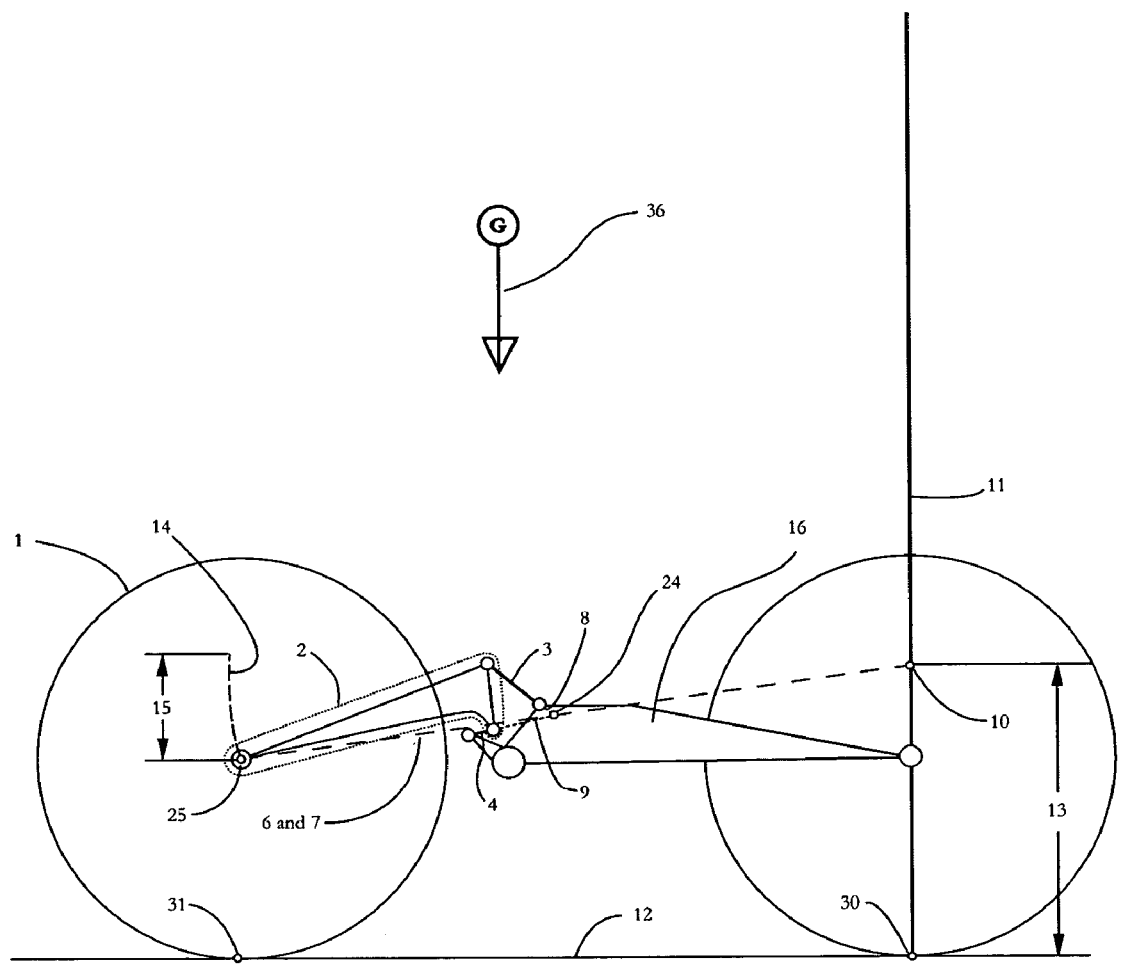
FIG. 3a is a side view of a spindle driven vehicle using a driven wheel suspension system that achieves a squat magnitude curve according to certain embodiments of the current invention. The vehicle is shown with the driven wheel suspension system in an uncompressed state.

FIG. 3a shows certain embodiments of the invention relating to spindle driven vehicles and it presents a graphical method useful to attain a squat point measurement, and a graphical method to attain suspension geometry kinematical layout from an existing desired measured squat point. Shown in FIG. 3a are the following: driven wheel (1); wheel carrier link (2); first carrier manipulation link (3); second carrier manipulation link (4); driving force vector (6); squat force vector (7); first carrier manipulation link force vector (8); second carrier manipulation link force vector (9); squat definition point (10); squat layout line (11); lower squat measurement definition line (12); measured squat distance (13); driven wheel axle path (14); driven wheel suspension travel distance (15); vehicle chassis (16); driven wheel rotation axis (25); center of the forward wheel tire to ground contact patch (30); center of the driven wheel tire to ground contact patch (31); direction of gravity (36).

FIG. 3a exemplifies that as the driven wheel 1 suspension system is completely uncompressed in its driven wheel suspension travel distance 15, its defined squat force vector 7 is shown in relation to the vehicle chassis 16. The squat force vector's 7 measured squat distance 13, which is measured as the perpendicular distance between the lower squat measurement definition line 12 and the squat definition point 10, is shown in FIG. 3a. The squat measurement definition line 12 begins at the center of the driven wheel tire to ground contact patch 30, and is plotted parallel to and against the direction of gravity 36, terminating at a further point. As the suspension system is compressed through its driven wheel suspension travel distance 15, change in measured squat distance 13 over the driven wheel suspension travel distance 15 is used to create a squat magnitude curve 17.

Figure 3B:
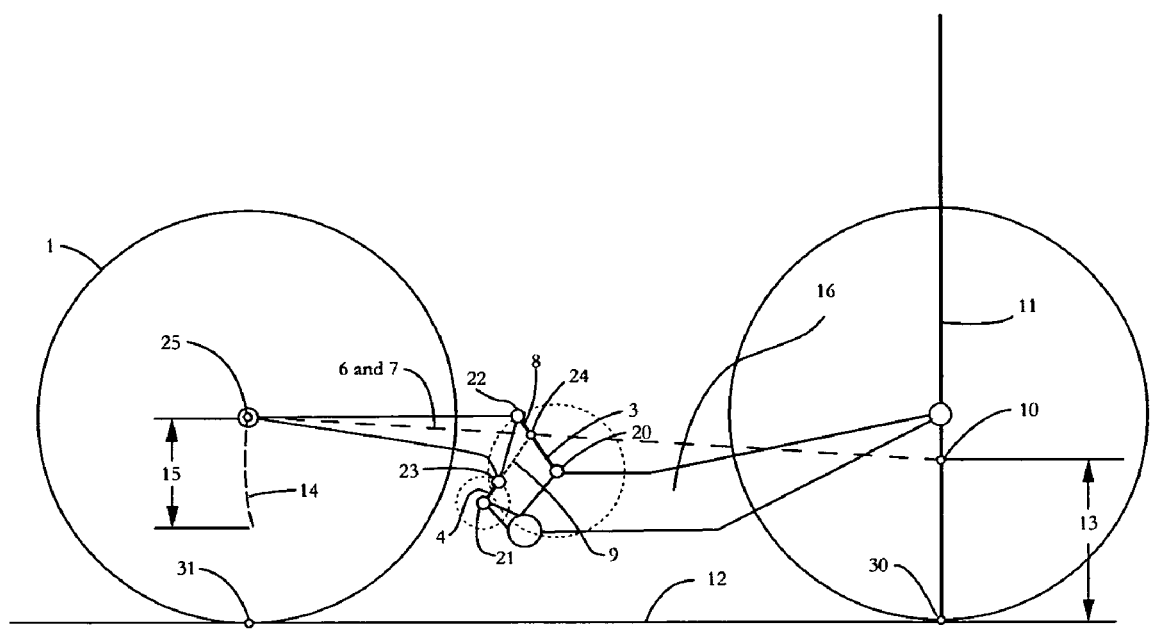
FIG. 3b is a side view of a spindle driven vehicle as shown in FIG. 3a with the driven wheel suspension system in a completely compressed state.

FIG. 3b shows a side view of a spindle driven vehicle as shown in FIG. 3a with the driven wheel suspension system in a completely compressed state. Certain embodiments are further exemplified, for example, vectors useful to a graphical method to attain a squat point measurement are shown. Also exemplified is a graphical method useful to attain suspension geometry kinematical layout from an existing desired measured squat point. Shown in FIG. 3b in addition to what is presented in FIG. 3a, are the following: first link fixed pivot (20); second link fixed pivot (21); first link floating pivot (22); second link floating pivot (23); instant force center (24).

FIG. 3b exemplifies that as the spindle driven wheel 1 suspension system is completely compressed through its driven wheel suspension travel distance 15, its defined squat force vector 7 moves in relation to the vehicle chassis 16. The squat force vector's 7 measured squat distance 13 which is measured as the perpendicular distance between the lower squat measurement definition line 12 and the squat definition point 10, decreases in relation to the measured squat distance 13 shown in FIG. 3a. This change in measured squat distance 13 over the driven wheel suspension travel distance 15 is used to create a squat magnitude curve 17. FIG. 3b shows the graphical method used to obtain a squat magnitude curve 17 from spindle driven vehicle geometry, or spindle driven vehicle geometry from a squat magnitude curve 17. In the vehicle shown in FIG. 3b, a driven wheel 1 is attached to a wheel carrier link2, which pivots at one end of a first carrier manipulation link 3. The first carrier manipulation link 3 is pivotally attached to the vehicle chassis 16 at the first link fixed pivot 20. A second carrier manipulation link 4 is also attached to the wheel carrier link2. This second carrier manipulation link 4 is attached to the vehicle chassis 16 at a second link fixed pivot 21. A first carrier manipulation link force vector 8 is graphed coincident to the wheel carrier link2 upper pivot and the first link fixed pivot 20. The first carrier manipulation link force vector 8 is graphed so that it intersects a second carrier manipulation link force vector 9, which is graphed coincident to the wheel carrier link2 lower pivot and the second link fixed pivot 21. The intersection point of the first carrier manipulation link force vector 8 and the second carrier manipulation link force vector 9 is called the instant force center 24. A driving force vector 6 is graphed from the driven wheel rotation axis 25 through the instant force center 24. The squat force vector 7 is graphed from a beginning point at the driven wheel rotation axis 25, and passes through the instant force center 24, before it terminates on a squat layout line 11. In a spindle driven vehicle as shown in FIGS. 3a-3d, the driving force vector 6, and squat force vector 7 are collinear with each other. The intersection of the squat force vector 7 and the squat layout line is called the squat layout point 10. The squat layout line 11 is graphed at a perpendicular angle to gravitational force. A lower squat measurement definition line 12 is graphed beginning at the center of the driven wheel tire to ground contact patch 31 and terminating perpendicular and coincident to the squat layout line 11. The perpendicular measurement from the lower squat measurement definition line 12 to the squat layout point 10 is called the measured squat distance 13. This measured squat distance 13 changes as driven wheel suspension travel distance 15 compresses, and is used to create a squat magnitude curve 17 in a squat magnitude curve graph as shown in FIG. 7a, FIG. 7b, FIG. 7c, and FIG. 8.

Figure 3C:
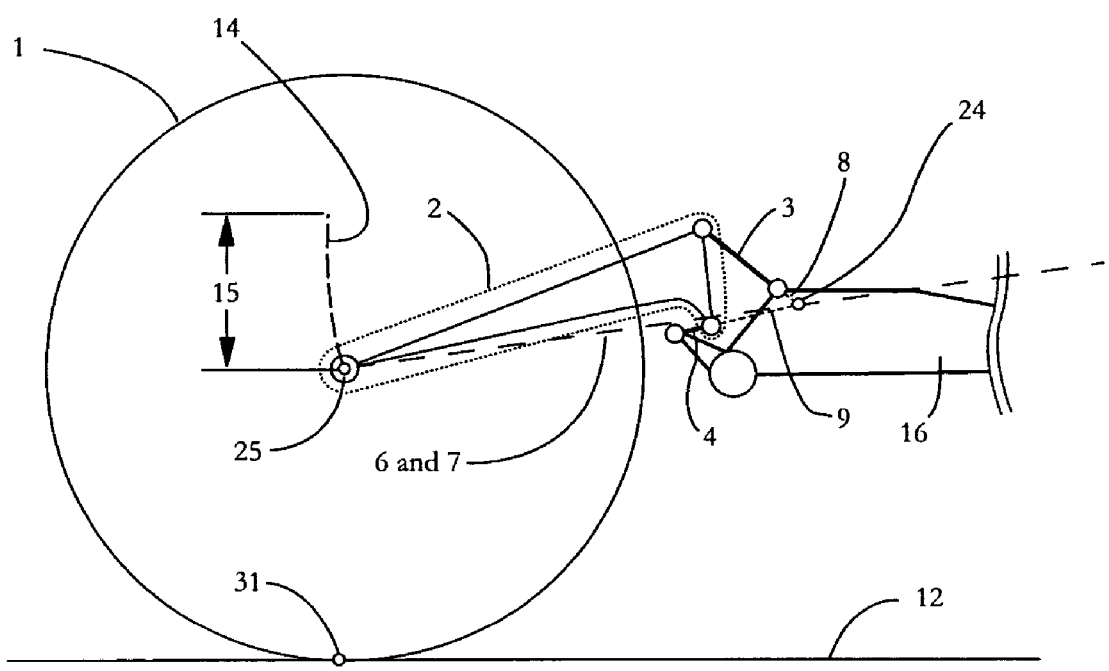
FIG. 3c is an enlarged section of the side view of the spindle driven vehicle shown in FIGS. 3a and 3b with the driven wheel suspension system in a completely uncompressed state.

FIG. 3c shows an enlarged section of the side view of the spindle driven vehicle shown in FIGS. 3a and 3b with the driven wheel suspension system in a completely uncompressed state.

Figure 3D:
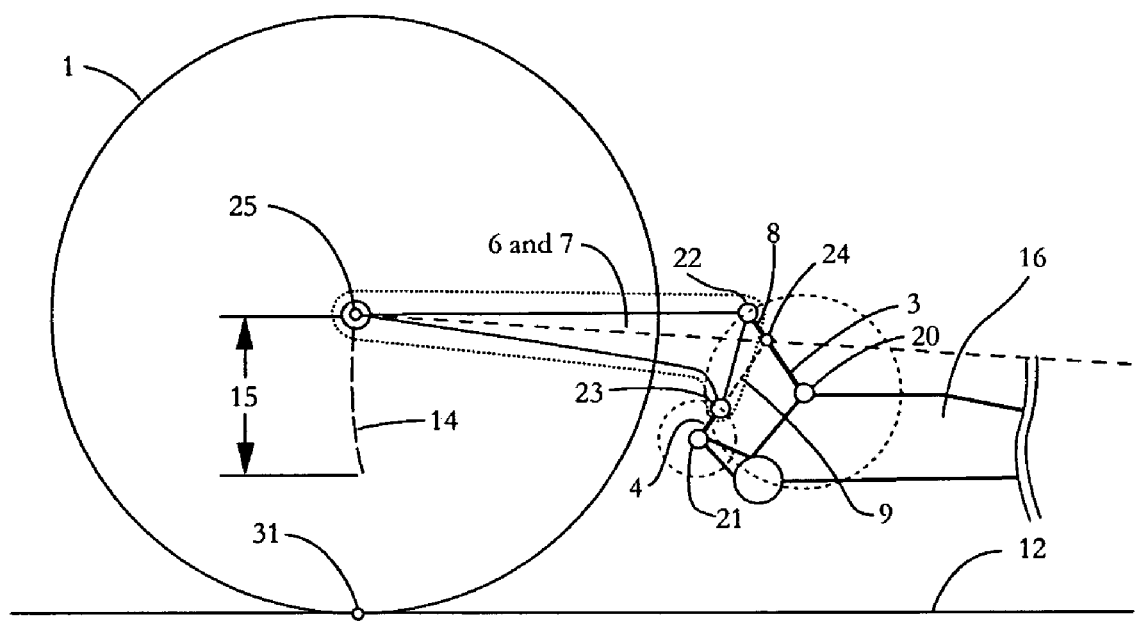
FIG. 3d is an enlarged section of the side view of the spindle driven vehicle shown in FIGS. 3a, 3b, and 3c with the driven wheel suspension system in a completely compressed state.

FIG. 3d shows an enlarged section of the side view of the spindle driven vehicle shown in FIGS. 3a, 3b, and 3c with the driven wheel suspension system in a completely compressed state. FIGS. 3c and 3d further exemplify certain embodiments, for example, points and vectors useful for a graphical method used to attain a squat point measurement, and a graphical method to attain suspension geometry kinematical layout from an existing desired measured squat point.

Figure 4A:
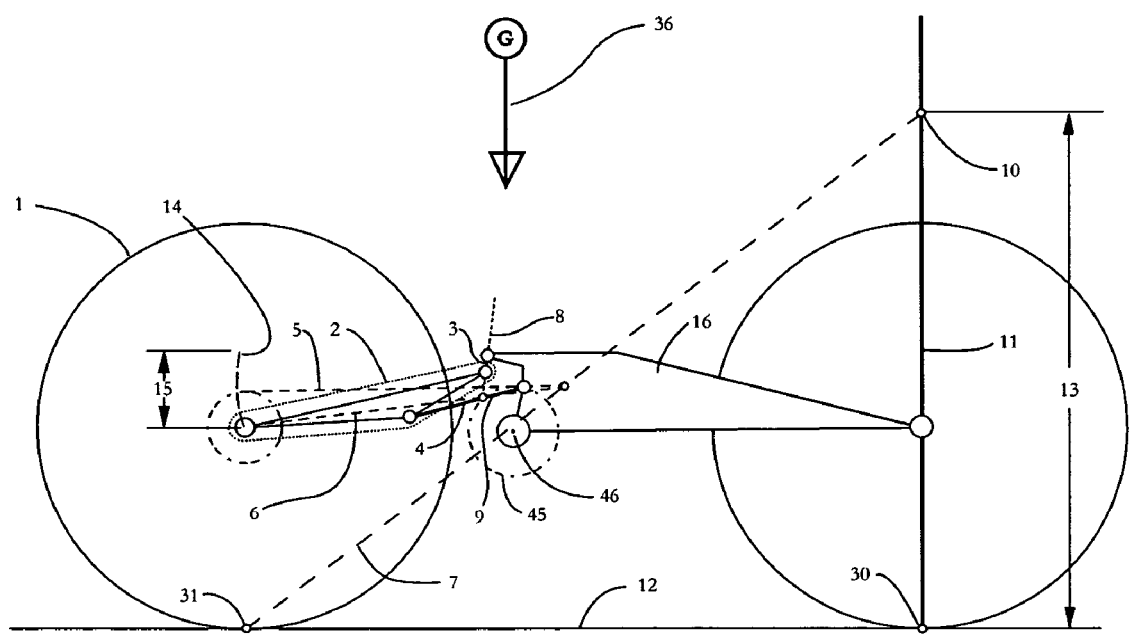
FIG. 4a is a side view of a chain driven vehicle using a driven wheel suspension system that achieves a stable squat magnitude curve according to certain embodiments of the current invention. The vehicle is shown with the driven wheel suspension system in an uncompressed state.

FIG. 4a shows certain embodiments of the invention relating to chain driven vehicles and it presents a graphical method useful to attain a squat point measurement, and a graphical method to attain suspension geometry kinematical layout from an existing desired measured squat point. Shown in FIG. 4a are the following: driven wheel (1); wheel carrier link(2); first carrier manipulation link (3); second carrier manipulation link (4); chain force vector (5); driving force vector (6); squat force vector (7); first carrier manipulation link force vector (8); second carrier manipulation link force vector (9); squat definition point (10); squat layout line (11); lower squat measurement definition line (12); measured squat distance (13); driven wheel axle path (14); driven wheel suspension travel distance (15); vehicle chassis (16); center of the forward wheel tire to ground contact patch (30); center of the driven wheel tire to ground contact patch (31); direction of gravity (36).

FIG. 4a exemplifies that as the driven wheel 1 suspension system is completely uncompressed in its driven wheel suspension travel distance 15; its squat force vector 7 is shown in relation to the vehicle chassis 16. The squat force vector's 7 measured squat distance 13 which is measured as the perpendicular distance between the lower squat measurement definition line 12 and the squat definition point 10, is also shown in FIG. 1a. The squat measurement definition line 12 begins at the center of the driven wheel tire to ground contact patch 30, and is plotted parallel to and against the direction of gravity 36, terminating at a further point. As the suspension system is compressed through its driven wheel suspension travel distance 15, change in measured squat distance 13 over the driven wheel suspension travel distance 15 is used to create a squat magnitude curve 17.

Figure 4B:
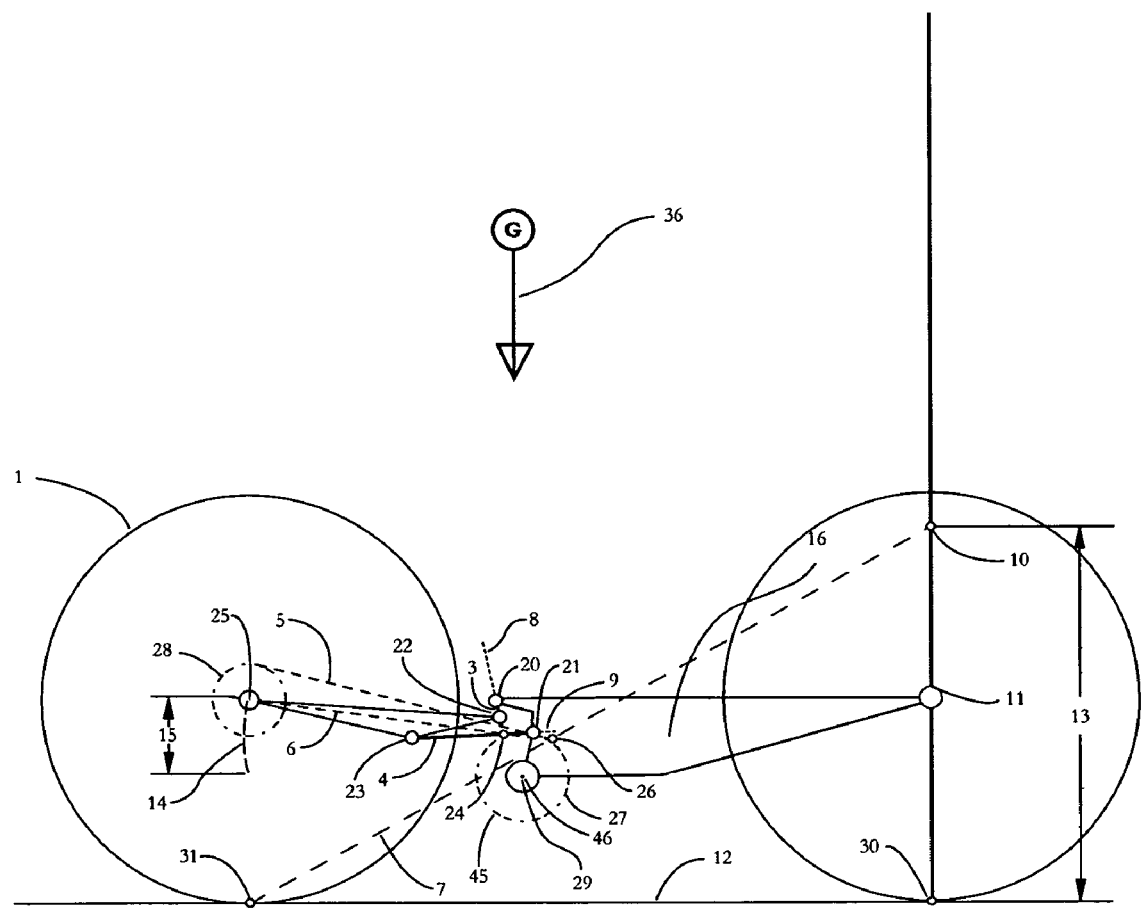
FIG. 4b is a side view of a chain driven vehicle as shown in FIG. 4a with the driven wheel suspension system in a completely compressed state.

FIG. 4b shows a side view of a chain driven vehicle as shown in FIG. 4a with the driven wheel suspension system in a completely compressed state. Certain embodiments are further exemplified, for example, vectors useful to a graphical method to attain a squat point measurement are shown. Also exemplified is a graphical method useful to attain suspension geometry kinematical layout from an existing desired measured squat point. Shown in FIG. 4b in addition to what is presented in FIG. 4a, are the following: first link fixed pivot (20); second link fixed pivot (21); first link floating pivot (22); second link floating pivot (23); instant force center (24); driven wheel rotation axis (25); chain force vector and driving force vector intersection point (26); driving cog (27); driven cog (28); driving cog rotation axis (29).

Figure 11:
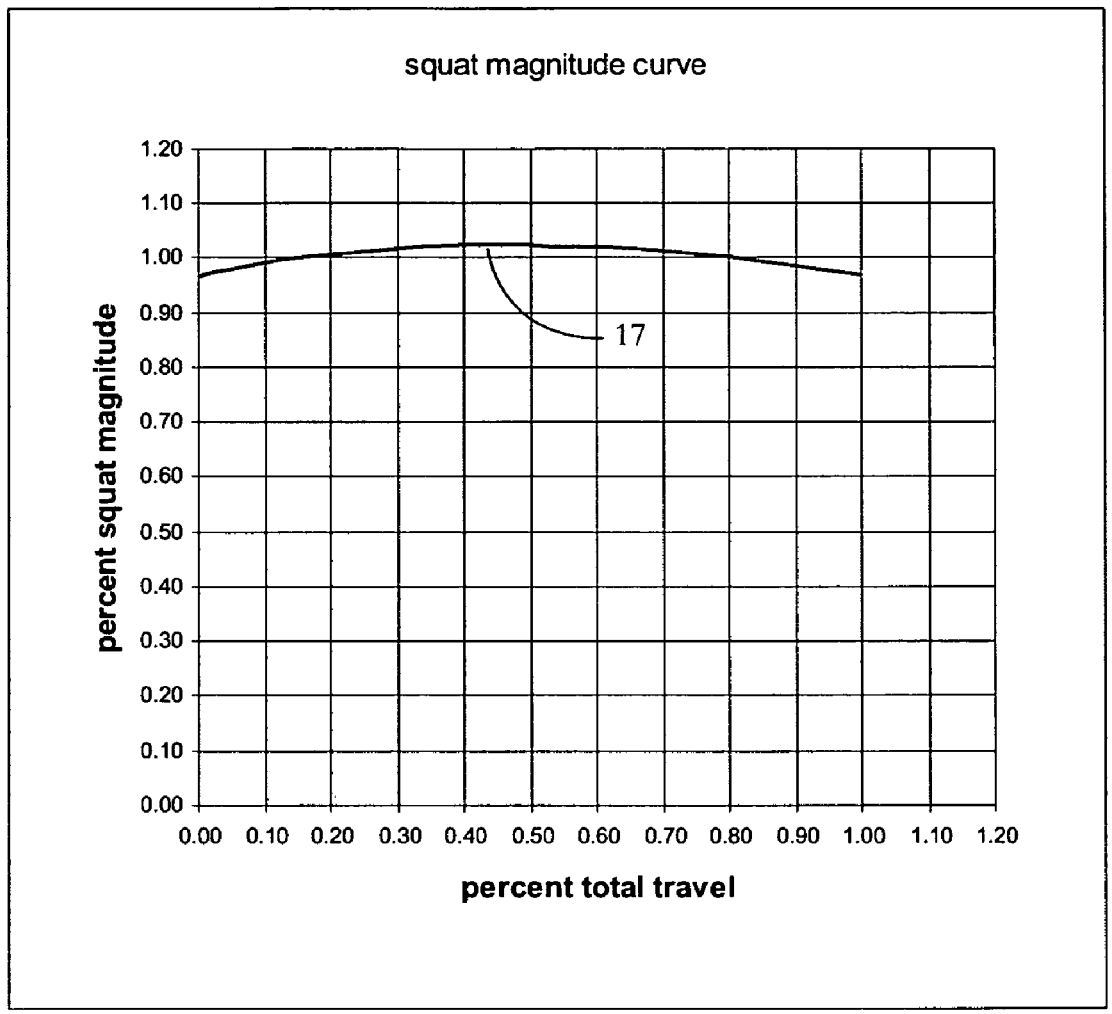
FIG. 11 shows a squat magnitude curve for suspension systems according to certain embodiments of the invention graphed on a squat magnitude curve graph as disclosed herein. This curve is produced by suspension kinematical geometry as shown in FIGS. 4a, and 4b.
Figure 12:
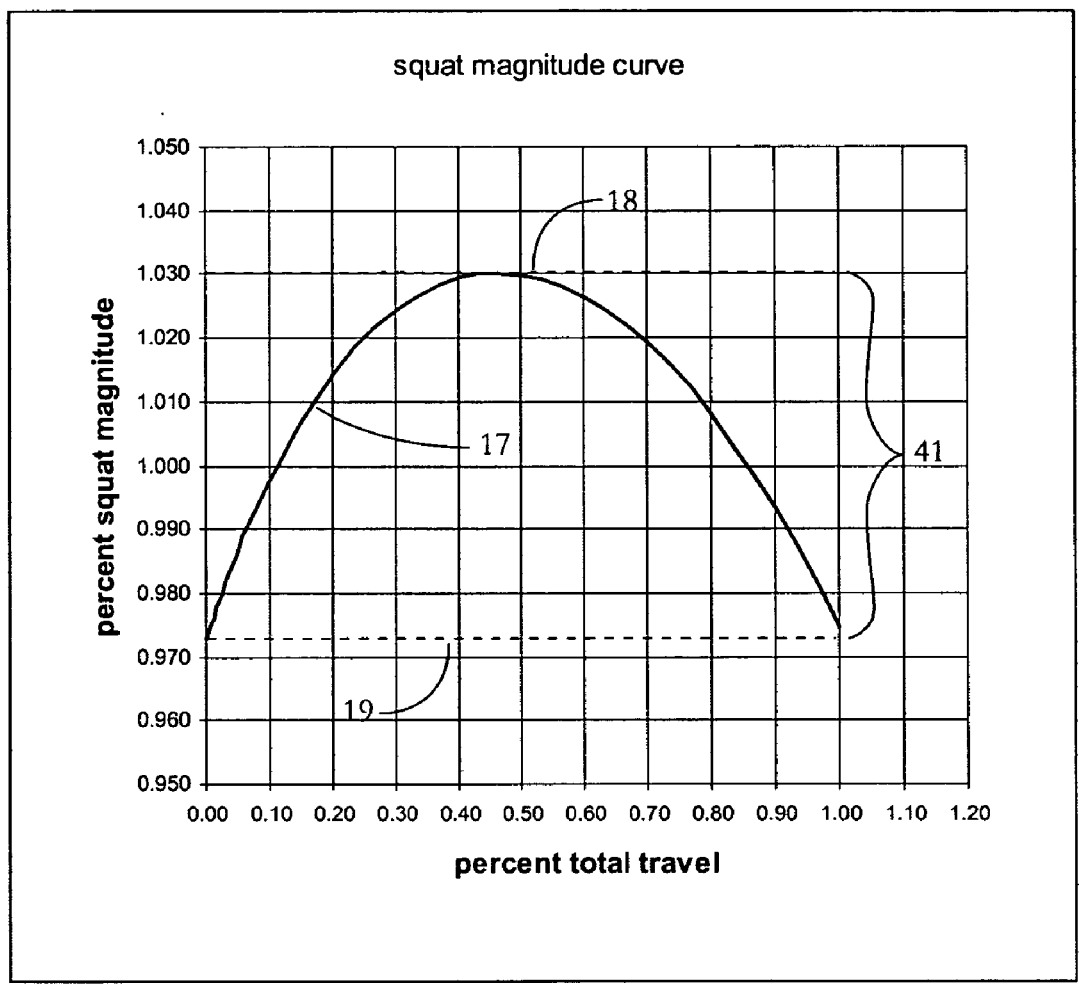
FIG. 12 shows the squat magnitude curve shown in FIG. 11 for suspension systems according to certain embodiments of the invention as graphed on a squat magnitude curve graph as disclosed herein. The curve shown here results from the curve shown in FIG. 11 by changing the scale of the vertical y-axis while maintaining the scale of the horizontal x-axis. This curve is produced by suspension kinematical geometry as shown in FIGS. 4a, and 4b and shows upper and lower bounds for determining a percent squat magnitude variation.

FIG. 4b exemplifies that as the driven wheel 1 suspension system is completely compressed through its driven wheel suspension travel distance 15, its squat force vector 7 moves in relation to the vehicle chassis 16. The squat force vector's 7 measured squat distance 13, which is measured as the perpendicular distance between the lower squat measurement definition line 12 and the squat definition point 10, decreases in relation to the measured squat distance 13 shown in FIG. 4a. This change in measured squat distance 13 over the driven wheel suspension travel distance 15, in certain preferred embodiments, is used to create a squat magnitude curve 17. FIG. 4b shows the graphical method used to obtain a squat magnitude curve 17 from chain driven vehicle geometry, or chain driven vehicle geometry from a squat magnitude curve 17. In the vehicle shown in FIG. 1b, a driven wheel 1 is attached to a wheel carrier link2, which pivots at one end of a first carrier manipulation link 3. The first carrier manipulation link 3 is pivotally attached to the vehicle chassis 16 at the first link fixed pivot 20. A second carrier manipulation link 4 is also attached to the wheel carrier link2. This second carrier manipulation link 4 is attached to the vehicle chassis 16 at a second link fixed pivot 21. A first carrier manipulation link force vector 8 is graphed coincident to the wheel carrier link2 upper pivot and the first link fixed pivot 20. The first carrier manipulation link force vector 8 is graphed so that it intersects a second carrier manipulation link force vector 9, which is graphed coincident to the wheel carrier link2 lower pivot and the second link fixed pivot 21. The intersection point of the first carrier manipulation link force vector 8 and the second carrier manipulation link force vector 9 is called the instant force center 24. A driving force vector 6 is graphed beginning at the driven wheel rotation axis 25, and passes through the instant force center 24. A chain force vector 5 is drawn tangent to the tops of the driving cog 27 and driven cog 28, and intersects the driving force vector 6 at a chain force vector and driving force vector intersection point 26. The squat force vector 7 is graphed from a beginning point at the center of the driven wheel tire to ground contact patch 31, and passes through the chain force vector and driving force vector intersection point 26, before it terminates on a squat layout line 11. The intersection of the squat force vector 7 and the squat layout line is called the squat layout point 10. The squat layout line 11 is graphed at a perpendicular angle to gravitational force. A lower squat measurement definition line 12 is graphed beginning at the center of the driven wheel tire to ground contact patch 31 and terminating perpendicular and coincident to the squat layout line 11. The perpendicular measurement from the lower squat measurement definition line 12 to the squat layout point 10 is called the measured squat distance 13. This measured squat distance 13 changes as driven wheel suspension travel distance 15 compresses, and is used to create a squat magnitude curve 17 in a squat magnitude curve graph as shown in FIG. 11 and FIG. 12.

Figure 5A:
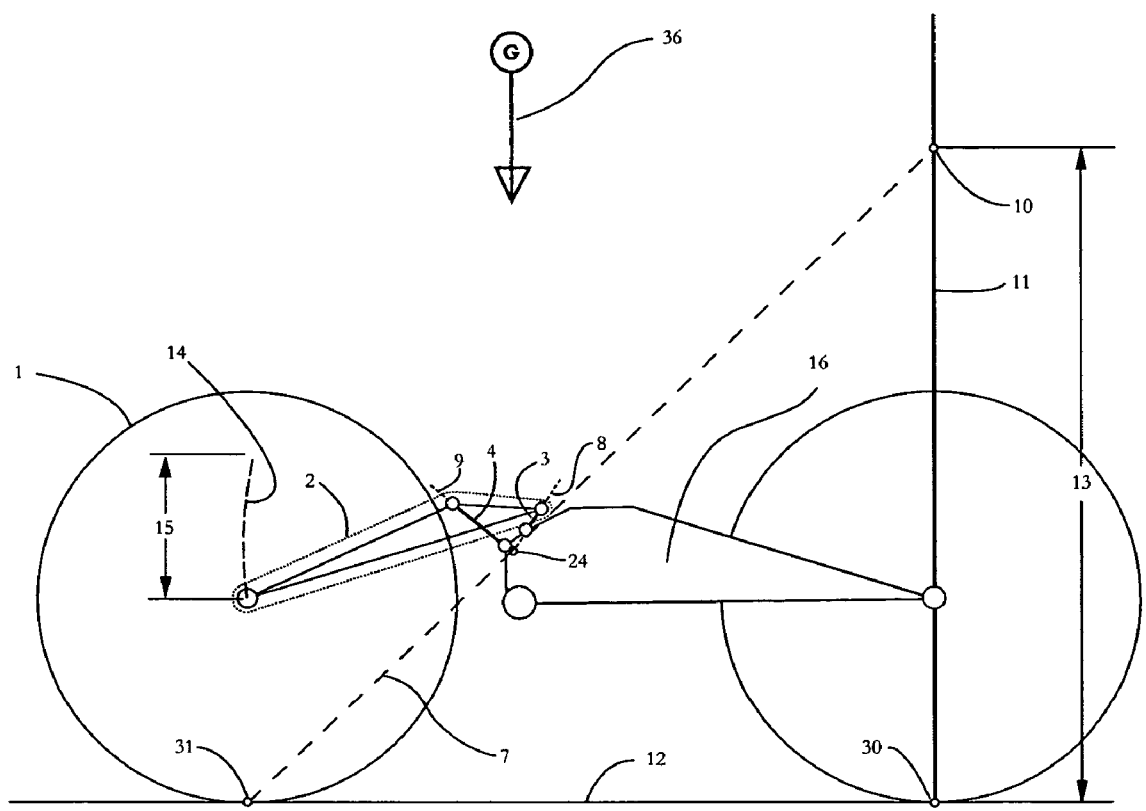
FIG. 5a is a side view of a shaft driven vehicle using a driven wheel suspension system that achieves a squat magnitude curve according to certain embodiments of the current invention. The vehicle is shown with the driven wheel suspension system in an uncompressed state.

FIG. 5a shows certain embodiments of the invention relating to shaft driven vehicles and it presents a graphical method useful to attain a squat point measurement, and a graphical method to attain suspension geometry kinematical layout from an existing desired measured squat point. Shown in FIG. 5a are the following: driven wheel (1); wheel carrier link (2); first carrier manipulation link (3); second carrier manipulation link (4); squat force vector (7); first carrier manipulation link force vector (8); second carrier manipulation link force vector (9); squat definition point (10); squat layout line (11); lower squat measurement definition line (12); measured squat distance (13); driven wheel axle path (14); driven wheel suspension travel distance (15); vehicle chassis (16); instant force center (24); center of the forward wheel tire to ground contact patch (30); center of the driven wheel tire to ground contact patch (31); direction of gravity (36).

FIG. 5a exemplifies that as the driven wheel 1 suspension system is completely uncompressed in its driven wheel suspension travel distance 15, its defined squat force vector 7 is shown in relation to the vehicle chassis 16. The squat force vector's 7 measured squat distance 13, which is measured as the perpendicular distance between the lower squat measurement definition line 12 and the squat definition point 10, is shown in FIG. 5a. The squat measurement definition line 12 begins at the center of the driven wheel tire to ground contact patch 30, and is plotted parallel to and against the direction of gravity 36, terminating at a further point. As the suspension system is compressed through its driven wheel suspension travel distance 15, change in measured squat distance 13 over the driven wheel suspension travel distance 15 is used to create a squat magnitude curve 17.

Figure 5B:
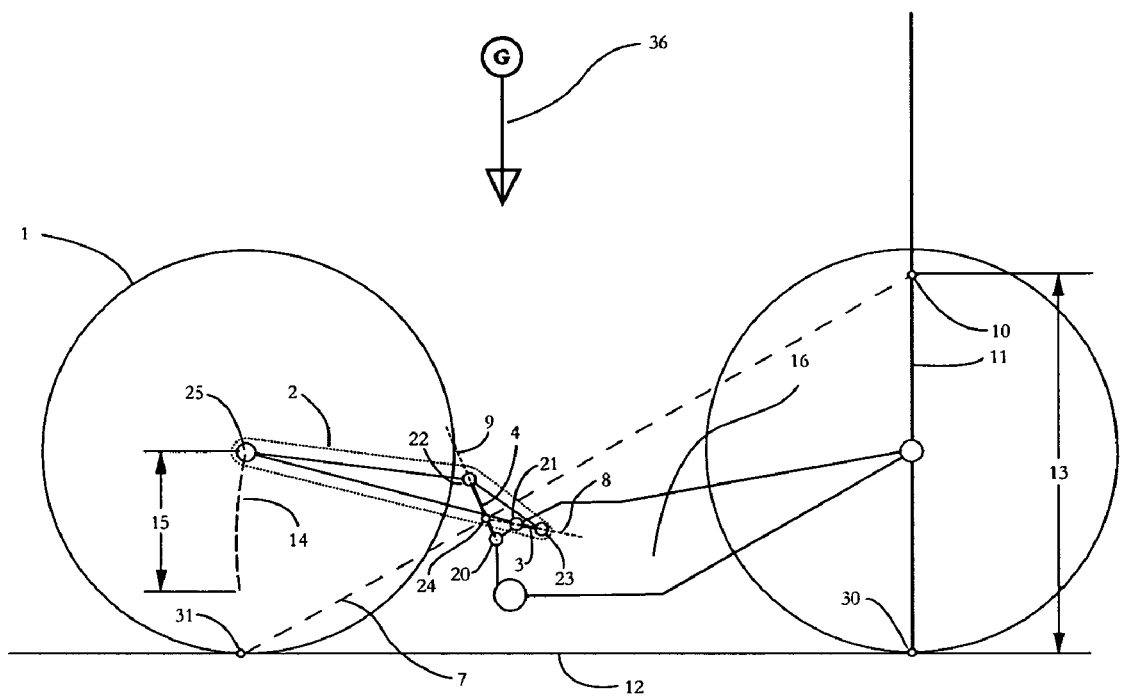
FIG. 5b is a side view of a shaft driven vehicle as shown in FIG. 5a with the driven wheel suspension system in a completely compressed state.

FIG. 5b shows a side view of a shaft driven vehicle as shown in FIG. 5a with the driven wheel suspension system in a completely compressed state. Certain embodiments are further exemplified, for example, vectors useful to a graphical method to attain a squat point measurement are shown. Also exemplified is a graphical method useful to attain suspension geometry kinematical layout from an existing desired measured squat point. Shown in FIG. 5b in addition to what is presented in FIG. 5a, are the following: first link fixed pivot (20); second link fixed pivot (21); first link floating pivot (22); second link floating pivot (23); instant force center (24); driven wheel rotation axis (25).

FIG. 5b exemplifies that as the shaft driven wheel 1 suspension system is completely compressed through its driven wheel suspension travel distance 15, its defined squat force vector 7 moves in relation to the vehicle chassis 16. The squat force vector's 7 measured squat distance 13 which is measured as the perpendicular distance between the lower squat measurement definition line 12 and the squat definition point 10, decreases in relation to the measured squat distance 13 shown in FIG. 5a. This change in measured squat distance 13 over the driven wheel suspension travel distance 15 is used to create a squat magnitude curve 17. FIG. 5b shows the graphical method used to obtain a squat magnitude curve 17 from shaft driven vehicle geometry, or shaft driven vehicle geometry from a squat magnitude curve 17. In the vehicle shown in FIG. 5b, a driven wheel 1 is attached to a wheel carrier link2, which pivots at one end of a first carrier manipulation link 3. The first carrier manipulation link 3 is pivotally attached to the vehicle chassis 16 at the first link fixed pivot 20. A second carrier manipulation link 4 is also attached to the wheel carrier link2. This second carrier manipulation link 4 is attached to the vehicle chassis 16 at a second link fixed pivot 21. A first carrier manipulation link force vector 8 is graphed coincident to the wheel carrier link2 upper pivot and the first link fixed pivot 20. The first carrier manipulation link force vector 8 is graphed so that it intersects a second carrier manipulation link force vector 9, which is graphed coincident to the wheel carrier link2 lower pivot and the second link fixed pivot 21. The intersection point of the first carrier manipulation link force vector 8 and the second carrier manipulation link force vector 9 is called the instant force center 24. The squat force vector 7 is graphed from a beginning point at the center of the driven wheel tire to ground contact patch 31, and passes through the instant force center 24, before it terminates on a squat layout line 11. The intersection of the squat force vector 7 and the squat layout line is called the squat layout point 10. The squat layout line 11 is graphed at a perpendicular angle to gravitational force. A lower squat measurement definition line 12 is graphed beginning at the center of the driven wheel tire to ground contact patch 31 and terminating perpendicular and coincident to the squat layout line 11. The perpendicular measurement from the lower squat measurement definition line 12 to the squat layout point 10 is called the measured squat distance 13. This measured squat distance 13 changes as driven wheel suspension travel distance 15 compresses, and is used to create a squat magnitude curve 17 in a squat magnitude curve graph as shown in FIG. 7a, FIG. 7b, FIG. 7c, and FIG. 8.

Figure 6A:
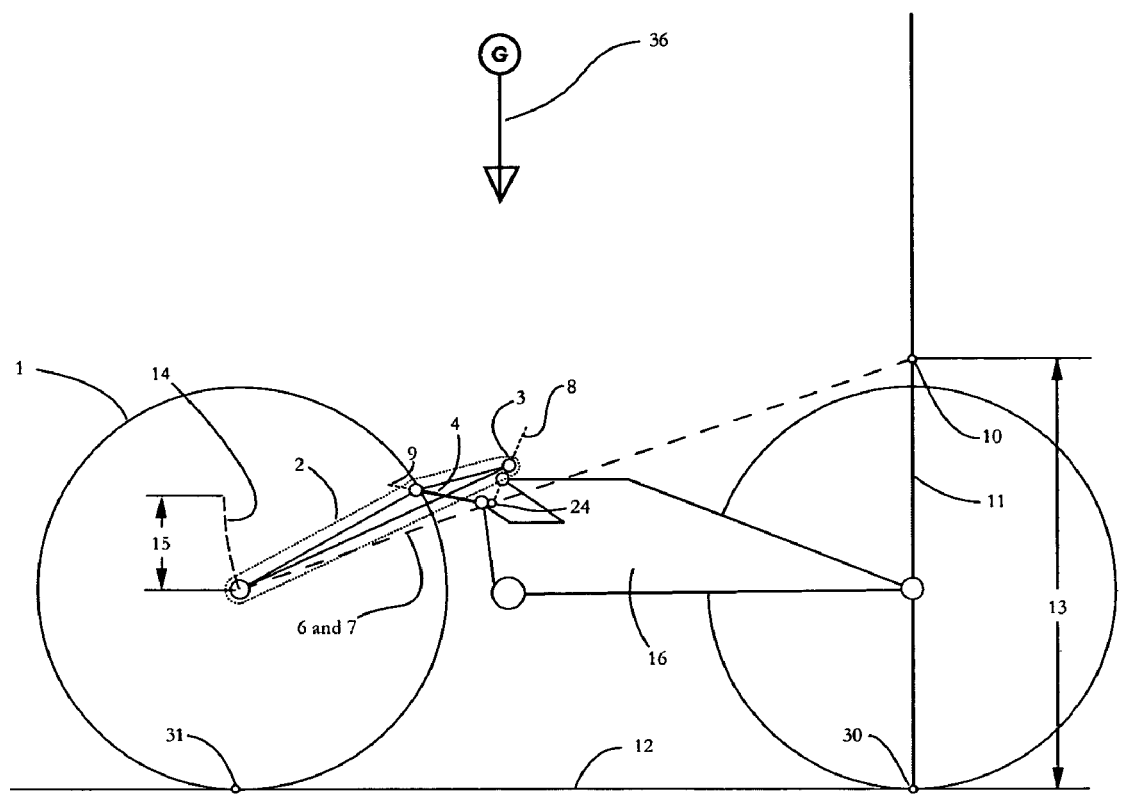
FIG. 6a is a side view of a spindle driven vehicle using a driven wheel suspension system that achieves a squat magnitude curve according to certain embodiments of the current invention. The vehicle is shown with the driven wheel suspension system in an uncompressed state.

FIG. 6a shows certain embodiments of the invention relating to spindle driven vehicles and it presents a graphical method useful to attain a squat point measurement, and a graphical method to attain suspension geometry kinematical layout from an existing desired measured squat point. Shown in FIG. 6a are the following: driven wheel (1); wheel carrier link (2); first carrier manipulation link (3); second carrier manipulation link (4); driving force vector (6); squat force vector (7); first carrier manipulation link force vector (8); second carrier manipulation link force vector (9); squat definition point (10); squat layout line (11); lower squat measurement definition line (12); measured squat distance (13); driven wheel axle path (14); driven wheel suspension travel distance (15); vehicle chassis (16); instant force center (24); center of the forward wheel tire to ground contact patch (30); center of the driven wheel tire to ground contact patch (31); direction of gravity (36).

FIG. 6a exemplifies that as the driven wheel 1 suspension system is completely uncompressed in its driven wheel suspension travel distance 15, its defined squat force vector 7 is shown in relation to the vehicle chassis 16. The squat force vector's 7 measured squat distance 13, which is measured as the perpendicular distance between the lower squat measurement definition line 12 and the squat definition point 10, is shown in FIG. 6a. The squat measurement definition line 12 begins at the center of the driven wheel tire to ground contact patch 30, and is plotted parallel to and against the direction of gravity 36, terminating at a further point. As the suspension system is compressed through its driven wheel suspension travel distance 15, change in measured squat distance 13 over the driven wheel suspension travel distance 15 is used to create a squat magnitude curve 17.

Figure 6B:
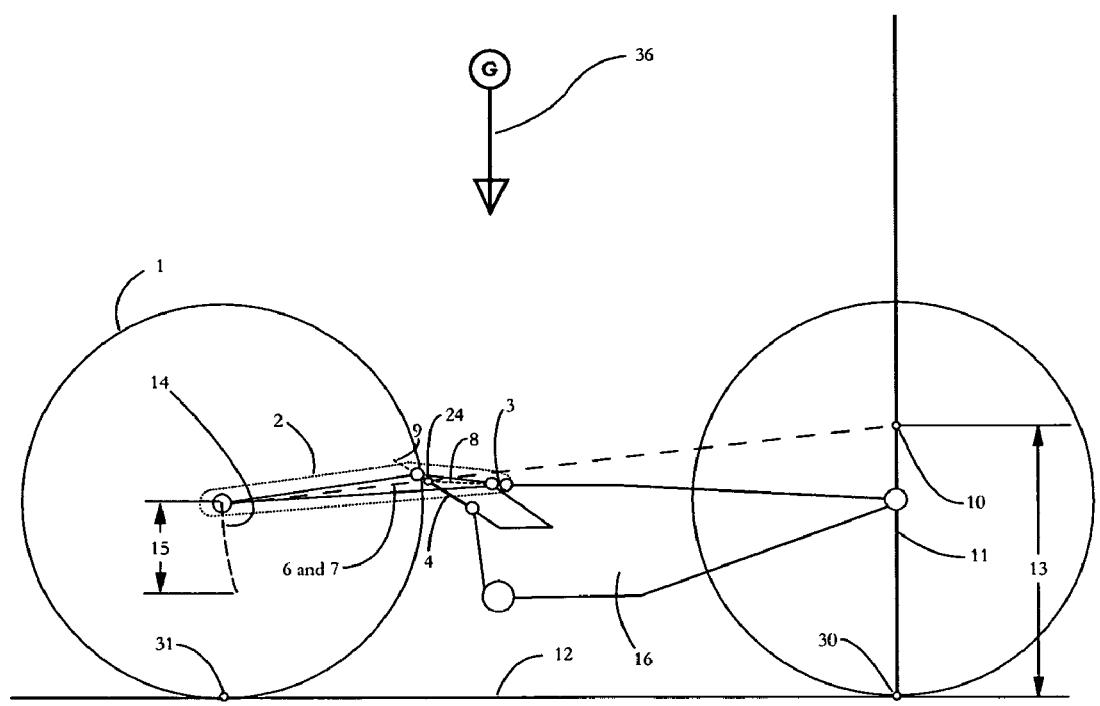
FIG. 6b is a side view of a spindle driven vehicle as shown in FIG. 6a with the driven wheel suspension system in a completely compressed state.

FIG. 6b shows a side view of a spindle driven vehicle as shown in FIG. 6a with the driven wheel suspension system in a completely compressed state. Certain embodiments are further exemplified, for example, vectors useful to a graphical method to attain a squat point measurement are shown. Also exemplified is a graphical method useful to attain suspension geometry kinematical layout from an existing desired measured squat point. Shown in FIG. 6b in addition to what is presented in FIG. 6a, are the following: first link fixed pivot (20); second link fixed pivot (21); first link floating pivot (22); second link floating pivot (23); instant force center (24); driven wheel rotation axis (25).

FIG. 6b exemplifies that as the spindle driven wheel 1 suspension system is completely compressed through its driven wheel suspension travel distance 15, its defined squat force vector 7 moves in relation to the vehicle chassis 16. The squat force vector's 7 measured squat distance 13 which is measured as the perpendicular distance between the lower squat measurement definition line 12 and the squat definition point 10, decreases in relation to the measured squat distance 13 shown in FIG. 6a. This change in measured squat distance 13 over the driven wheel suspension travel distance 15 is used to create a squat magnitude curve 17. FIG. 6b shows the graphical method used to obtain a squat magnitude curve 17 from spindle driven vehicle geometry, or spindle driven vehicle geometry from a squat magnitude curve 17. In the vehicle shown in FIG. 6b, a driven wheel 1 is attached to a wheel carrier link2, which pivots at one end of a first carrier manipulation link 3. The first carrier manipulation link 3 is pivotally attached to the vehicle chassis 16 at the first link fixed pivot 20. A second carrier manipulation link 4 is also attached to the wheel carrier link2. This second carrier manipulation link 4 is attached to the vehicle chassis 16 at a second link fixed pivot 21. A first carrier manipulation link force vector 8 is graphed coincident to the wheel carrier link2 upper pivot and the first link fixed pivot 20. The first carrier manipulation link force vector 8 is graphed so that it intersects a second carrier manipulation link force vector 9, which is graphed coincident to the wheel carrier link2 lower pivot and the second link fixed pivot 21. The intersection point of the first carrier manipulation link force vector 8 and the second carrier manipulation link force vector 9 is called the instant force center 24. A driving force vector 6 is graphed from the driven wheel rotation axis 25 through the instant force center 24. The squat force vector 7 is graphed from a beginning point at the driven wheel rotation axis 25, and passes through the instant force center 24, before it terminates on a squat layout line 11. In a spindle driven vehicle as shown in FIGS. 3a-3d, the driving force vector 6, and squat force vector 7 are collinear with each other. The intersection of the squat force vector 7 and the squat layout line is called the squat layout point 10. The squat layout line 11 is graphed at a perpendicular angle to gravitational force. A lower squat measurement definition line 12 is graphed beginning at the center of the driven wheel tire to ground contact patch 31 and terminating perpendicular and coincident to the squat layout line 11. The perpendicular measurement from the lower squat measurement definition line 12 to the squat layout point 10 is called the measured squat distance 13. This measured squat distance 13 changes as driven wheel suspension travel distance 15 compresses, and is used to create a squat magnitude curve 17 in a squat magnitude curve graph as shown in FIG. 7a, FIG. 7b, FIG. 7c, and FIG. 8.

Figure 7A:
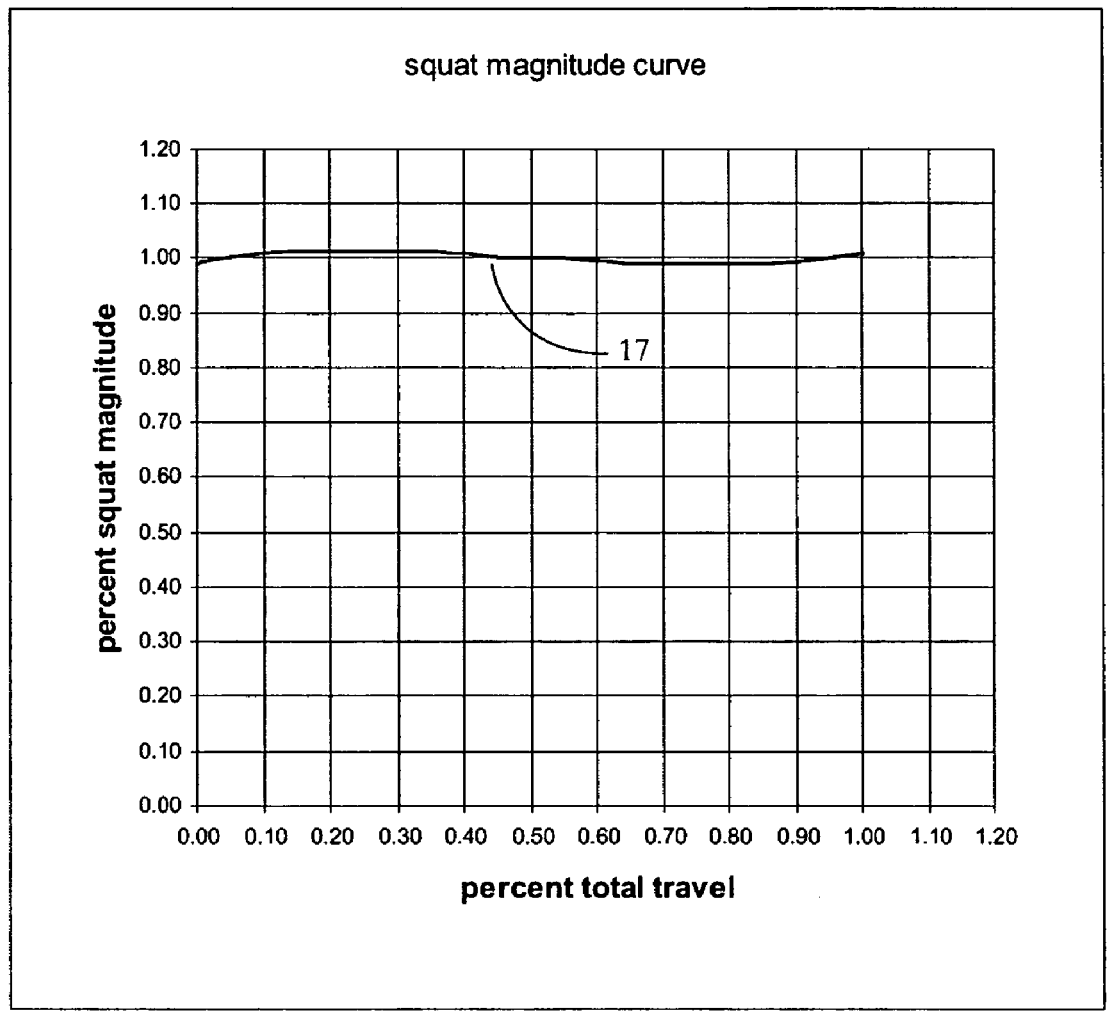
FIG. 7a shows a squat magnitude curve for suspension systems according to certain embodiments of the invention graphed on a squat magnitude curve graph as disclosed herein. This curve is produced by suspension kinematical geometry as shown in FIGS. 2a, 2b, 2c, 2d, 3a, 3b, 3c, 3d, 5a, 5b, 6a, and 6b.

FIG. 7a shows a stable squat magnitude curve (17) for suspension systems according to certain embodiments of the invention graphed on a squat magnitude curve graph as disclosed herein. The percent of total suspension travel (i.e., percent total travel) is shown on the x-axis, and the percent of total squat (i.e., percent squat magnitude) is shown on the y-axis. The stable squat magnitude curve 17 shown in FIG. 7a displays an average value of approximately one-hundred percent anti squat.

Figure 7B:
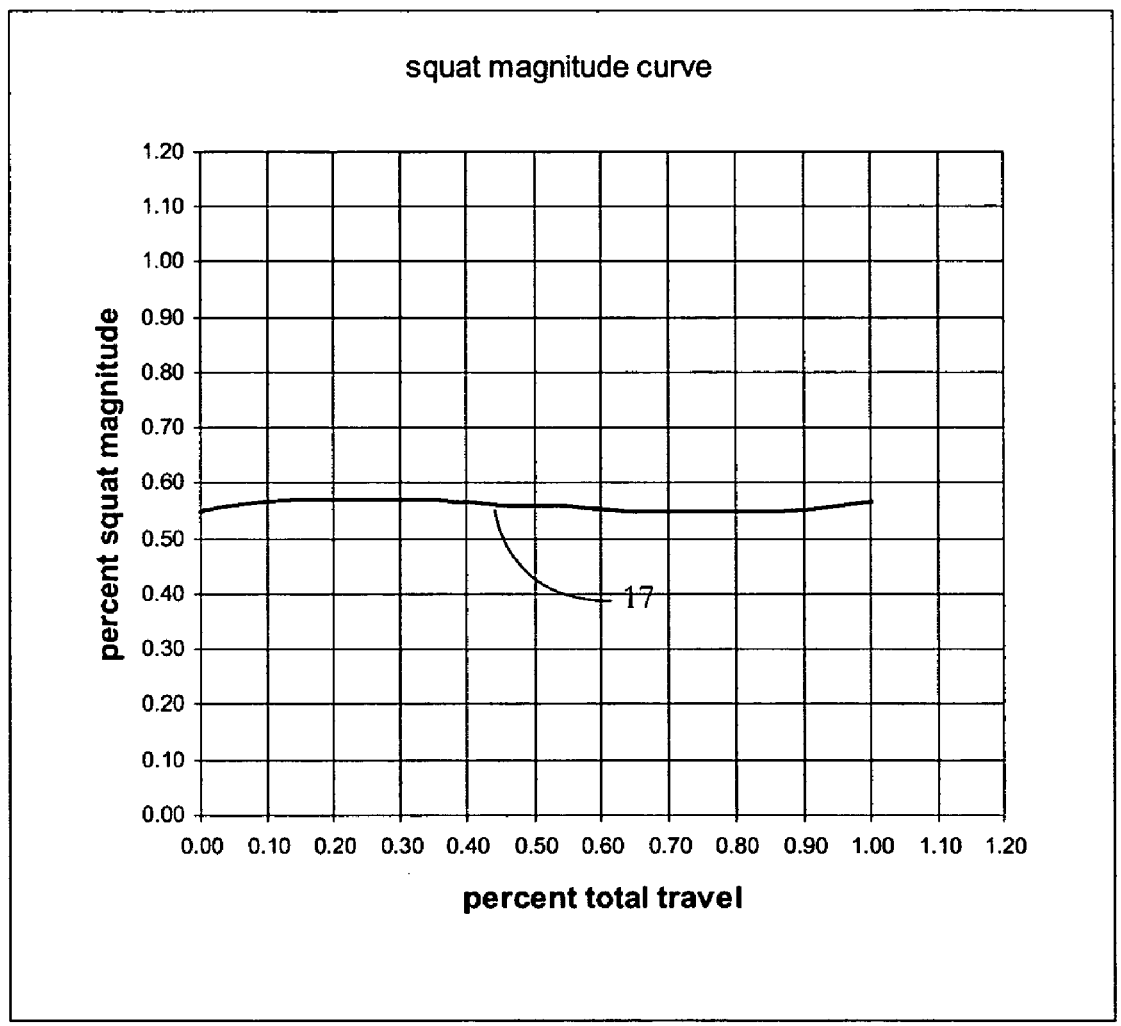
FIG. 7b shows a squat magnitude curve for suspension systems according to certain embodiments of the invention graphed on a squat magnitude curve graph as disclosed herein. This curve is produced by suspension kinematical geometry as shown in FIGS. 2a, 2b, 2c, 2d, 3a, 3b, 3c, 3d, 5a, 5b, 6a, and 6b.

FIG. 7b shows a stable squat magnitude curve 17 for suspension systems according to certain embodiments of the invention graphed on a squat magnitude curve graph as disclosed herein. The percent of total suspension travel is shown on the x-axis, and the percent of total squat is shown on the y-axis. The stable squat magnitude curve 17 shown in FIG. 7a displays an average value of approximately fifty percent anti squat.

Figure 7C:
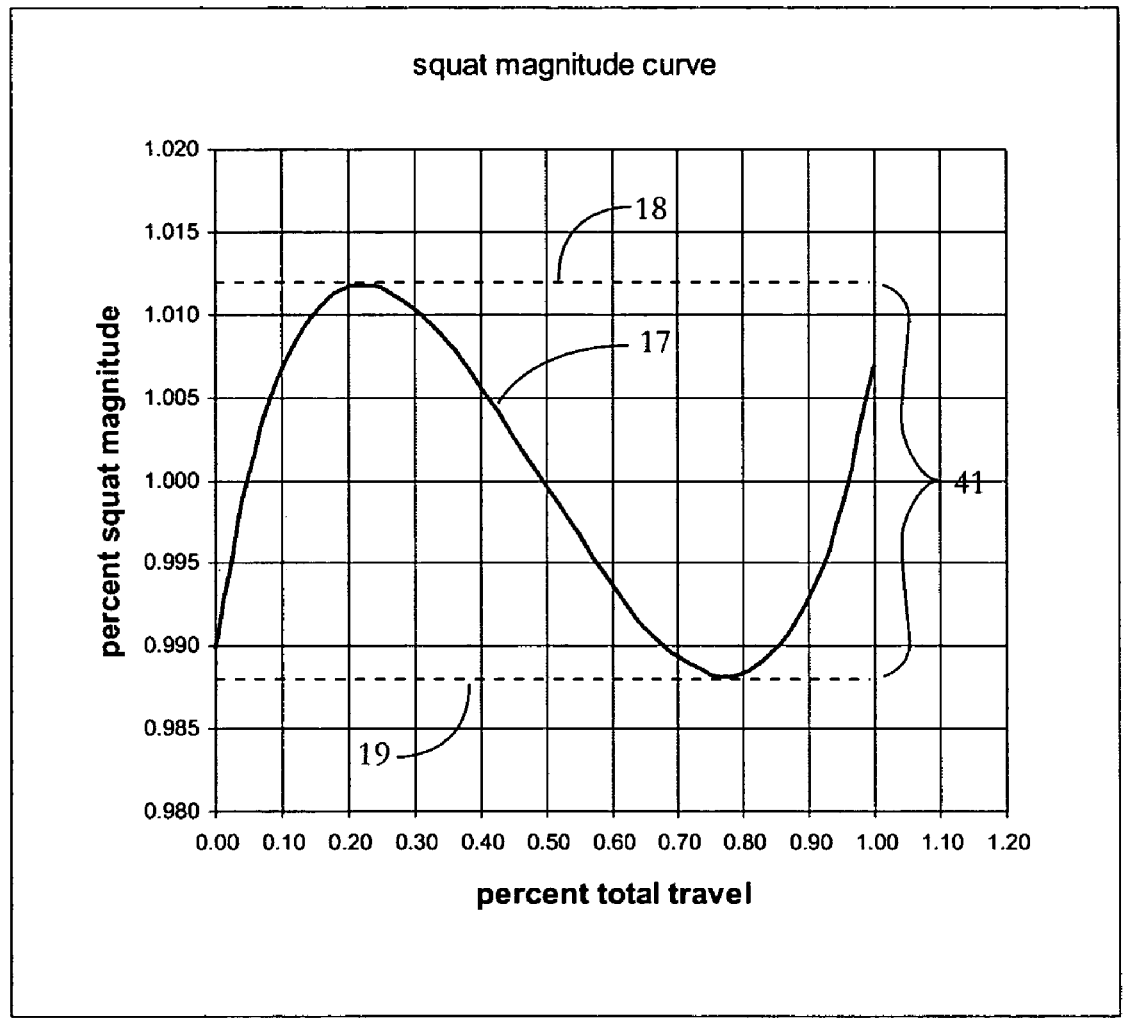
FIG. 7c shows the squat magnitude curve shown in FIG. 7a for suspension systems according to certain embodiments of the invention as graphed on a squat magnitude curve graph as disclosed herein. The curve shown here results from the curve shown in FIG. 7a by changing the scale of the vertical y-axis while maintaining the scale of the horizontal x-axis. This curve is produced by suspension kinematical geometry as shown in FIGS. 2a, 2b, 2c, 2d, 3a, 3b, 3c, 3d, 5a, 5b, 6a, and 6b and shows upper and lower bounds for determining a percent squat magnitude variation.

FIG. 7c shows a closer view of the stable squat magnitude curve 17 for suspension systems according to certain embodiments of the invention graphed on a squat magnitude curve graph as disclosed herein and as shown in FIG. 7a. The percent of total suspension travel is shown on the x-axis, and the percent of total squat is shown on the y-axis. The stable squat magnitude curve 17 shown in FIG. 7a displays an average value of approximately one-hundred percent anti squat. The stable squat magnitude curve 17 defines a squat magnitude curve upper bound (18), a squat magnitude curve lower bound (19), and a percent squat magnitude variation (41).

Figure 8:
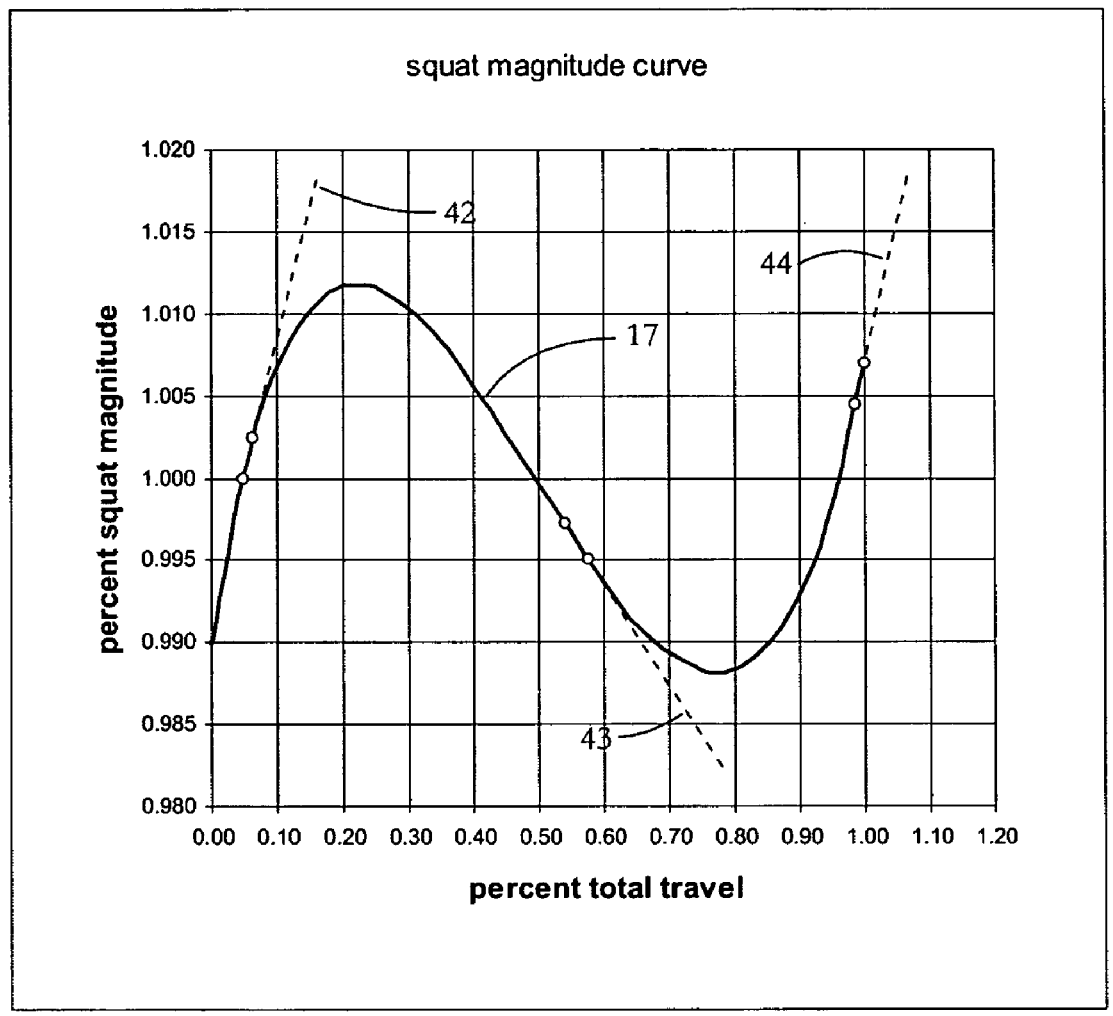
FIG. 8 shows the squat magnitude curve shown in FIG. 7a for suspension systems according to certain embodiments of the invention as graphed on a squat magnitude curve graph as disclosed herein. The curve shown here results from the curve shown in FIG. 7a by changing the scale of the vertical y-axis while maintaining the scale of the horizontal x-axis. This curve is produced by suspension kinematical geometry as shown in FIGS. 2a, 2b, 2c, 2d, 3a, 3b, 3c, 3d, 5a, 5b, 6a, and 6b and illustrates the varying slope of a squat magnitude curve of the invention.

FIG. 8 shows a squat magnitude curve for suspension systems according to certain embodiments of the invention. The percent of total suspension travel is shown on the x-axis, and the percent of total squat is shown on the y-axis. FIG. 8 exemplifies a squat magnitude curve 17 with tangent lines depicting a slope of the curve at certain points along the squat magnitude curve. The slopes exemplified by the tangent lines are a first squat magnitude curve slope (42), a second squat magnitude curve slope (43), a third squat magnitude curve slope (44). FIG. 8 exemplifies a slope of the squat magnitude curve 17 as produced by a suspension system of certain embodiments of the current invention, for example, a suspension system including features as illustrated in FIGS. 2a-2d and FIGS. 5a and 14d, and that the slope varies as the vehicle suspension travel distance increases. The squat magnitude curve 17 produced has a first squat magnitude curve slope 42 that has a positive value at the beginning point in the suspension travel, and a second squat magnitude curve slope 43 at an interim point that has a negative value, and a third squat magnitude curve slope 44 at the ending point in the suspension travel that has a positive value.

FIG. 9 shows a stable squat magnitude curve 17 for suspension systems according to certain embodiments of the invention for example, a suspension system including features as illustrated in FIGS. 1a-1d, graphed on a squat magnitude curve graph as disclosed herein. The percent of total suspension travel is shown on the x-axis, and the percent of total squat is shown on the y-axis FIG. 10 shows a closer view of the stable squat magnitude curve 17 for suspension systems according to certain embodiments of the invention graphed on a squat magnitude curve graph as disclosed herein and as shown in FIG. 9. The percent of total suspension travel is shown on the x-axis, and the percent of total squat is shown on the y-axis. The stable squat magnitude curve 17 shown in FIG. 10 displays an average value of approximately one-hundred percent anti squat. The stable squat magnitude curve 17 defines a squat magnitude curve upper bound (18), a squat magnitude curve lower bound (19), and a percent squat magnitude variation (41).

FIG. 11 shows a stable squat magnitude curve 17 for suspension systems according to certain embodiments of the invention for example, a suspension system including features as illustrated in FIGS. 4a and 4b, graphed on a squat magnitude curve graph as disclosed herein. The percent of total suspension travel is shown on the x-axis, and the percent of total squat is shown on the y-axis FIG. 12 shows a closer view of the stable squat magnitude curve 17 for suspension systems according to certain embodiments of the invention graphed on a squat magnitude curve graph as disclosed herein and as shown in FIG. 11. The percent of total suspension travel is shown on the x-axis, and the percent of total squat is shown on the y-axis. The stable squat magnitude curve 17 shown in FIG. 12 displays an average value of approximately one-hundred percent anti squat. The stable squat magnitude curve 17 defines a squat magnitude curve upper bound (18), a squat magnitude curve lower bound (19), and a percent squat magnitude variation (41).

Figure 13:
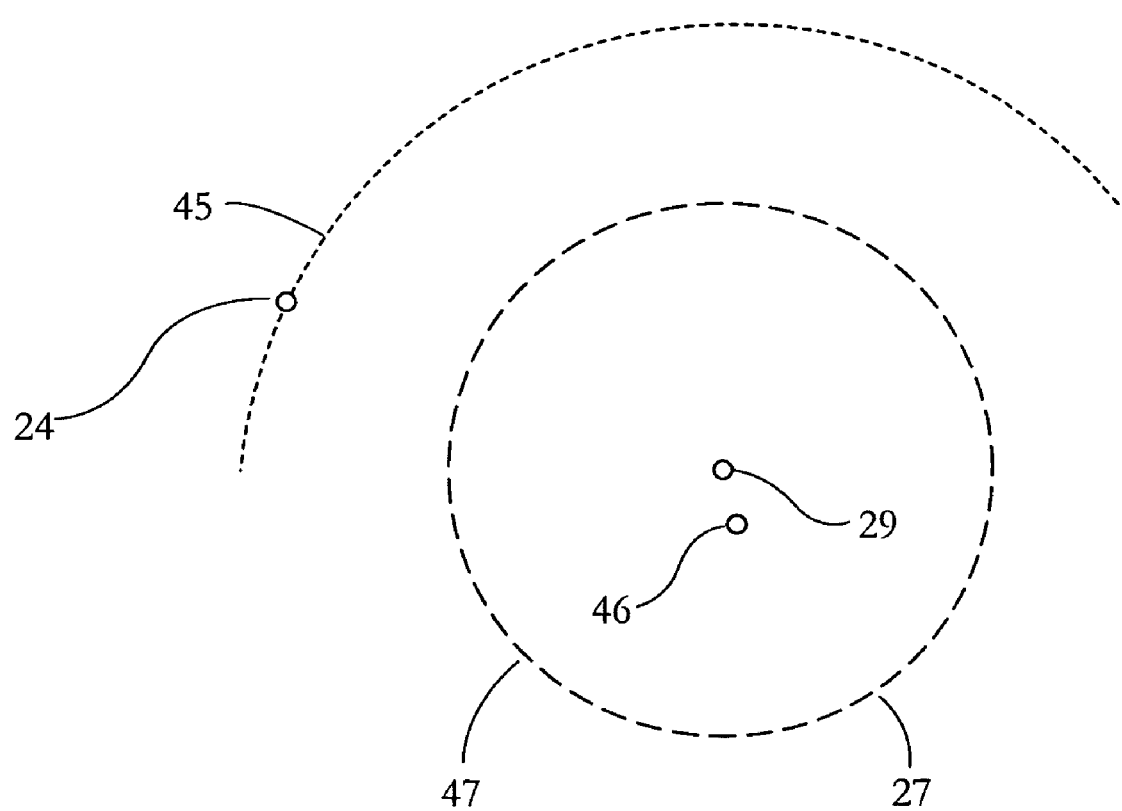
FIG. 13 shows an instant force center that follows a defined instant force center path with an instant force center path focus as projected by compressible chain driven vehicle suspensions of the invention.

FIG. 13 shows an instant force center 24 which is described by a linkage system for controlling a driven wheel axle path 14. The instant force center 24 travels on an instant force center path 45 with an approximate instant force center path focus (46). A suspension layout as shown in FIGS. 1a, 1b, 1c, 1d, 4a, and 4b can produce an instant force center path 45. This instant force center path focus 46 may traverse distances during the driven wheel suspension travel distance 15. The instant force center path 45 has an instant force center path focus 46 located within the pitch diameter (47) of a driving cog 27 for a percentage of the driven wheel suspension travel distance 15.

Figure 14:
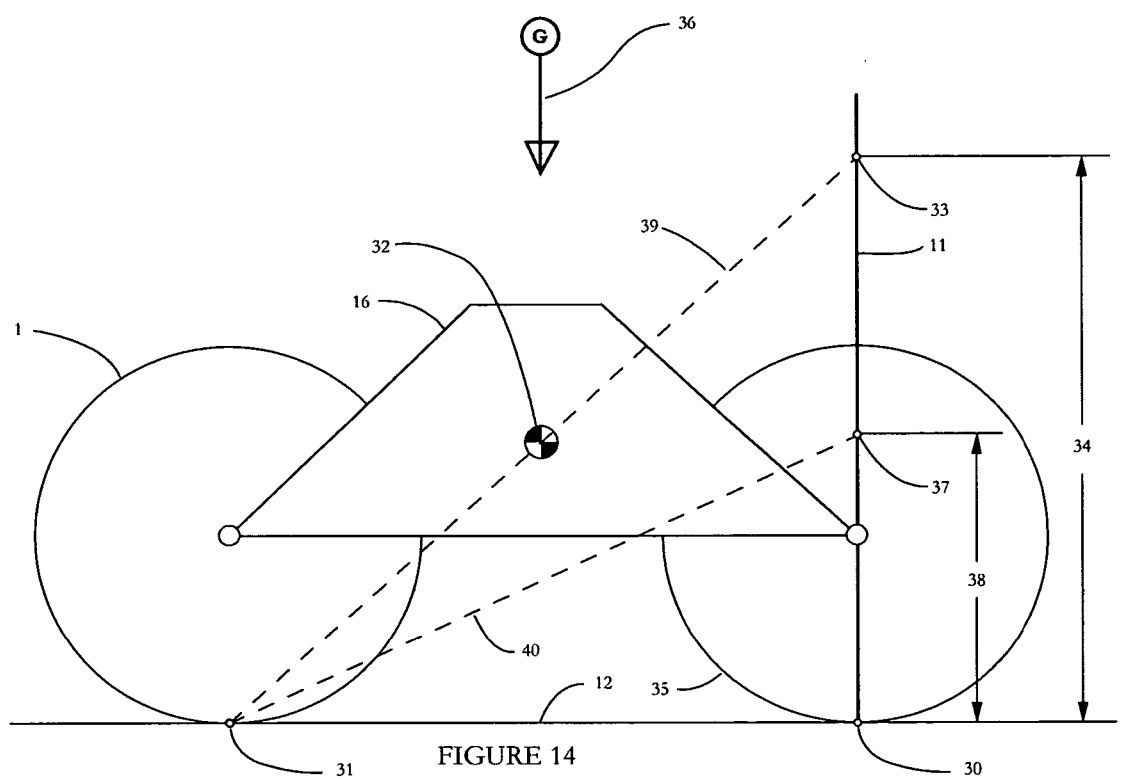
FIG. 14 is a side view of a vehicle with a center of mass shown with kinematical geometry used to determine a squat magnitude definition point.

FIG. 14 presents a graphical method useful to attain a squat magnitude definition point location, and a graphical method to attain a squat magnitude definition point location from existing measured or planned desired vehicle geometry. Shown in FIG. 14 are the following: driven wheel (1); squat layout line (11); lower squat measurement definition line (12); vehicle chassis (16); center of the driven wheel tire to ground contact patch (31); vehicle center of sprung mass (32); 200 percent squat point (33); 200 percent measurement value (34); forward wheel (35); direction of gravity (36); squat magnitude definition point (37); squat magnitude (38); center of mass intersection vector (39); squat magnitude definition vector (40).

FIG. 14 exemplifies graphing the vehicle center of sprung mass 32 in relation to the vehicle chassis 16. A center of mass intersection vector 39 is drawn from the center of the driven wheel tire to ground contact patch 31, through the center of sprung mass 32, and terminating on the squat layout line 11. The point at which the center of mass intersection vector 39 meets the squat layout line 11 is defined as the 200 percent squat point 33. The distance between the 200 percent squat point 33 and the squat lower measurement definition line 12 is referred to as the 200 percent measurement value 34. This 200 percent measurement value 34 is used as a reference to determine squat magnitude 38 value. The distance between the graphed squat magnitude definition point 37 and the squat lower measurement definition line 12 is referred to as the squat measurement definition value 37. Both the 200 percent squat point 33 and the squat measurement definition value 37 are graphed on the squat layout line 11.

Figure 15:
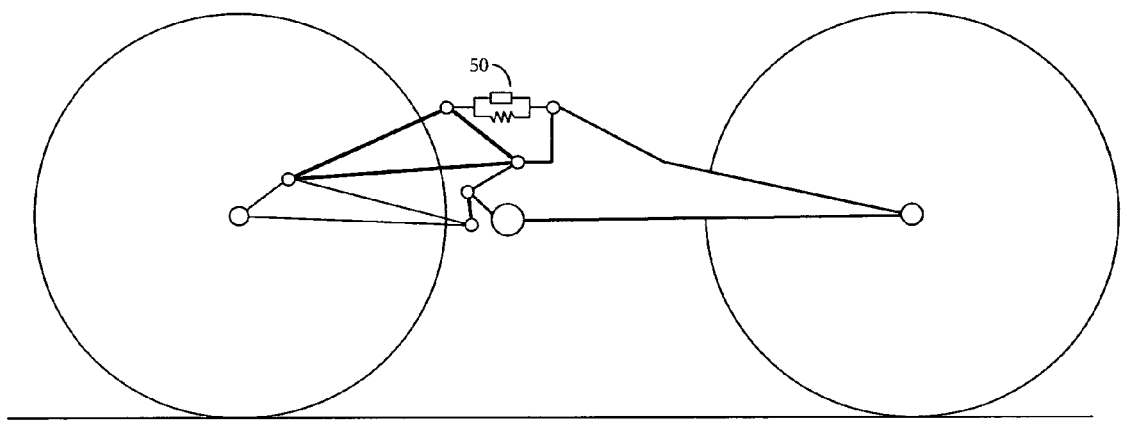
FIGS. 15-37 show alternative embodiments of suspension systems comprising a squat magnitude curve of the invention. Each embodiment shown includes a spring/damper unit (small irregular box) and different frame members (thicker lines) interconnected through pivots (small circles).

FIG. 15 illustrates the possible placement of a damper unit (50) in a vehicle with the chain driven vehicle suspension layout as first illustrated in FIG. 1a which can produce the squat magnitude curve 17 of the invention.

Figure 16:
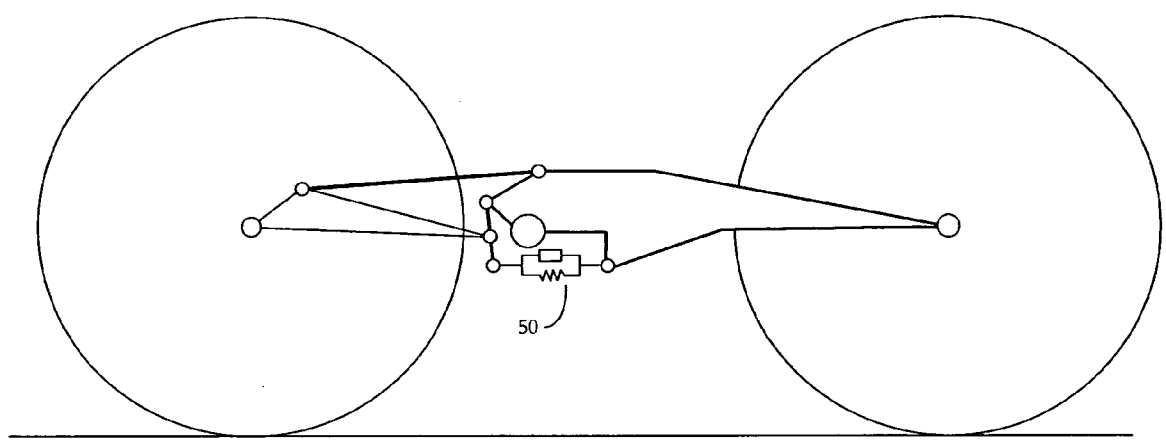

FIG. 16 illustrates the possible placement of a damper unit (50) in a vehicle with the chain driven vehicle suspension layout as first illustrated in FIG. 1a which can produce the squat magnitude curve 17 of the invention.

Figure 17:
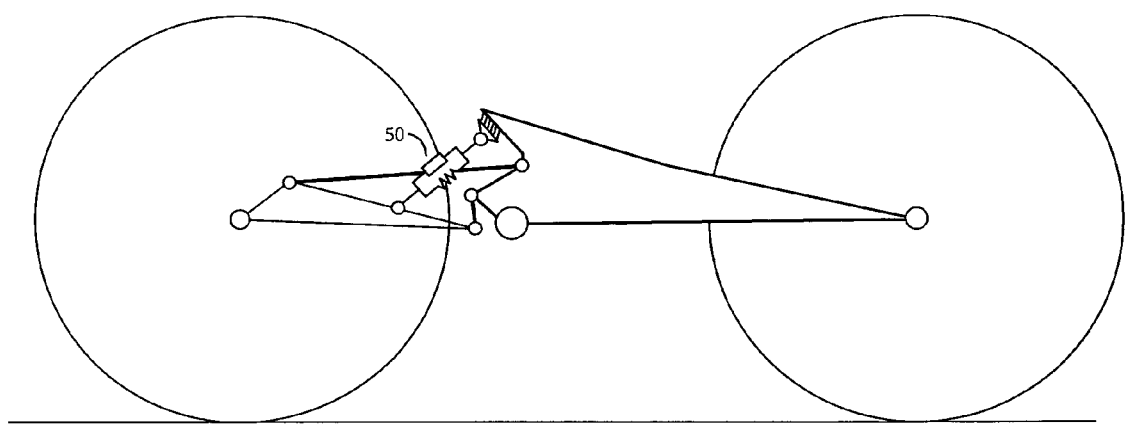

FIG. 17 illustrates the possible placement of a damper unit (50) in a vehicle with the chain driven vehicle suspension layout as first illustrated in FIG. 1a which can produce the squat magnitude curve 17 of the invention.

Figure 18:
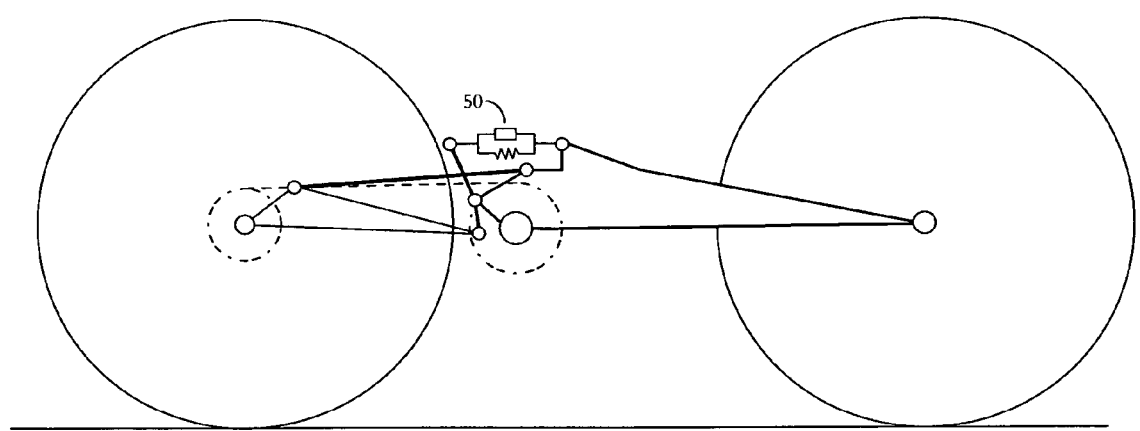

FIG. 18 illustrates the possible placement of a damper unit (50) in a vehicle with the chain driven vehicle suspension layout as first illustrated in FIG. 1a which can produce the squat magnitude curve 17 of the invention.

Figure 19:
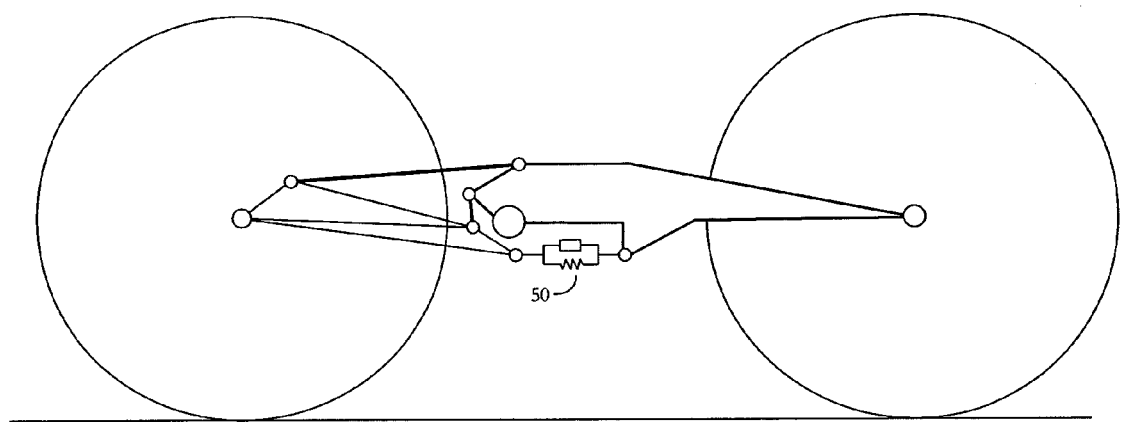

FIG. 19 illustrates the possible placement of a damper unit (50) in a vehicle with the chain driven vehicle suspension layout as first illustrated in FIG. 1a which can produce the squat magnitude curve 17 of the invention.

Figure 20:
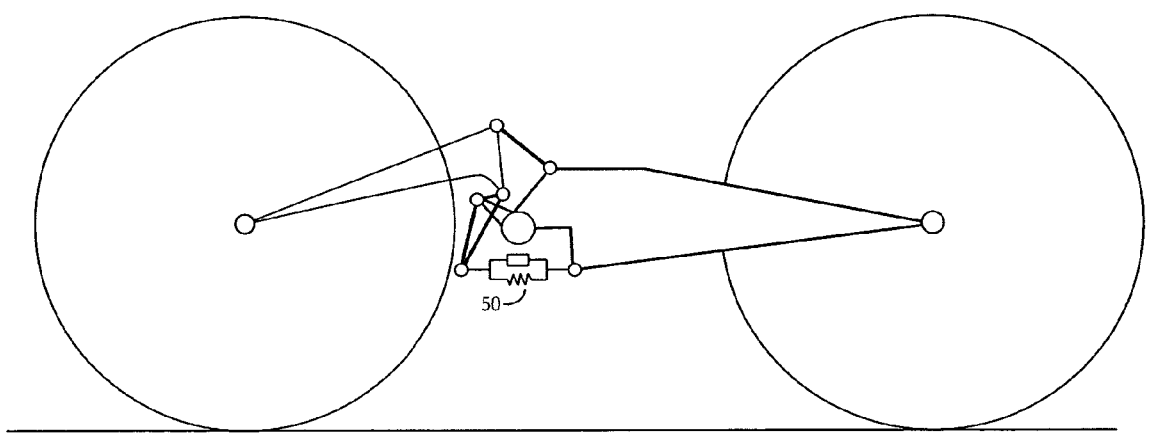

FIG. 20 illustrates the possible placement of a damper unit (50) in a vehicle with the chain driven vehicle suspension layout as first illustrated in FIG. 2a which can produce the squat magnitude curve 17 of the invention.

Figure 21:
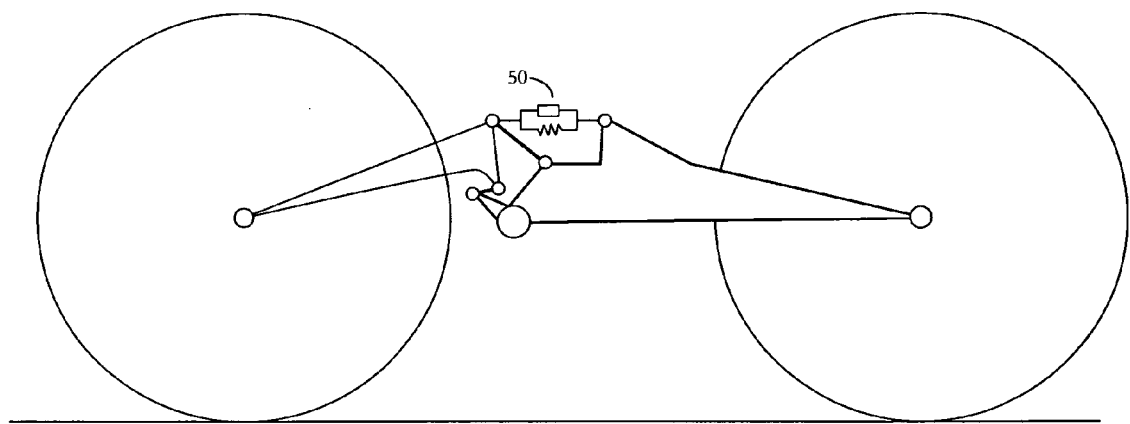

FIG. 21 illustrates the possible placement of a damper unit (50) in a vehicle with the chain driven vehicle suspension layout as first illustrated in FIG. 2a which can produce the squat magnitude curve 17 of the invention.

Figure 22:
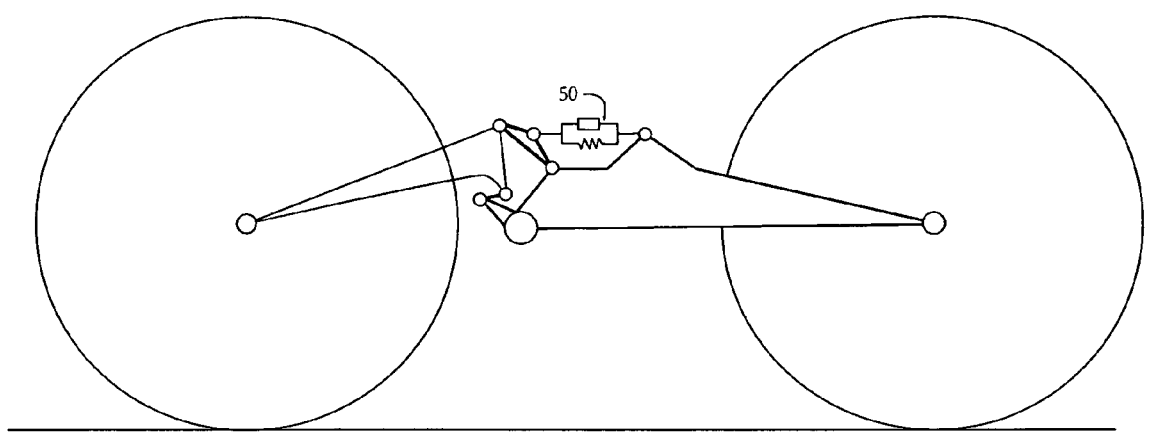

FIG. 22 illustrates the possible placement of a damper unit (50) in a vehicle with the chain driven vehicle suspension layout as first illustrated in FIG. 2a which can produce the squat magnitude curve 17 of the invention.

Figure 23:
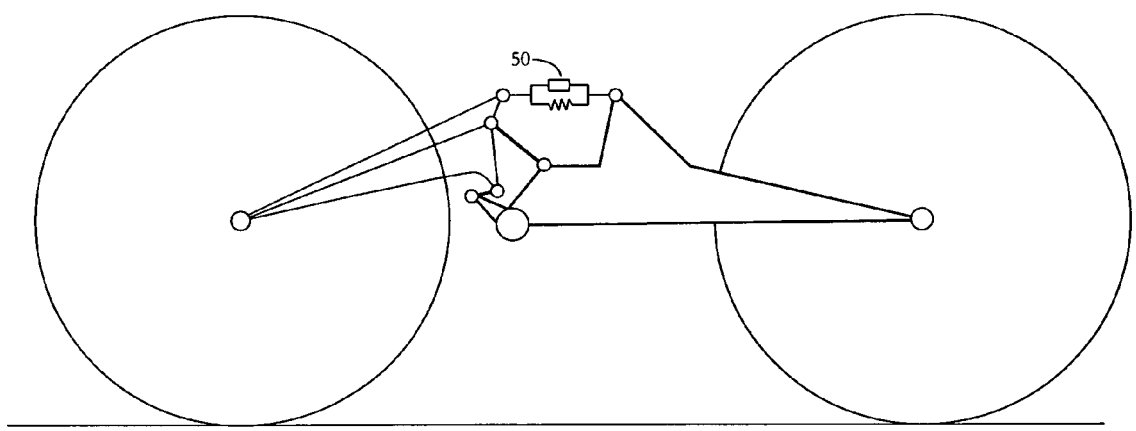

FIG. 23 illustrates the possible placement of a damper unit (50) in a vehicle with the chain driven vehicle suspension layout as first illustrated in FIG. 2a which can produce the squat magnitude curve 17 of the invention.

Figure 24:
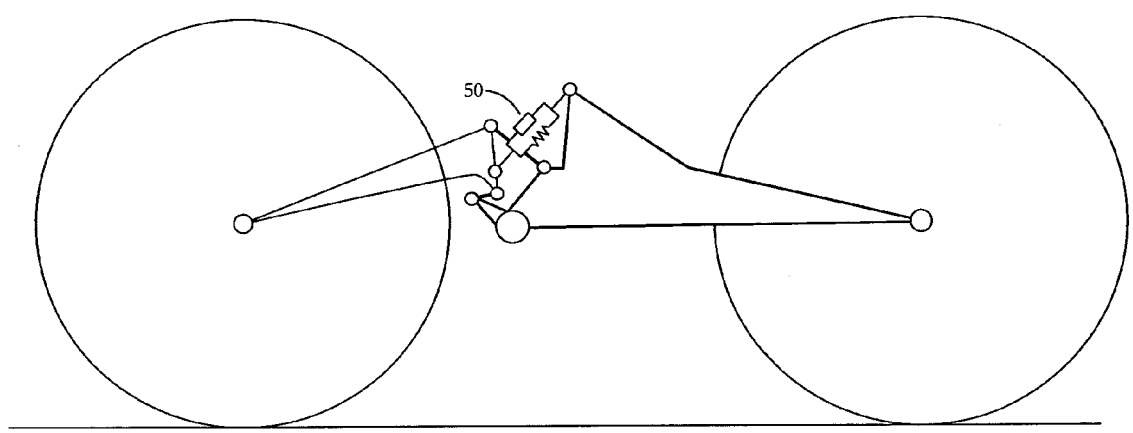

FIG. 24 illustrates the possible placement of a damper unit (50) in a vehicle with the chain driven vehicle suspension layout as first illustrated in FIG. 2a which can produce the squat magnitude curve 17 of the invention.

Figure 25:
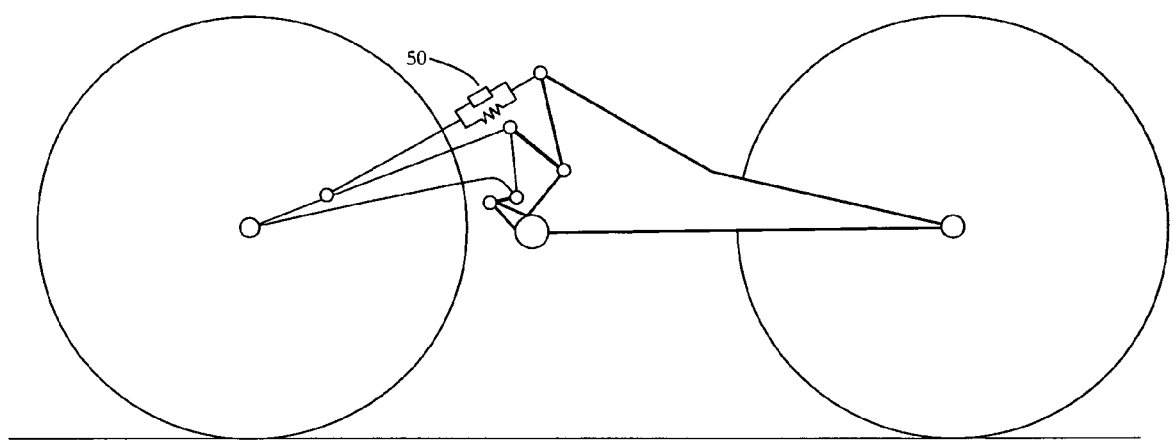

FIG. 25 illustrates the possible placement of a damper unit (50) in a vehicle with the chain driven vehicle suspension layout as first illustrated in FIG. 2a which can produce the squat magnitude curve 17 of the invention.

Figure 26:
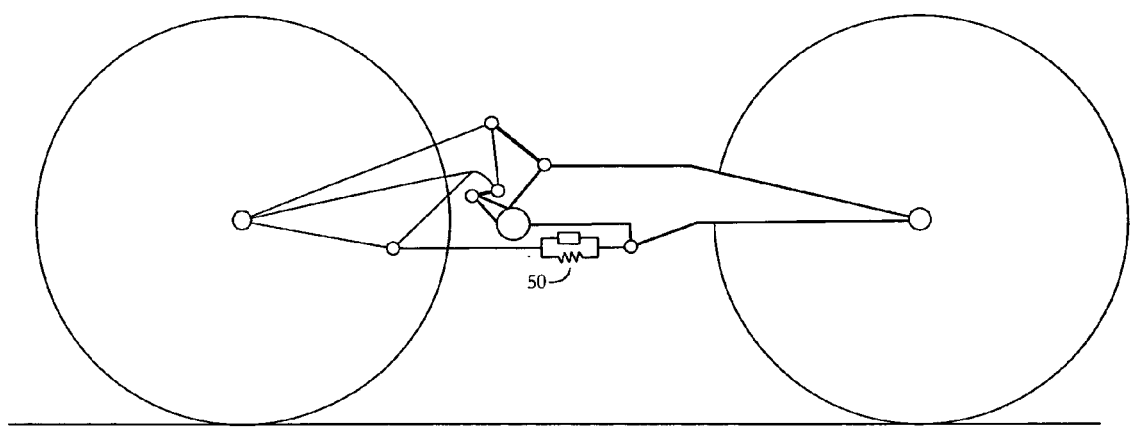

FIG. 26 illustrates the possible placement of a damper unit (50) in a vehicle with the chain driven vehicle suspension layout as first illustrated in FIG. 2a which can produce the squat magnitude curve 17 of the invention.

Figure 27:
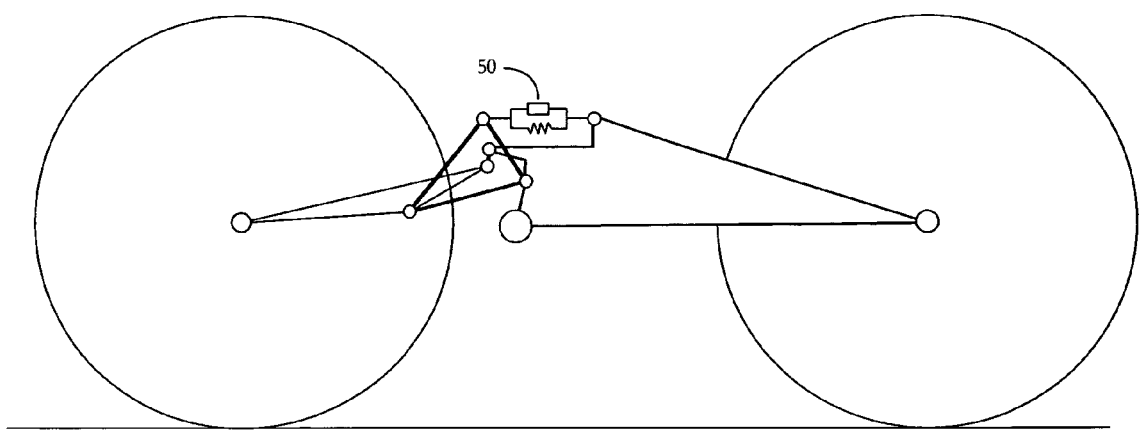

FIG. 27 illustrates the possible placement of a damper unit (50) in a vehicle with the chain driven vehicle suspension layout as first illustrated in FIG. 4a which can produce the squat magnitude curve 17 of the invention.

Figure 28:
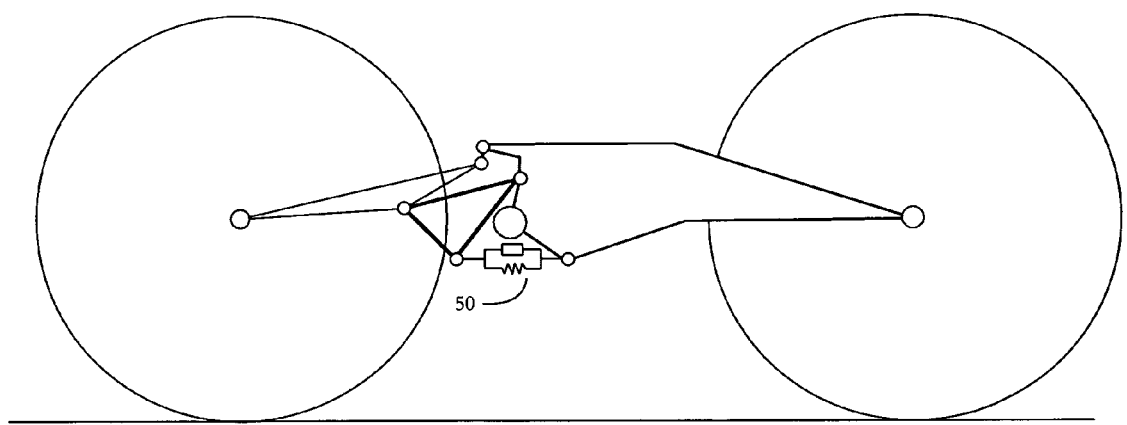

FIG. 28 illustrates the possible placement of a damper unit (50) in a vehicle with the chain driven vehicle suspension layout as first illustrated in FIG. 4a which can produce the squat magnitude curve 17 of the invention.

Figure 29:
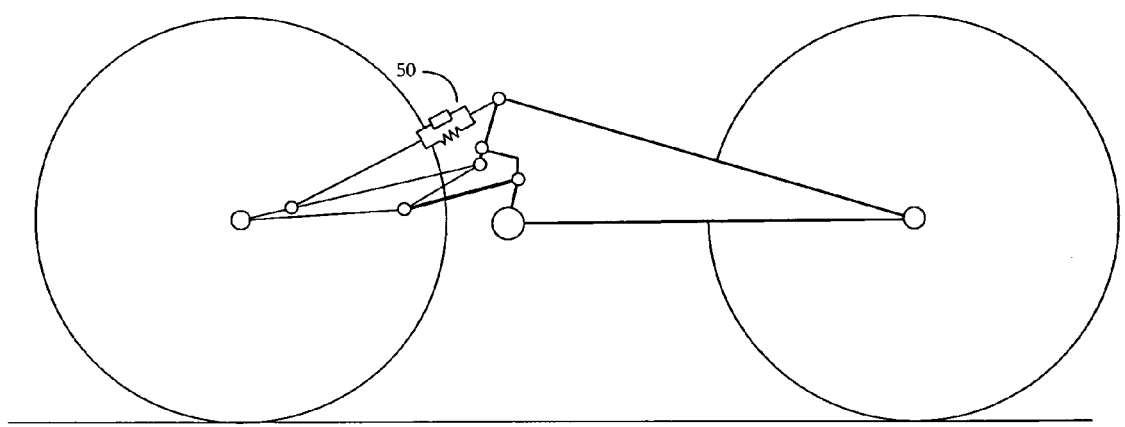

FIG. 29 illustrates the possible placement of a damper unit (50) in a vehicle with the chain driven vehicle suspension layout as first illustrated in FIG. 4a which can produce the squat magnitude curve 17 of the invention.

Figure 30:
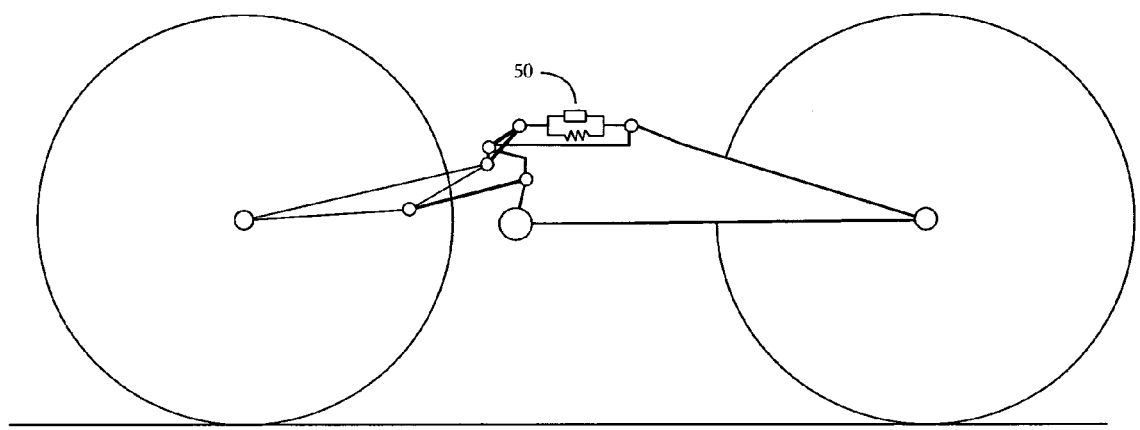

FIG. 30 illustrates the possible placement of a damper unit (50) in a vehicle with the chain driven vehicle suspension layout as first illustrated in FIG. 4a which can produce the squat magnitude curve 17 of the invention.

Figure 31:
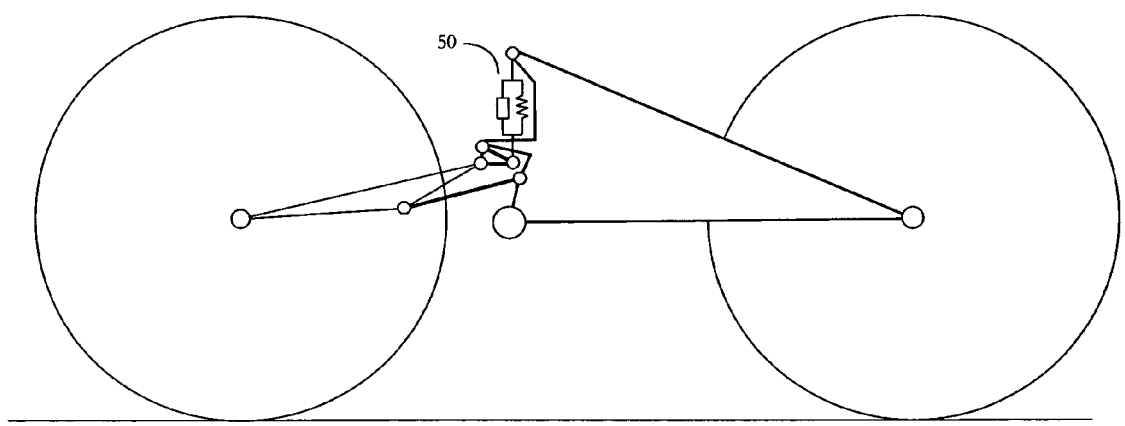

FIG. 31 illustrates the possible placement of a damper unit (50) in a vehicle with the chain driven vehicle suspension layout as first illustrated in FIG. 4a which can produce the squat magnitude curve 17 of the invention.

Figure 32:
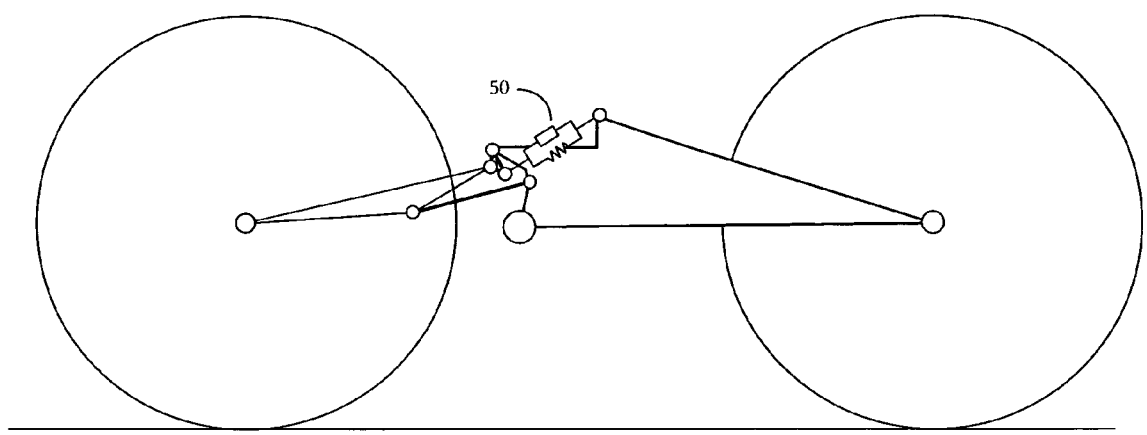

FIG. 32 illustrates the possible placement of a damper unit (50) in a vehicle with the chain driven vehicle suspension layout as first illustrated in FIG. 4a which can produce the squat magnitude curve 17 of the invention.

Figure 33:
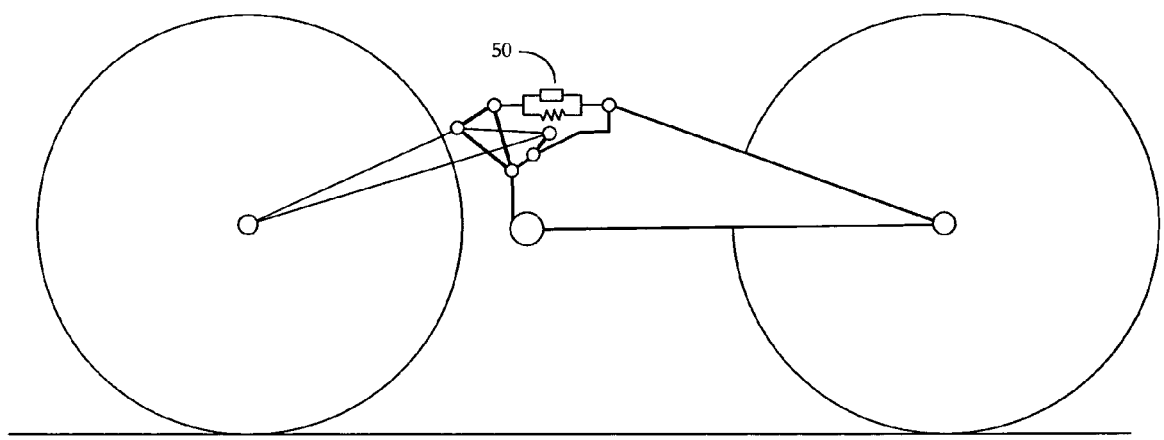

FIG. 33 illustrates the possible placement of a damper unit (50) in a vehicle with the chain driven vehicle suspension layout as first illustrated in FIG. 5a which can produce the squat magnitude curve 17 of the invention.

Figure 34:
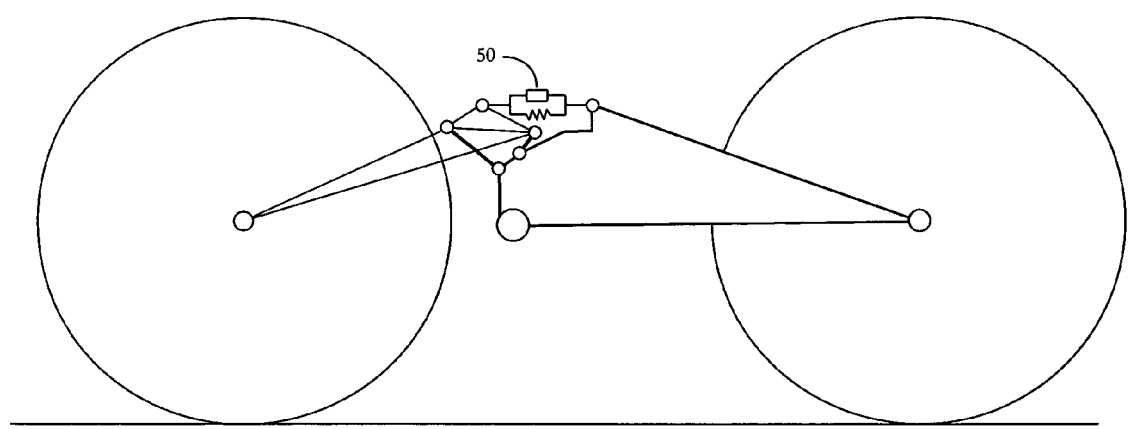

FIG. 34 illustrates the possible placement of a damper unit (50) in a vehicle with the chain driven vehicle suspension layout as first illustrated in FIG. 5a which can produce the squat magnitude curve 17 of the invention.

Figure 35:
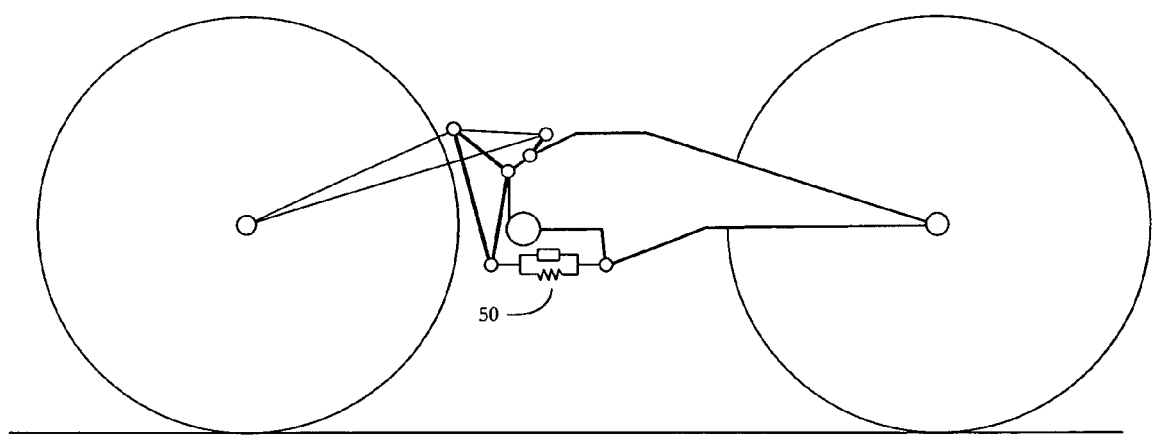

FIG. 35 illustrates the possible placement of a damper unit (50) in a vehicle with the chain driven vehicle suspension layout as first illustrated in FIG. 5a which can produce the squat magnitude curve 17 of the invention.

Figure 36:
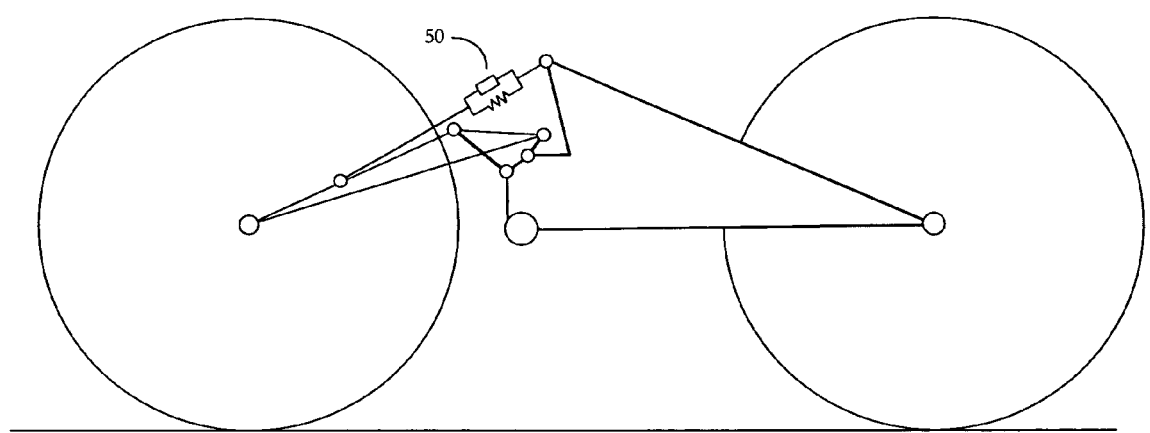

FIG. 36 illustrates the possible placement of a damper unit (50) in a vehicle with the chain driven vehicle suspension layout as first illustrated in FIG. 5a which can produce the squat magnitude curve 17 of the invention.

Figure 37:
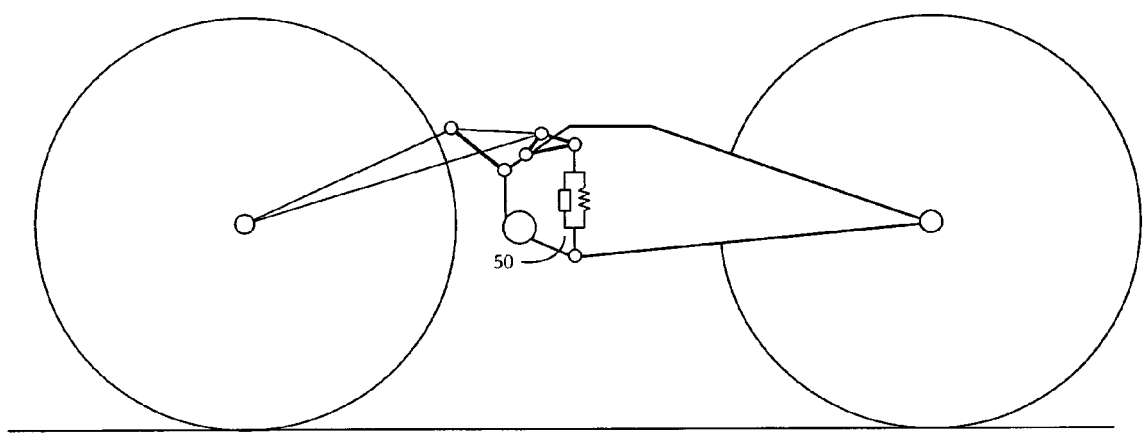

FIG. 37 illustrates the possible placement of a damper unit (50) in a vehicle with the chain driven vehicle suspension layout as first illustrated in FIG. 5a which can produce the squat magnitude curve 17 of the invention.

Figure 38:
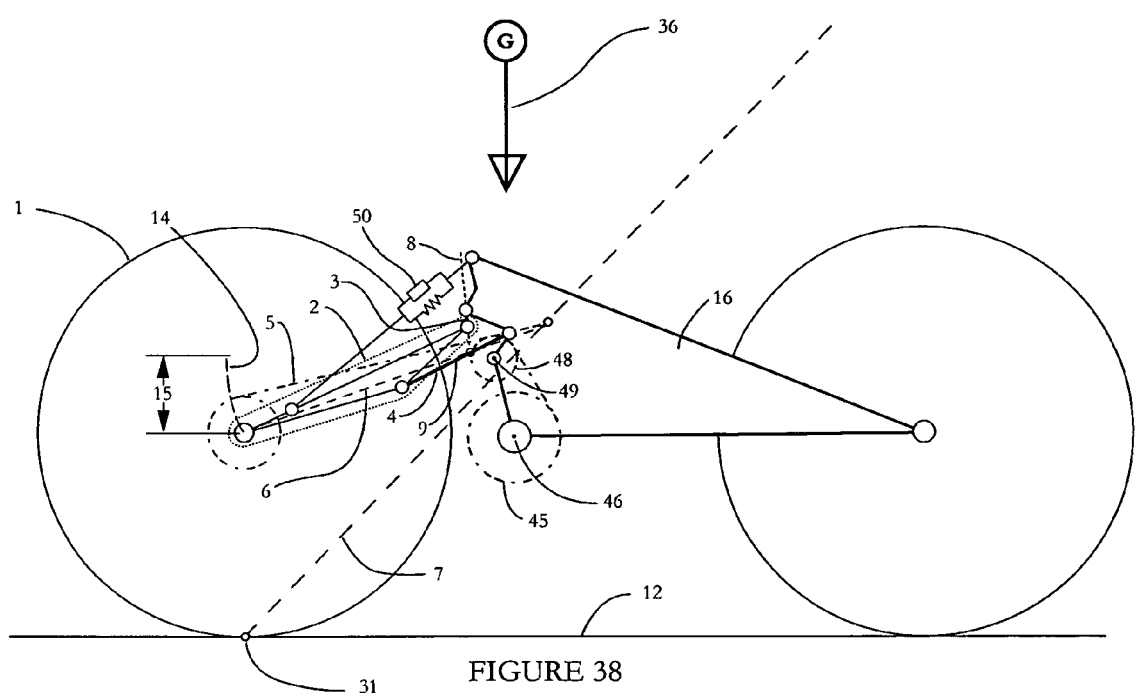
FIG. 38 is a side view of a chain driven vehicle using a driven wheel suspension system first shown in FIG. 4a that achieves a stable squat magnitude curve according to certain embodiments of the current invention. The vehicle is shown with the driven wheel suspension system in an uncompressed state. The vehicle uses a driven idler cog to define a chain force line.

FIG. 38 shows a variation on the chain driven vehicle shown in FIG. 4, where a driven idler cog (48) is represented by its driven idler cog pitch diameter, and rotates around a driven idler cog rotation axis (49) which is fixed to a vehicle chassis 16. The chain force vector 6 direction is controlled by the driven idler cog 48, and therefore, vehicle suspension geometry must be altered to achieve the desired squat magnitude curve 17. Also shown is a spring damper unit (50).

Figure 39:
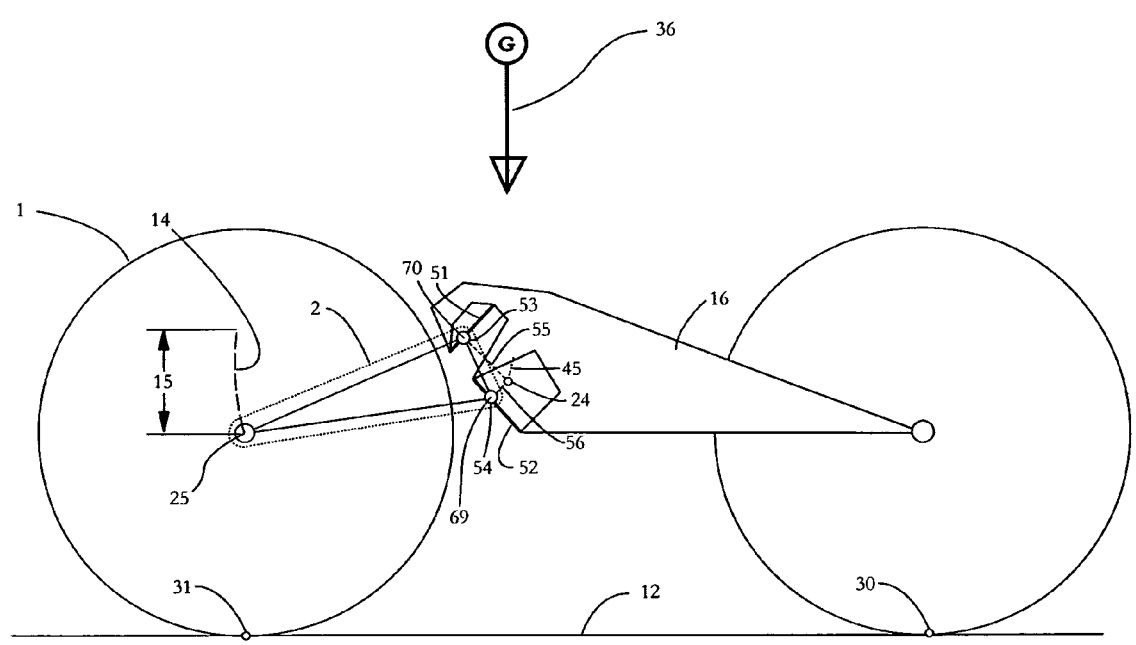
FIG. 39 is a side view of a shaft or spindle driven vehicle using a driven wheel suspension system that achieves a stable squat magnitude curve according to certain embodiments of the current invention. The vehicle is shown with the driven wheel suspension system in an uncompressed state. The vehicle suspension system uses carrier manipulation tracks and carrier manipulation sliders to define wheel carrier link movement.

FIG. 39 illustrates a sliding element type shaft driven or spindle driven suspension system of the invention and it presents a graphical method useful to determine instant force center movement. Shown in FIG. 39 are the following: driven wheel (1); wheel carrier link (2); lower squat measurement definition line (12); driven wheel axle path (14); driven wheel suspension travel distance (15); vehicle chassis (16); instant force center (24); driven wheel rotation axis (25); center of the forward wheel tire to ground contact patch (30); center of the driven wheel tire to ground contact patch (31); direction of gravity (36); first carrier manipulation track (51); second carrier manipulation track (52); first carrier manipulation slider (53); second carrier manipulation slider (54); first carrier manipulation slider force vector (55); second carrier manipulation slider force vector (56); first carrier manipulation slider pivot (69); second carrier manipulation slider pivot (70)

FIG. 39 shows a sliding element type suspension layout in an uncompressed state. A sliding element type suspension layout can contain a first carrier manipulation track 51 and a second carrier manipulation track 52. The first carrier manipulation track 51 and second carrier manipulation track 52 can be straight linear, or curved in shape. A first carrier manipulation slider 53 rides on the first carrier manipulation track 51 and the second carrier manipulation slider 54 rides on the second carrier manipulation track 52 so that the each slider's motion is defined by following the path of the track. A wheel carrier link 2 is pivotally attached to the first carrier manipulation slider 53 and second carrier manipulation slider 54 so that movement of the wheel carrier link is governed by movement of the first carrier manipulation slider 53 and second carrier manipulation slider 54. The first carrier manipulation slider 53 projects a first carrier manipulation slider force vector 55, which is projected perpendicular to the path of the track at the center of the first carrier manipulation slider pivot 69. The second carrier manipulation slider 54 projects a second carrier manipulation slider force vector 56, which is projected perpendicular to the path of the track from the center of the second carrier manipulation slider pivot 70. The intersection of the first carrier manipulation slider force vector 55 and second carrier manipulation slider force vector 56 describes the location of an instant force center 24. As the driven wheel 1 moves compressively through its driven wheel suspension travel distance 15, its instant center moves along an instant force center path 45.

Figure 40:
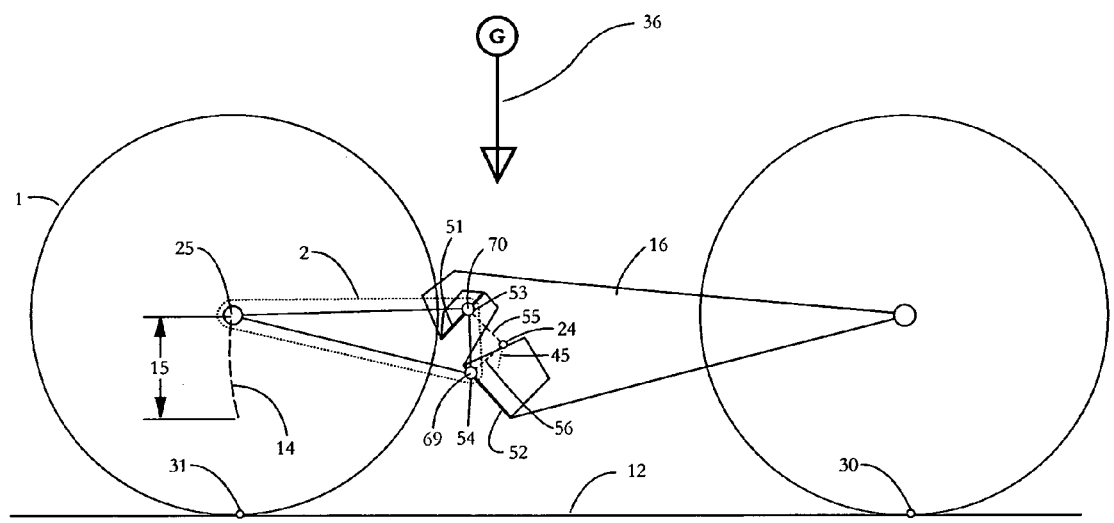
FIG. 40 is a side view of a shaft or spindle driven vehicle using a driven wheel suspension system that achieves a stable squat magnitude curve according to certain embodiments of the current invention. The vehicle is shown with the driven wheel suspension system in an compressed state. The vehicle suspension system uses carrier manipulation tracks and carrier manipulation sliders to define wheel carrier link movement.

FIG. 40 illustrates a sliding element type shaft driven or spindle driven suspension system of the invention and it presents a graphical method useful to determine instant force center movement. Shown in FIG. 39 are the following: driven wheel (1); wheel carrier link (2); lower squat measurement definition line (12); driven wheel axle path (14); driven wheel suspension travel distance (15); vehicle chassis (16); instant force center (24); driven wheel rotation axis (25); center of the forward wheel tire to ground contact patch (30); center of the driven wheel tire to ground contact patch (31); direction of gravity (36); first carrier manipulation track (51); second carrier manipulation track (52); first carrier manipulation slider (53); second carrier manipulation slider (54); first carrier manipulation slider force vector (55); second carrier manipulation slider force vector (56); first carrier manipulation slider pivot (69); second carrier manipulation slider pivot (70)

FIG. 40 shows a sliding element type suspension layout in a compressed state. A sliding element type suspension layout can contain a first carrier manipulation track 51 and a second carrier manipulation track 52. The first carrier manipulation track 51 and second carrier manipulation track 52 can be straight linear, or curved in shape. A first carrier manipulation slider 53 rides on the first carrier manipulation track 51 and the second carrier manipulation slider 54 rides on the second carrier manipulation track 52 so that the each slider's motion is defined by following the path of the track. A wheel carrier link 2 is pivotally attached to the first carrier manipulation slider 53 and second carrier manipulation slider 54 so that movement of the wheel carrier link is governed by movement of the first carrier manipulation slider 53 and second carrier manipulation slider 54. The first carrier manipulation slider 53 projects a first carrier manipulation slider force vector 55, which is projected perpendicular to the path of the track at the center of the first carrier manipulation slider pivot 69. The second carrier manipulation slider 54 projects a second carrier manipulation slider force vector 56, which is projected perpendicular to the path of the track from the center of the second carrier manipulation slider pivot 70. The intersection of the first carrier manipulation slider force vector 55 and second carrier manipulation slider force vector 56 describes the location of an instant force center 24. As the driven wheel 1 moves compressively through its driven wheel suspension travel distance 15, its instant center moves along an instant force center path 45.

Figure 41:
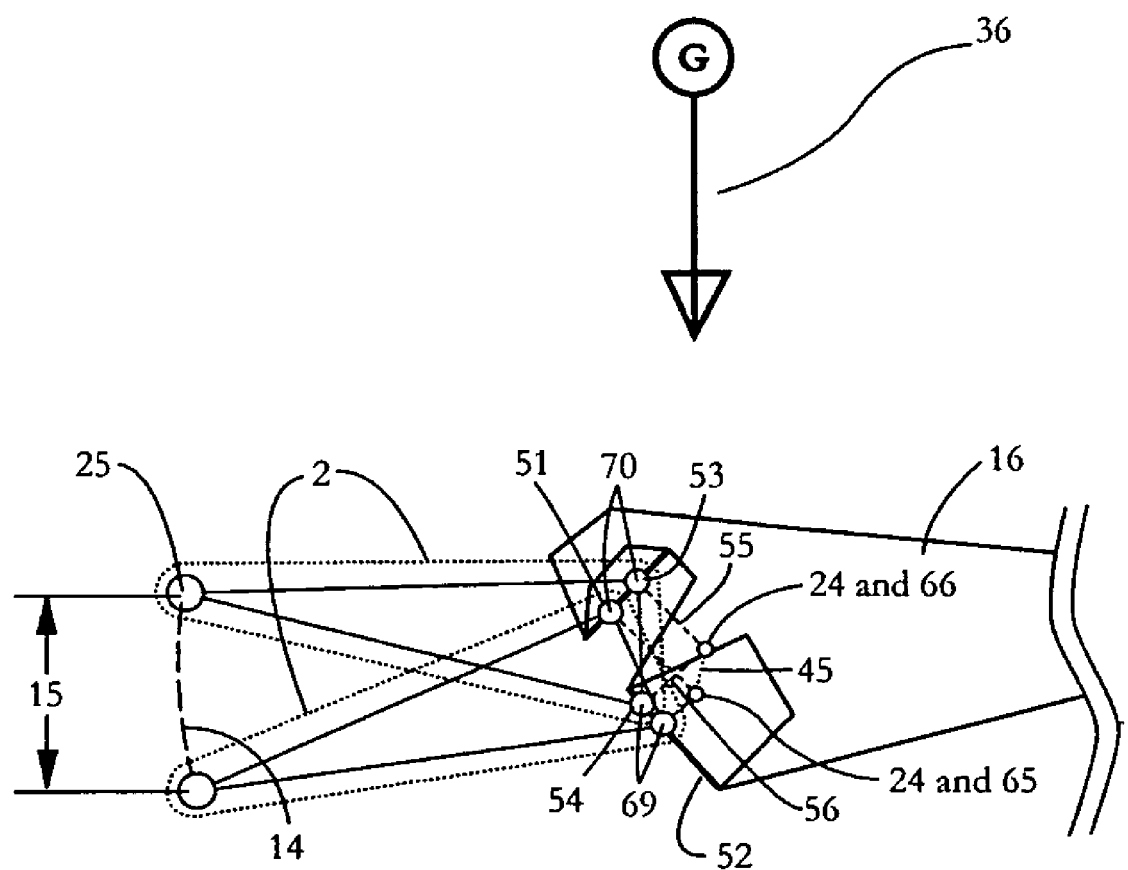
FIG. 41 is a side view of a shaft or spindle driven vehicle using a driven wheel suspension system that achieves a stable squat magnitude curve according to certain embodiments of the current invention. The vehicle is shown with the driven wheel suspension system overlaid in both an uncompressed and compressed state. The vehicle suspension system uses carrier manipulation tracks and carrier manipulation sliders to define wheel carrier link movement.

FIG. 41 illustrates a sliding element type shaft driven or spindle driven suspension system of the invention and it presents a graphical method useful to determine instant force center movement. Shown in FIG. 39 are the following: driven wheel (1); wheel carrier link (2); lower squat measurement definition line (12); driven wheel axle path (14); driven wheel suspension travel distance (15); vehicle chassis (16); instant force center (24); driven wheel rotation axis (25); center of the forward wheel tire to ground contact patch (30); center of the driven wheel tire to ground contact patch (31); direction of gravity (36); first carrier manipulation track (51); second carrier manipulation track (52); first carrier manipulation slider (53); second carrier manipulation slider (54); first carrier manipulation slider force vector (55); second carrier manipulation slider force vector (56); instant force center position uncompressed (65); instant force center position compressed (66); first carrier manipulation slider pivot (69); second carrier manipulation slider pivot (70)

FIG. 41 shows a sliding element type suspension layout in an uncompressed state shown in FIG. 39 overlaid with the sliding element type suspension layout in an compressed state shown in FIG. 40. A sliding element type suspension layout can contain a first carrier manipulation track 51 and a second carrier manipulation track 52. The first carrier manipulation track 51 and second carrier manipulation track 52 can be straight linear, or curved in shape. A first carrier manipulation slider 53 rides on the first carrier manipulation track 51 and the second carrier manipulation slider 54 rides on the second carrier manipulation track 52 so that the each slider's motion is defined by following the path of the track. A wheel carrier link 2 is pivotally attached to the first carrier manipulation slider 53 and second carrier manipulation slider 54 so that movement of the wheel carrier link is governed by movement of the first carrier manipulation slider 53 and second carrier manipulation slider 54. The first carrier manipulation slider 53 projects a first carrier manipulation slider force vector 55, which is projected perpendicular to the path of the track at the center of the first carrier manipulation slider pivot 69. The second carrier manipulation slider 54 projects a second carrier manipulation slider force vector 56, which is projected perpendicular to the path of the track from the center of the second carrier manipulation slider pivot 70. The intersection of the first carrier manipulation slider force vector 55 and second carrier manipulation slider force vector 56 describes the location of an instant force center 24. As the driven wheel 1 moves compressively through its driven wheel suspension travel distance 15, its instant center moves along an instant force center path 45. As the driven wheel 1 moves compressively through its driven wheel suspension travel distance 15, its instant center 24 moves from an instant force center position uncompressed 65 to an instant force center position compressed 66.

Figure 42:
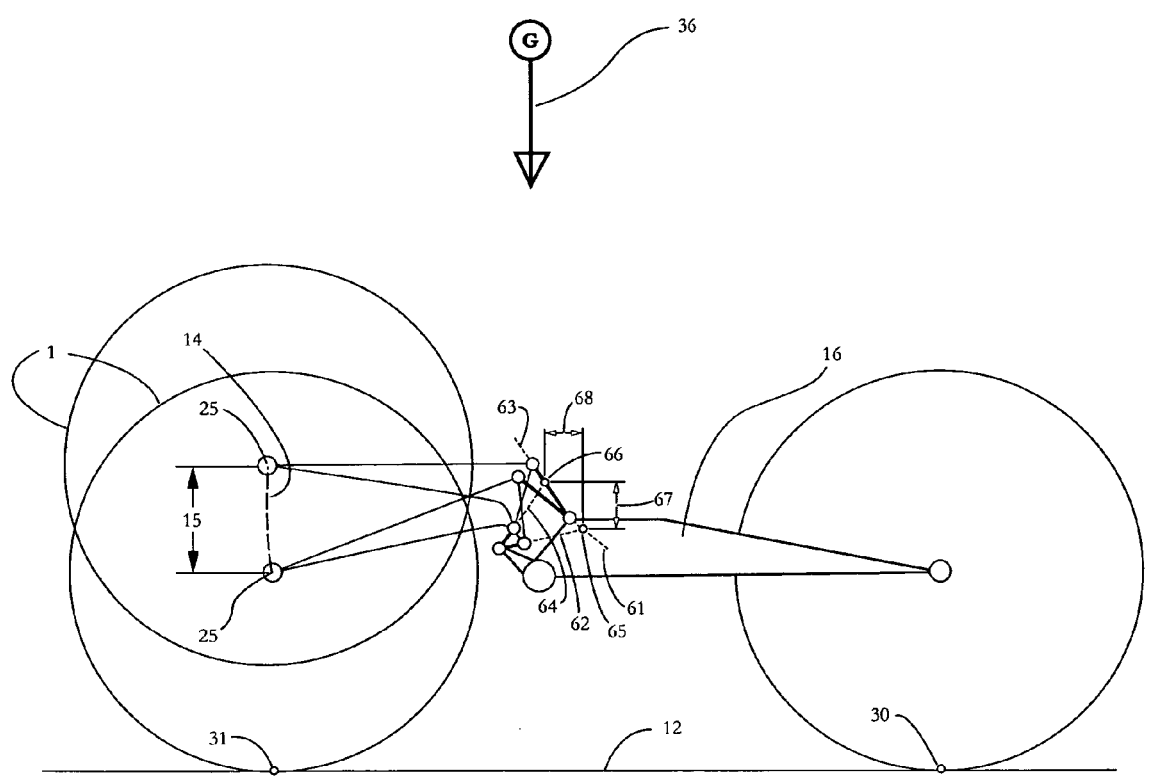
FIG. 42 is a side view of a shaft or spindle driven vehicle using a driven wheel suspension system that achieves a stable squat magnitude curve according to certain embodiments of the current invention. The vehicle is shown with the driven wheel suspension system overlaid in both an uncompressed and compressed state. The vehicle suspension system uses carrier manipulation links to define wheel carrier link movement.

FIG. 42 shows certain embodiments of the invention and it presents a graphical method useful to determine instant force center movement. FIG. 42 uses components and a chassis layout first shown in FIGS. 2*a*, 2*b*, 2*c*, 2*d*, 3*a*, 3*b*, 3*c*, and 3*d*. Shown in FIG. 42 are the following: driven wheel (1); lower squat measurement definition line (12); driven wheel axle path (14); driven wheel suspension travel distance (15); vehicle chassis (16); driven wheel rotation axis (25); center of the forward wheel tire to ground contact patch (30); center of the driven wheel tire to ground contact patch (31); direction of gravity (36); first carrier manipulation link force vector uncompressed (61); second carrier manipulation link force vector uncompressed (62); first carrier manipulation link force vector compressed (63); second carrier manipulation link force vector compressed (64); instant force center position uncompressed (65); instant force center position compressed (66); instant force center upward movement (67); instant force center rearward movement (68).

FIG. 42 exemplifies that as the driven wheel 1 suspension system is completely uncompressed in its driven wheel suspension travel distance 15, its layout projects a first carrier manipulation link force vector uncompressed 61 and a second carrier manipulation slider force vector uncompressed 62, which intersect at an instant force center position uncompressed 65. As the driven wheel 1 suspension moves compressively through its driven wheel suspension travel distance 15, its layout projects a first carrier manipulation link force vector compressed 63 and a second carrier manipulation slider force vector compressed 64, which intersect at an instant force center position compressed 66. As the driven wheel 1 moves compressively through its driven wheel suspension travel distance 15, its instant center moves from an instant force center position uncompressed 65 to an instant force center position compressed 66. A suspension of the invention has a measurable instant force center upward movement 67; or a measurable instant force center rearward movement 68; or a combination of a measurable instant force center upward movement 67 and a measurable instant force center rearward movement 68. The instant force center upward movement 67 is measured with the vehicle at rest on level ground, against the direction of gravity 36, starting at the instant force center position uncompressed 65, and measured to an instant force center position compressed 66. The instant force center rearward movement 68 is measured with the vehicle at rest on level ground, perpendicular the direction of gravity 36, starting at the instant force center position uncompressed 65, and measured to an instant force center position compressed 66.

A vehicle using a suspension of the invention may, in certain embodiments, comprise a squat magnitude curve, a measurable suspension parameter, vehicle metrics, a frame, a moving suspension component, a pivot, a rotary motion device, a motion control device, and/or a power-train component. A squat magnitude curve, according to certain embodiments, may be comprised of a measured curve, a graph, a graphed curve, a plotted curve, a line, a curves, a value, varying values, fixed values, varying curve, amplitude, frequency, value, squat magnitude, magnitude, squat, pro squat, anti squat, zero squat, slope, slopes, varying slope, fixed slope, negative slope, first negative slope, second negative slope, third negative slope, fourth negative slope, fifth negative slope, sixth negative slope, seventh negative slope, eight negative slope, ninth negative slope, tenth negative slope, eleventh negative slope, positive slope, first positive slope, second positive slope, third positive slope, fourth positive slope, fifth positive slope, sixth positive slope, seventh positive slope, eight positive slope, ninth positive slope, tenth positive slope, eleventh positive slope, negative value, positive value, varying rise, rise, beginning rise, interim rise, ending rise, beginning slope, interim slope, first interim slope, second interim slope, third interim slope, fourth interim slope, fifth interim slope, sixth interim slope, seventh interim slope, eighth interim slope ninth interim slope, tenth interim slope, eleventh interim slope, ending slope, final slope, infinitely varying slope, constantly varying slope, controlled slope, tuned slope, tuned amplitude, tuned frequency, variable squat magnitude, variable squat curve slope, tuned squat curve slope, and/or a controlled squat curve slope.

A measurable suspension parameter and vehicle metrics, in certain embodiments, may comprise a wheelbase, track width, camber, caster, anti squat, pro squat, zero squat, squat, rake, trail, offset, fork offset, spindle offset, chainstay length, swingarm length, distance between driven wheel rotation axis and power unit output spindle axis, chain length, belt length, bottom bracket, bottom bracket offset, drive spindle, drive spindle offset, drive spindle height, wheel diameter, driven wheel diameter, driven wheel spindle height, chainstay slope, chainstay rise, center of mass, center of mass height, center of mass offset, center of mass offset from drive spindle, length, magnitude, top tube length, downtube length, front center distance, seat tube length, seatstay length, headset stack height, head tube angle, fork angle, impact angle, fork rake, crown rake, handlebar height, bar height, bar sweep, handlebar sweep, handlebar rise, bar rise, crank length, crank arm length, pitch diameter, gear pitch diameter, sprocket pitch diameter, cog pitch diameter, front gear pitch diameter, front sprocket pitch diameter, front cog pitch diameter, rear gear pitch diameter, rear sprocket pitch diameter, rear cog pitch diameter, first intermediate gear pitch diameter, second intermediate gear pitch diameter, first intermediate sprocket pitch diameter, second intermediate sprocket pitch diameter, first intermediate cog pitch diameter, second intermediate cog pitch diameter, instant center, instant force center, center of curvature, axle path, axle path center of curvature, moving center of curvature, forward moving center of curvature, forward moving instant center, rearward moving instant center, instant center movement direction change, center of curvature path, instant center path, instant center path focus, moving instant center path focus, virtual force center, virtual instant force center, virtual force center path, driving force, chain force, anti rotation force, sprocket force, bevel gear force, rotational force, driving force vector, chain pull, chain pull force, chain pull force vector, idler gear height, idler gear pitch diameter, idler cog pitch diameter, idler sprocket pitch diameter, jackshaft gear pitch diameter, jackshaft cog pitch diameter, jackshaft sprocket pitch diameter, leverage rate, leverage ratio, damper leverage rate, damper leverage ratio, spring leverage rate, spring leverage ratio, wheel motion ratio, wheel rate, spring rate, damping rate, leverage rate progression curve, leverage rate progression, progressive rate, regressive rate, straight rate, varying rate, suspension compression, full suspension compression, suspension extension, full suspension extension, droop travel, full droop travel, suspension ride height, static ride height, neighed ride height, laden ride height, weighted ride height, beginning of travel, middle of travel, end of travel, 0 percent travel to 20 percent travel, 20 percent travel to 80 percent travel, 80 percent travel to 100 percent travel, 0 percent travel to 25 percent travel, 25 percent travel to 75 percent travel, 75 percent travel to 100 percent travel, 0 percent travel to 30 percent travel, 30 percent travel to 65 percent travel, 65 percent travel to 100 percent travel, 0 percent travel to 35 percent travel, 35 percent travel to 60 percent travel, 60 percent travel to 100 percent travel, powertrain component rotation axis, driven wheel rotation axis, non driven wheel rotation axis, sprocket rotation axis, axis, axis location, rear wheel rotation axis, front wheel rotation axis, contact patch, tire contact patch, tire to ground contact patch, driven wheel tire to ground contact patch, non driven wheel tire to ground contact patch, front wheel tire to ground contact patch, rear wheel tire to ground contact patch, chain force vector, driving force vector, squat force vector, first carrier manipulation link force vector, second carrier manipulation link force vector, squat definition point, squat layout line, lower squat measurement definition line, measured squat distance, driven wheel axle path, driven wheel suspension travel distance, stable squat magnitude curve, defines a squat magnitude curve upper bound, a squat magnitude curve lower bound, instant force center, driven wheel rotation axis, chain force vector and driving force vector intersection point, driving cog rotation axis, center of the forward wheel tire to ground contact patch, center of the driven wheel tire to ground contact patch, vehicle center of sprung mass, 200 percent squat point, 200 percent measurement value, direction of gravity, squat magnitude definition point, squat magnitude, center of mass intersection vector, squat magnitude definition vector, percent squat magnitude variation, first squat magnitude curve slope, first squat magnitude curve slope, second squat magnitude curve slope, third squat magnitude curve slope, instant force center path, instant force center path focus, pitch diameter, driven idler cog rotation axis, first carrier manipulation slider force vector, second carrier manipulation slider force vector, first carrier manipulation slider force vector uncompressed, second carrier manipulation slider force vector uncompressed, first carrier manipulation slider force vector compressed, second carrier manipulation slider force vector compressed, first carrier manipulation link force vector uncompressed, second carrier manipulation link force vector uncompressed, first carrier manipulation link force vector compressed, second carrier manipulation link force vector compressed, instant force center position uncompressed, instant force center position compressed, instant force center upward movement, and/or an instant force center rearward movement.

A frame, in certain embodiments, may be comprised of a solid beam, a solid bar, a metal bar, a plastic bar, a composite bar, a tube, a metal tube, an aluminum tube, a titanium tube, a steel tube, a composite tube, a carbon tube, a boron tube, an alloy tube, a magnesium tube, a stiff tube, a flexible tube, a thin walled tube, a thick walled tube, a butted tube, a single butted tube, a double butted tube, a triple butted tube, a quadruple butted tube, a straight gage tube, a round tube, a square tube, a rectangular tube, a rounded corner tube, a shaped tube, an aero tube, a streamline tube, a plus shaped tube, a bat shaped tube, a tube that transitions from a round tube to a rectangular tube, a tube that transitions from a round tube to a square tube, a tube that transitions from a round tube to a rounded corner tube, a tube that transitions from a round tube to a shaped tube, welding, MIG welding, TIG welding, laser welding, friction welding, a welded tube, a TIG welded tube, a MIG welded tube, a laser welded tube, a friction welded tube, a monocoque section, a monocoque frame, metal monocoque, TIG welded monocoque, MIG welded monocoque, laser welded monocoque, friction welded monocoque, carbon monocoque, Kevlar monocoque, fiberglass monocoque, composite monocoque, fiberglass, carbon fiber, foam, honeycomb, stress skin, braces, extrusion, extrusions, metal inserts, rivets, screws, castings, forgings, CNC machined parts, machined parts, stamped metal parts, progressive stamped metal parts, tubes or monocoque parts welded to cast parts, tubes or monocoque parts welded to forged parts, tubes or monocoque parts welded to machined parts, tubes or monocoque parts welded to CNC machined parts, glue, adhesive, acrylic adhesive, methacrylate adhesive, bonded panels, bonded tubes, bonded monocoque, bonded forgings, bonded castings, tubes bonded to CNC machined parts, tubes bonded to machined parts, tubes bonded to castings, tubes bonded to forgings, gussets, supports, support tubes, tabs, bolts, tubes welded to tabs, monocoque welded to tabs, tubes bolted to tabs, injection molded parts, seatstays, chainstays, a seatstay, a chainstay, a seat tube, seat tower, seatpost, seat, top tube, upper tube, downtube, lower tube, top tubes, down tubes, seat tube brace, and/or a seat tube support.

A moving suspension component of a suspension system of the invention, according to certain embodiments, may be comprised of a link, a wheel carrier link, a wheel carrier, a carrier manipulation link, an upper carrier manipulation link, lower carrier manipulation link, first carrier manipulation link, second carrier manipulation link, swingarm, swingarms swinging arm, swinging arms, swing link, swing links, first link, second link, upper link, lower link, top link, bottom link, forward link, rearward link, front link, back link, primary link, secondary link, flexure, flexures, first flexure, second flexure, upper flexure, lower flexure, top flexure, bottom flexure, forward flexure, rearward flexure, front flexure, back flexure, primary flexure, secondary flexure, carrier manipulation flexures, sliders, curved sliders, straight sliders, complex curved sliders, carriers, tracks, curved tracks, straight tracks, complex curved tracks, bearings, cams, gears, seals, pivots, shock link, linkages, shock driving links, A-Arms, H-Arms, support arms, upper support, lower support, double arms, single arms, single pivot, multi pivot, SLA, Short Long Arm, hub carrier, wheel carrier, spindle, spindle carrier, wheel support, spindle support, trailing arm, semi-trailing arm, swingarm, double swingarm, parallel links, semi-parallel links, perpendicular links, strut, MacPherson strut, suspension strut, linear bearing, linear bushing, stanchion, fork, fork lower, 4-bar linkage, 5-bar linkage, 6-bar linkage, 7 bar linkage, 8 bar linkage, linkage, multi link, trackbar, panhard bar, watts link, watt link, ball joints, heim joint, radial joint, rotary joint, internal damper, external damper, enclosed damper, enclosed spring, caster block, camber block, caster wedge, driven wheel, vehicle chassis, first link fixed pivot, second link fixed pivot, first link floating pivot, second link floating pivot, driving cog, driven cog, forward wheel, driven idler cog, spring damper unit, first carrier manipulation track, second carrier manipulation track, first carrier manipulation slider, second carrier manipulation slider, first carrier manipulation slider pivot, second carrier manipulation slider pivot, stiffening link, and/or a stiffening linkage.

A pivot and a rotary motion devices of a suspension of the invention, according to certain embodiments, may be comprised of a pivot, a main pivot, a chainstay pivot, a seatstay pivot, an upper main pivot, a lower frame pivot, an upper frame pivot, a bottom frame pivot, a top frame pivot, a forward frame pivot, a rearward frame pivot, a front frame pivot, a rear frame pivot, a primary frame pivot, a secondary frame pivot, a tertiary frame pivot, a first frame pivot, a second frame pivot, a third frame pivot, a fourth frame pivot, combinations of pivots, bearing pivots, bushing pivots, bearings, bushings, seals, grease ports, greased pivots, oiled pivots, needle bearing pivots, journal bearing pivots, DU bearing pivots, plastic bushing pivots, plastic bearing pivots, aluminum pivot shafts, stainless steel pivot shafts, steel pivot shafts, titanium pivot shafts, plastic pivot shafts, composite pivot shafts, hardened bearing races, hardened pivot shafts, anodized pivot shafts, plated pivot shafts, coated pivot shafts, bearing caps, bearings seals, o-rings, o-ring seals, x-rings, and/or a x-ring seal.

A motion control device of a suspension of the invention, according to certain embodiments, may be comprised of a shock, a shock absorber, a spring damper unit, a damper, a spring, a coil spring, a leaf spring, a compression spring, an extension spring, an air spring, a nitrogen spring, a gas spring, a torsion spring, a constant force spring, a flat spring, a wire spring, a carbon spring, a negative spring, a positive spring, a progressive spring, multiple springs, stacked springs, springs in series, springs in parallel, springs separate from a damper unit, a damper unit, hydraulics, hydraulic pistons, hydraulic valves, air valves, air cans, gears, cams, a cam, a gear, non-circular gears, linear damper, rotary damper, vane damper, friction damper, poppet valve, compensation spring, negative spring, elastomer, rubber bumper, bumper, progressive bumper, hydraulic bottoming bumper, pressure compensation, heat compensation, oil, water, damping fluid, cooling fluid, shims, pressure, shaft, through shaft, eyelet, adjusters, compensator, hose, reservoir, remote reservoir, low speed adjuster, high speed adjuster, mid range adjuster, bypass circuit, foot valve, large bump adjuster, small bump adjuster, high velocity adjuster, low velocity adjuster, hydraulic ram, hydraulic piston, active suspension, and/or a microprocessor.

A powertrain component of a suspension of the invention, according to certain embodiments, may be comprised of an energy storage device, a battery, fuel, a fuel tank, a flywheel, a liquid fuel, solid fuel, rocket fuel, a reactor, steam, a nuclear reactor, a fusion reactor, pressure, air pressure, hydraulic pressure, gas pressure, expanding gas, a motor, an electric motor, a hydraulic motor, a turbine motor, a steam turbine, a gas turbine motor, an engine, a gasoline engine, a diesel engine, diesel, gasoline, alcohol, sterling engine, a two stroke engine, a four stroke engine, miller cycle engine, ramjet engine, turbine engine, rocket engine, human power, horse power, animal power, potential energy, spring, compression spring, extension spring, constant force spring, progressive spring, power transfer components, wire, rope, string, chain, belt, shaft, gear, cog, cam, sprocket, pulley, lever, clutch, one way clutch, one way bearing, bearing, ball bearing, journal bearing, bushing, drive sprocket, driven sprocket, drive cog, driven cog, drive gear, driven gear, intermediate cog, intermediate sprocket, intermediate gear, idler cog, idler sprocket, idler gear, bottom bracket, bottom bracket spindle, crank arm, foot pedal, pedal, hand crank, cassette, sprocket cluster, derailleur, front derailleur, rear derailleur, chainguide, single ring chainguide, dual ring chainguide, multi ring chainguide, shifter, shift lever, shifter cable, shifter hose, hydraulic shifting, air shifting, pneumatic shifting, gearbox, transmission, continuously variable transmission, infinitely variable transmission, direct drive, tire, wheel, track, track segment, idler wheel, jet, driving cog, driven cog, forward wheel, driven idler cog.

Mass transfer is discussed. All vehicles have mass. Mass in all vehicles with a suspension system can be divided into sprung and unsprung mass. Unsprung mass is comprised of the sum of all vehicle parts that move with a suspended wheel. Sprung mass is comprised of the sum of vehicle parts that can remain stationary as a suspended wheel is moved. The dynamic center of the sprung mass as shown in FIG. 14 is a combination of rider and/or passenger mass and the vehicle mass.

The combination of a rider's mass and the sprung mass of the bicycle are always supported fully by the combination of the vehicle's tires. Powered forward acceleration transfers mass from the vehicle's forward wheel(s) to the vehicle's driven wheel(s), braking transfers mass from the vehicle's forward wheel(s) to the vehicle's driven wheel(s). Riding on the driven wheel(s) only transfers all of the mass to the driven wheel(s), and riding on the forward wheel(s) only transfers all of the mass to the forward wheel(s).

Due to their combination of short wheelbase (WB) and high center of gravity (CG), motorcycles and bicycles experience the affects of load transfer to a much greater extent than other vehicles in existence. The ratio of the distance from the ground to the CG and the distance between the points where the wheels touch the ground (WB) illustrates this point. For example, a common bicycle will exhibit a center of gravity to wheelbase ratio of nearly 100%, motorcycles are typically near 50%, and passenger cars are typically near 25%. Mass transfer is sometimes also referred to as load transfer.

Energy loss through mass transfer is discussed. One undesirable effect of driven wheel suspension systems is the loss of energy in the way of extreme suspension compression or extension during powered acceleration. This suspension compression or extension is categorized as squat.

A suspension system's geometry and positional relationships between the vehicle drive system components can greatly affect the internal distribution of forces within the vehicle chassis. As a suspension system cycles through its suspension travel, the positional relationships between the suspension system and the vehicle drive system can change, and at the same time, the suspension geometry itself will change. These fluctuations of internal forces are what govern suspension response to powered acceleration and braking. Vehicle attitude in relation to gravity, and sprung weight center of mass change will also govern suspension response to powered acceleration and braking. These external forces are considered stationary and equal when comparing like vehicles in order to determine squat characteristics.

Squat is the result of internal chassis forces that can cause a rear suspension to extend or compress during powered acceleration. Squat is an instantaneous condition that can vary throughout the suspension travel. Squat has both a direction and magnitude. A squat response can be measured in relation to itself, and also in relation to outside conditions. Instantaneous squat response is governed by sprung mass CG placement, suspension geometry, powertrain component location, and grade in relation to gravity that the vehicle is traveling on. Sprung mass CG placement only defines the magnitude of squat present in a suspension, and does not change the squat direction conditions. The squat conditions define the direction of squat force in relation to gravity.

There are three squat conditions that must be considered.

The first condition is pro-squat, and describes the condition present when a rear suspension is forced to compress by internal suspension forces under powered acceleration. Pro-squat is assigned a negative magnitude value when determining a squat magnitude.

The second condition is anti-squat. Anti-squat describes the condition present when a rear suspension compression is counteracted by internal suspension forces under powered acceleration. Anti-squat is assigned a positive magnitude value when determining a squat magnitude.

The third condition is zero-squat. Zero-squat occurs only at the instant in between pro-squat and anti-squat, where no suspension manipulating forces are present under powered acceleration. A vehicle suspension operating at the point of zero-squat will not use acceleration forces to manipulate suspension reaction in any way, or in other words, zero-squat has a squat magnitude value of zero.

Squat force works independent of the spring force that supports a suspended vehicle. Because the squat force is independent of the vehicle spring force, when under acceleration, a vehicle suspension is acted upon by its spring and the squat force together. Suspended vehicles use springs to support the vehicle chassis and dampers to dissipate impact energy when the suspension system is compressed and extended while the vehicle travels over rough terrain. Springs can be in the form of compressive gas springs, leaf springs, or coil springs, and dampers can use fluid or friction to dissipate energy. There are also rotary damper and spring units in existence. When a vehicle is at rest, suspended wheels are compressed a certain amount so that the suspended wheel can follow irregular road surfaces with both bumps and dips. The spring that supports a wheel suspension acts as an energy storage device. Vehicle suspensions use the damper units to dissipate energy stored in a spring after the spring is compressed. The further a spring is compressed, the more energy is stored, and the more energy will be dissipated by the damper when the spring rebounds. Because spring force increases as a wheel is compressed into its suspension travel, force at the suspended wheel also increases. Partial compressive movement of a suspended driven wheel can also be referred to as suspension travel. Complete compressive movement of a suspended driven wheel can also be referred to as suspension travel. Driven wheel suspension travel distance can also be referred to as suspension travel.

Squat magnitude curve graphing is discussed. A squat magnitude curve graph is a representation of the squat characteristics of a compressible suspension under powered acceleration during suspension compression beginning at complete suspension extension and ending at complete suspension compression versus percent suspension travel. The squat magnitude curve graph is laid out so that the percentage of suspension travel is graphed on the X axis, and escalating in a positive direction. The minimum suspension travel, which is zero percent suspension compression, is shown at the far left of the x-axis, and the maximum suspension travel, which is 100 percent suspension compression, is shown at the far right of the x-axis. Percent suspension compression may be measured and graphed in minimum increments of preferably 5 percent total suspension compression. Percent squat magnitude is graphed on the y-axis with a zero-percent value graphed at the intersection of the x-axis and y-axis, and a 100 percent value graphed above the x-axis. Negative percent squat values are graphed below the x-axis. The percent squat magnitude is represented as a percentage of the squat magnitude to the squat magnitude definition. Percent squat magnitude is calculated by dividing the value of the squat magnitude by the value of the squat magnitude definition. Squat magnitude value is measured as the perpendicular distance between the lower squat measurement definition line and the squat definition point. Squat magnitude definition value is measured as the perpendicular distance between the lower squat measurement definition line and the squat magnitude definition point. Zero percent squat magnitude is always measured at the point of zero squat condition. This zero squat condition is measured when the squat definition point lies directly on the lower squat measurement definition line. At this point, the squat magnitude measurement has no value. The 100 percent squat magnitude value is defined by the location of the squat magnitude definition point, which is graphed on the squat layout line. Any magnitude measurement of a squat definition point that lies below the lower squat definition line is equal to a pro squat magnitude, and must be graphed as a negative percentage of the positive 100 percent squat magnitude value. Any magnitude measurement of a squat definition point that lies below the above the squat magnitude definition point has an anti-squat magnitude, and must be graphed as a higher percentage of the positive 100 percent squat magnitude value. Anti-squat is shown at points on the squat magnitude curve which are above the x-axis. Zero-squat is shown at points on the squat magnitude curve which terminate at zero value on the y-axis, coincident with the x-axis, and pro squat is shown at points on the squat magnitude curve which are graphed below the x-axis. When desired percent squat magnitude values are known and graphed versus their corresponding percent measured suspension compression values, the points can be connected from point to point using typical graphing method. A curve can then be fit to the point to point graph so that the curve represents a smoothed best fit version of the point to point graph. The most efficient method to obtain such a curve is to use a computer program such as Microsoft Excel, available from Microsoft Corporation, One Microsoft Way, Redmond, Wash. 98052-6399, USA. Using Microsoft Excel, a user can input the escalating suspension travel measurements beginning with the zero percent measurement and ending with the 100 percent measurement, and can input the calculated or preferred percent squat magnitude values that coincide with their percent suspension travel measurements. Microsoft Excel then can be used to create a graph of the points with a curve fit to the graphed points. This graphed curve of the percent squat magnitude versus the percent suspension compression is the discussed squat magnitude curve.

A stable squat magnitude curve of the invention defines a squat magnitude curve upper bound, and a squat magnitude curve lower bound. The squat magnitude curve upper bound lies parallel to the x-axis on the squat magnitude graph. The squat magnitude curve upper bound lies coincident to the highest y value on the squat magnitude curve. The squat magnitude curve lower bound lies parallel to the x-axis on the squat magnitude graph. The squat magnitude curve lower bound lies coincident to the lowest y value on the squat magnitude curve. By graphing the squat magnitude curve upper bound and the squat magnitude curve lower bound in relation to the squat magnitude curve, a percent squat magnitude variation value can be measured. The percent squat magnitude variation is a measurement of the amount of deviation in squat magnitude in the squat magnitude curve. Lower percent squat magnitude variation amounts will yield a more constant squat magnitude response over the range of suspension travel, and higher percent squat magnitude variation amounts will yield a less constant squat magnitude response over the range of suspension travel.

In certain embodiments, a stable squat magnitude curve of the invention has a percent squat magnitude variation value of 0 to 25 percent, or about 0 to about 25 percent; 0 to 20 percent, or about 0 to about 20 percent; of 0 to 18 percent, or about 0 to about 18 percent; of 0 to 18 percent, or about 0 to about 16.5 percent; of 0 to 16.5 percent, or about 0 to about 15 percent; of 0 to 15 percent, or about 0 to about 14 percent; of 0 to 14 percent, or about 0 to about 14 percent; of 0 to 13 percent, or about 0 to about 13 percent; of 0 to 12 percent, or about 0 to about 12 percent; of 0 to 11 percent, or about 0 to about 11 percent; of 0 to 10 percent, or about 0 to about 10 percent; of 0 to 9 percent, or about 0 to about 9 percent; of 0 to 8 percent, or about 0 to about 8 percent; of 0 to 7 percent, or about 0 to about 7 percent; of 0 to 6 percent, or about 0 to about 6 percent; of 0 to 5 percent, or about 0 to about 5 percent; of 0 to 4.5 percent, or about 0 to about 4.5 percent; of 0 to 4 percent, or about 0 to about 4 percent; of 0 to 3.5 percent, or about 0 to about 3.75 percent; of 0 to 3.5 percent, or about 0 to about 3.5 percent; of 0 to 3.25 percent, or about 0 to about 3.25 percent; of 0 to 3 percent, or about 0 to about 3 percent; of 0 to 2.75 percent, or about 0 to about 2.75 percent; of 0 to 2.5 percent, or about 0 to about 2.5 percent; of 0 to 2.25 percent, or about 0 to about 2.25 percent; of 0 to 2 percent, or about 0 to about 2 percent; of 0 to 1.75 percent, or about 0 to about 1.75 percent; of 0 to 1.5 percent, or about 0 to about 1.5 percent; of 0 to 1.25 percent, or about 0 to about 1.25 percent; of 0 to 1 percent, or about 0 to about 1 percent; of 0 to 0.75 percent, or about 0 to about 0.75 percent; of 0 to 0.5 percent, or about 0 to about 0.5 percent; of 0 to 0.25 percent, or about 0 to about 0.25 percent; of 0 to 0.15 percent, or about 0 to about 0.15 percent; of 0 to 0.10 percent, or about 0 to about 0.10 percent; of 0 to 0.10 percent, or about 0 to about 0.10 percent; of 0 to 0.05 percent, or about 0 to about 0.05 percent; of 0 to 0.025 percent, or about 0 to about 0.025 percent; of 0 to 0.010 percent, or about 0 to about 0.010 percent; of 0 to 0.005 percent, or about 0 to about 0.005 percent; of 0 to 0.001 percent, or about 0 to about 0.001 percent.

Slope of a squat magnitude curve between two points on a curve is defined by the standard coordinate geometry equation: slope=rise/run. A squat magnitude curve that has a squat magnitude at zero suspension travel, with 20 percent less squat magnitude at a point 10 percent into the wheel suspension travel compression, will have a slope of −2, because per the equation slope=rise/run, −0.2/0.1=−2. A squat magnitude curve that has a pro squat magnitude at zero suspension travel, with 20 percent greater pro squat magnitude at a point 10 percent into the wheel suspension travel compression will have a slope of −2, because per the equation slope=rise/run, −0.2/0.1=−2. A squat magnitude curve can be produced for any wheel suspension system by graphing the percent of squat magnitude at points throughout the suspension travel versus the corresponding suspension travel points in the suspension travel. It will be understood that as common graphical method dictated, a more accurate slope measurement of a path can be determined when the two points on a path defining a slope line are as close together as possible.

In certain embodiments, a suspension system according to the invention has a squat magnitude curve with a varying slope. In certain preferred embodiments, the slope of the squat magnitude curve is negative at the beginning of suspension travel and positive at a further point in the suspension travel. In certain other preferred embodiments, the slope of the squat magnitude curve is positive at the beginning of suspension travel and negative at a further point in the suspension travel. In certain other preferred embodiments, the slope of the squat magnitude curve is positive at the beginning of suspension travel, then negative at a further point in the suspension travel, then positive at a still further point in the suspension travel. In certain other preferred embodiments, the slope of the squat magnitude curve can vary between positive and negative multiple times as a driven wheel is moved through its suspension travel distance.

Percentage of suspension travel escalates in a positive amount as a driven wheel suspension is compressed. In certain embodiments, the beginning of the suspension travel is 0 to 50 percent, or about 0 to about 50 percent, of suspension travel; or 0 to 40 percent, or about 0 to about 40 percent, of suspension travel; or 0 to 30 percent, or about 0 to about 30 percent, of suspension travel; or 0 to 20 percent, or about 0 to about 20 percent, of suspension travel; or 0 to 10 percent, or about 0 to about 10 percent, of suspension travel; or 0 to 5 percent, or about 0 to about 5 percent, of suspension travel; or 0 or about 0 percent of suspension travel. In certain embodiments, the interim, or mid range, of the suspension travel is 25 to 75 percent, or about 25 to about 75 percent, of suspension travel; or 30 to 70 percent, or about 30 to about 70 percent, of suspension travel; or 35 to 65 percent, or about 35 to about 65 percent, of suspension travel; or 40 to 60 percent, or about 40 to about 60 percent, of suspension travel; or 45 to 55 percent, or about 45 to about 55 percent, of suspension travel; or 50 percent or about 50 percent, of suspension travel; or 60 to 80 percent, or about 60 to about 80 percent, of suspension travel; or 65 to 75 percent, or about 65 to about 75 percent, of suspension travel; or 70 percent or about 70 of suspension travel; or 50 to 60 percent, or about 50 to about 60 percent, of suspension travel. In certain embodiments, the end of the suspension travel is 60 to 100 percent, or about 60 to about 100 percent, of suspension travel; or 70 to 100 percent, or about 70 to about 100 percent, of suspension travel; or 75 to 100 percent, or about 75 to about 100 percent, of suspension travel; or 80 to 100 percent, or about 80 to about 100 percent, of suspension travel; or 85 to 100 percent, or about 85 to about 100 percent, of suspension travel; or 90 to 100 percent, or about 90 to about 100 percent, of suspension travel; or 95 to 100 percent, or about 95 to about 100 percent, of suspension travel; or 100 or about 100 percent of suspension travel.

In certain embodiments, a suspension system of the invention has a squat magnitude curve with a slope in the beginning of suspension travel of −0.0001 to −0.25, or about −0.0001 to about −0.25; of −0.0001 to −0.5, or about −0.0001 to about −0.5; of −0.0001 to −1, or about −0.0001 to about −1; of −0.0001 to −1.5, or about −0.0001 to about −1.5; of −0.0001 to −2, or about −0.0001 to about −2; of −0.0001 to −5, or about −0.0001 to about −5; of −0.0001 to −10, or about −0.0001 to about −10; of −0.0001 to −100, or about −0.001 to about −100; of −0.0001 to −1000, or about −0.001 to about −1000; of −0.0001 to −10000, or about −0.001 to about −10000; of −0.0001 to −100000, or about −0.001 to about −100000; of −0.2 to −5, or about −0.2 to about −5; of −0.5 to −4.5, or about −0.5 to about −4.5; of −0.75 to −4.0, or about −0.75 to about −4.0; of −1.0 to −3.5, or about −1.0 to about −3.5; of −1.5 to −3.0, or about −1.5 to about −3.0; of −2.0 to −2.5, or about −2.0 to about −2.5; of −3.0 to −3.5, or about −3.0 to about −3.5; of −3.5 to −4.0, or about −3.5 to about −4.0; of −3.5 to −4.5, or about −3.5 to about −4.5; of −4.5 to −5.5, or about −4.5 to about −5.5; of −5.0 to −6.5, or about −5.0 to about −6.5; of −6.0 to −7.5, or about −6.0 to about −7.5; of −7.0 to −8.5, or about −7.0 to about −8.5; of −8.0 to −9.5, or about −8.0 to about −9.5; of −9.0 to −12.5, or about −9.0 to about −12.5; of −10.0 to −15.5, or about −10.0 to about −15.5. In certain embodiments, a suspension system of the invention has a squat magnitude curve with a slope in the end of suspension travel of 0.0001 to 0.25, or about 0.0001 to about 0.25; of 0.0001 to 0.5, or about 0.0001 to about 0.5; of 0.0001 to 1, or about 0.0001 to about 1; of 0.0001 to 1.5, or about 0.0001 to about 1.5; of 0.0001 to 2, or about 0.0001 to about 2; of 0.0001 to 5, or about 0.0001 to about 5; of 0.0001 to 10, or about 0.0001 to about 10; of 0.0001 to 100, or about 0.001 to about 100; of 0.0001 to 1000, or about 0.001 to about 1000; of 0.0001 to 10000, or about 0.001 to about 10000; of 0.0001 to 100000, or about 0.001 to about 100000; of 0.2 to 5, or about 0.2 to about 5; of 0.5 to 4.5, or about 0.5 to about 4.5; of 0.75 to 4.0, or about 0.75 to about 4.0; of 1.0 to 3.5, or about 1.0 to about 3.5; of 1.5 to 3.0, or about 1.5 to about 3.0; of 2.0 to 2.5, or about 2.0 to about 2.5; of 3.0 to 3.5, or about 3.0 to about 3.5; of 3.5 to 4.0, or about 3.5 to about 4.0; of 3.5 to 4.5, or about 3.5 to about 4.5; of 4.5 to 5.5, or about 4.5 to about 5.5; of 5.0 to 6.5, or about 5.0 to about 6.5; of 6.0 to 7.5, or about 6.0 to about 7.5; of 7.0 to 8.5, or about 7.0 to about 8.5; of 8.0 to 9.5, or about 8.0 to about 9.5; of 9.0 to 12.5, or about 9.0 to about 12.5; of 10.0 to 15.5, or about 10.0 to about 15.5.

In certain embodiments, a suspension system of the invention has a squat magnitude curve with a slope in the beginning of suspension travel of 0.0001 to 0.25, or about 0.0001 to about 0.25; of 0.0001 to 0.5, or about 0.0001 to about 0.5; of 0.0001 to 1, or about 0.0001 to about 1; of 0.0001 to 1.5, or about 0.0001 to about 1.5; of 0.0001 to 2, or about 0.0001 to about 2; of 0.0001 to 5, or about 0.0001 to about 5; of 0.0001 to 10, or about 0.0001 to about 10; of 0.0001 to 100, or about 0.001 to about 100; of 0.0001 to 1000, or about 0.001 to about 1000; of 0.0001 to 10000, or about 0.001 to about 10000; of 0.0001 to 100000, or about 0.001 to about 100000; of 0.2 to 5, or about 0.2 to about 5; of 0.5 to 4.5, or about 0.5 to about 4.5; of 0.75 to 4.0, or about 0.75 to about 4.0; of 1.0 to 3.5, or about 1.0 to about 3.5; of 1.5 to 3.0, or about 1.5 to about 3.0; of 2.0 to 2.5, or about 2.0 to about 2.5; of 3.0 to 3.5, or about 3.0 to about 3.5; of 3.5 to 4.0, or about 3.5 to about 4.0; of 3.5 to 4.5, or about 3.5 to about 4.5; of 4.5 to 5.5, or about 4.5 to about 5.5; of 5.0 to 6.5, or about 5.0 to about 6.5; of 6.0 to 7.5, or about 6.0 to about 7.5; of 7.0 to 8.5, or about 7.0 to about 8.5; of 8.0 to 9.5, or about 8.0 to about 9.5; of 9.0 to 12.5, or about 9.0 to about 12.5; of 10.0 to 15.5, or about 10.0 to about 15.5. In certain embodiments, a suspension system of the invention has a squat magnitude curve with a slope in the end of suspension travel of −0.0001 to −0.25, or about −0.0001 to about −0.25; of −0.0001 to −0.5, or about −0.0001 to about −0.5; of −0.0001 to −1, or about −0.0001 to about −1; of −0.0001 to −1.5, or about −0.0001 to about −1.5; of −0.0001 to −2, or about −0.0001 to about −2; of −0.0001 to −5, or about −0.0001 to about −5; of −0.0001 to −10, or about −0.0001 to about −10; of −0.0001 to −100, or about −0.001 to about −100; of −0.0001 to −1000, or about −0.001 to about −1000; of −0.0001 to −10000, or about −0.001 to about −10000; of −0.0001 to −100000, or about −0.001 to about −100000; of −0.2 to −5, or about −0.2 to about −5; of −0.5 to −4.5, or about −0.5 to about −4.5; of −0.75 to −4.0, or about −0.75 to about −4.0; of −1.0 to −3.5, or about −1.0 to about −3.5; of −1.5 to −3.0, or about −1.5 to about −3.0; of −2.0 to −2.5, or about −2.0 to about −2.5; of −3.0 to −3.5, or about −3.0 to about −3.5; of −3.5 to −4.0, or about −3.5 to about −4.0; of −3.5 to −4.5, or about −3.5 to about −4.5; of −4.5 to −5.5, or about −4.5 to about −5.5; of −5.0 to −6.5, or about −5.0 to about −6.5; of −6.0 to −7.5, or about −6.0 to about −7.5; of −7.0 to −8.5, or about −7.0 to about −8.5; of −8.0 to −9.5, or about −8.0 to about −9.5; of −9.0 to −12.5, or about −9.0 to about −12.5; of −10.0 to −15.5, or about −10.0 to about −15.5.

In certain embodiments, a suspension system of the invention has a squat magnitude curve with a slope in the beginning of suspension travel of −0.0001 to −0.25, or about −0.0001 to about −0.25; of −0.0001 to −0.5, or about −0.0001 to about −0.5; of −0.0001 to −1, or about −0.0001 to about −1; of −0.0001 to −1.5, or about −0.0001 to about −1.5; of −0.0001 to −2, or about −0.0001 to about −2; of −0.0001 to −5, or about −0.0001 to about −5; of −0.0001 to −10, or about −0.0001 to about −10; of −0.0001 to −100, or about −0.001 to about −100; of −0.0001 to −1000, or about −0.001 to about −1000; of −0.0001 to −10000, or about −0.001 to about −10000; of −0.0001 to −100000, or about −0.001 to about −100000; of −0.2 to −5, or about −0.2 to about −5; of −0.5 to −4.5, or about −0.5 to about −4.5; of −0.75 to −4.0, or about −0.75 to about −4.0; of −1.0 to −3.5, or about −1.0 to about −3.5; of −1.5 to −3.0, or about −1.5 to about −3.0; of −2.0 to −2.5, or about −2.0 to about −2.5; of −3.0 to −3.5, or about −3.0 to about −3.5; of −3.5 to −4.0, or about −3.5 to about −4.0; of −3.5 to −4.5, or about −3.5 to about −4.5; of −4.5 to −5.5, or about −4.5 to about −5.5; of −5.0 to −6.5, or about −5.0 to about −6.5; of −6.0 to −7.5, or about −6.0 to about −7.5; of −7.0 to −8.5, or about −7.0 to about −8.5; of −8.0 to −9.5, or about −8.0 to about −9.5; of −9.0 to −12.5, or about −9.0 to about −12.5; of −10.0 to −15.5, or about −10.0 to about −15.5. In certain embodiments, a suspension system of the invention has a squat magnitude curve with a slope at a further point in the suspension travel of 0.0001 to 0.25, or about 0.0001 to about 0.25; of 0.0001 to 0.5, or about 0.0001 to about 0.5; of 0.0001 to 1, or about 0.0001 to about 1; of 0.0001 to 1.5, or about 0.0001 to about 1.5; of 0.0001 to 2, or about 0.0001 to about 2; of 0.0001 to 5, or about 0.0001 to about 5; of 0.0001 to 10, or about 0.0001 to about 10; of 0.0001 to 100, or about 0.001 to about 100; of 0.0001 to 1000, or about 0.001 to about 1000; of 0.0001 to 10000, or about 0.001 to about 10000; of 0.0001 to 100000, or about 0.001 to about 100000; of 0.2 to 5, or about 0.2 to about 5; of 0.5 to 4.5, or about 0.5 to about 4.5; of 0.75 to 4.0, or about 0.75 to about 4.0; of 1.0 to 3.5, or about 1.0 to about 3.5; of 1.5 to 3.0, or about 1.5 to about 3.0; of 2.0 to 2.5, or about 2.0 to about 2.5; of 3.0 to 3.5, or about 3.0 to about 3.5; of 3.5 to 4.0, or about 3.5 to about 4.0; of 3.5 to 4.5, about 3.5; of 3.5 to 4.0, or about 3.5 to about 4.0; of 3.5 to 4.5, or about 3.5 to about 4.5; of 4.5 to 5.5, or about 4.5 to about 5.5; of 5.0 to 6.5, or about 5.0 to about 6.5; of 6.0 to 7.5, or about 6.0 to about 7.5; of 7.0 to 8.5, or about 7.0 to about 8.5; of 8.0 to 9.5, or about 8.0 to about 9.5; of 9.0 to 12.5, or about 9.0 to about 12.5; of 10.0 to 15.5, or about 10.0 to about 15.5.

In certain embodiments, a suspension system of the invention has a squat magnitude curve with a slope in the beginning of suspension travel of 0.0001 to 0.25, or about 0.0001 to about 0.25; of 0.0001 to 0.5, or about 0.0001 to about 0.5; of 0.0001 to 1, or about 0.0001 to about 1; of 0.0001 to 1.5, or about 0.0001 to about 1.5; of 0.0001 to 2, or about 0.0001 to about 2; of 0.0001 to 5, or about 0.0001 to about 5; of 0.0001 to 10, or about 0.0001 to about 10; of 0.0001 to 100, or about 0.001 to about 100; of 0.0001 to 1000, or about 0.001 to about 1000; of 0.0001 to 10000, or about 0.001 to about 10000; of 0.0001 to 100000, or about 0.001 to about 100000; of 0.2 to 5, or about 0.2 to about 5; of 0.5 to 4.5, or about 0.5 to about 4.5; of 0.75 to 4.0, or about 0.75 to about 4.0; of 1.0 to 3.5, or about 1.0 to about 3.5; of 1.5 to 3.0, or about 1.5 to about 3.0; of 2.0 to 2.5, or about 2.0 to about 2.5; of 3.0 to 3.5, or about 3.0 to about 3.5; of 3.5 to 4.0, or about 3.5 to about 4.0; of 3.5 to 4.5, or about 3.5 to about 4.5; of 4.5 to 5.5, or about 4.5 to about 5.5; of 5.0 to 6.5, or about 5.0 to about 6.5; of 6.0 to 7.5, or about 6.0 to about 7.5; of 7.0 to 8.5, or about 7.0 to about 8.5; of 8.0 to 9.5, or about 8.0 to about 9.5; of 9.0 to 12.5, or about 9.0 to about 12.5; of 10.0 to 15.5, or about 10.0 to about 15.5. In certain embodiments, a suspension system of the invention has a squat magnitude curve with a slope at a further point in the suspension travel of −0.0001 to −0.25, or about −0.0001 to about −0.25; of −0.0001 to −0.5, or about −0.0001 to about −0.5; of −0.0001 to −1, or about −0.0001 to about −1; of −0.0001 to −1.5, or about −0.0001 to about −1.5; of −0.0001 to −2, or about −0.0001 to about −2; of −0.0001 to −5, or about −0.0001 to about −5; of −0.0001 to −10, or about −0.0001 to about −10; of −0.0001 to −100, or about −0.001 to about −100; of −0.0001 to −1000, or about −0.001 to about −1000; of −0.0001 to −10000, or about −0.001 to about −10000; of −0.0001 to −100000, or about −0.001 to about −100000; of −0.2 to −5, or about −0.2 to about −5; of −0.5 to −4.5, or about −0.5 to about −4.5; of −0.75 to −4.0, or about −0.75 to about −4.0; of −1.0 to −3.5, or about −1.0 to about −3.5; of −1.5 to −3.0, or about −1.5 to about −3.0; of −2.0 to −2.5, or about −2.0 to about −2.5; of −3.0 to −3.5, or about −3.0 to about −3.5; of −3.5 to −4.0, or about −3.5 to about −4.0; of −3.5 to −4.5, or about −3.5 to about −4.5; of −4.5 to −5.5, or about −4.5 to about −5.5; of −5.0 to −6.5, or about −5.0 to about −6.5; of −6.0 to −7.5, or about −6.0 to about −7.5; of −7.0 to −8.5, or about −7.0 to about −8.5; of −8.0 to −9.5, or about −8.0 to about −9.5; of −9.0 to −12.5, or about −9.0 to about −12.5; of −10.0 to −15.5, or about −10.0 to about −15.5.

In certain embodiments, a suspension system of the invention has a squat magnitude curve with a slope in the beginning of suspension travel of 0.0001 to 0.25, or about 0.0001 to about 0.25; of 0.0001 to 0.5, or about 0.0001 to about 0.5; of 0.0001 to 1, or about 0.0001 to about 1; of 0.0001 to 1.5, or about 0.0001 to about 1.5; of 0.0001 to 2, or about 0.0001 to about 2; of 0.0001 to 5, or about 0.0001 to about 5; of 0.0001 to 10, or about 0.0001 to about 10; of 0.0001 to 100, or about 0.001 to about 100; of 0.0001 to 1000, or about 0.001 to about 1000; of 0.0001 to 10000, or about 0.001 to about 10000; of 0.0001 to 100000, or about 0.001 to about 100000; of 0.2 to 5, or about 0.2 to about 5; of 0.5 to 4.5, or about 0.5 to about 4.5; of 0.75 to 4.0, or about 0.75 to about 4.0; of 1.0 to 3.5, or about 1.0 to about 3.5; of 1.5 to 3.0, or about 1.5 to about 3.0; of 2.0 to 2.5, or about 2.0 to about 2.5; of 3.0 to 3.5, or about 3.0 to about 3.5; of 3.5 to 4.0, or about 3.5 to about 4.0; of 3.5 to 4.5, or about 3.5 to about 4.5; of 4.5 to 5.5, or about 4.5 to about 5.5; of 5.0 to 6.5, or about 5.0 to about 6.5; of 6.0 to 7.5, or about 6.0 to about 7.5; of 7.0 to 8.5, or about 7.0 to about 8.5; of 8.0 to 9.5, or about 8.0 to about 9.5; of 9.0 to 12.5, or about 9.0 to about 12.5; of 10.0 to 15.5, or about 10.0 to about 15.5. In certain embodiments, a suspension system of the invention has a squat magnitude curve with a slope at a further point in the suspension travel of −0.0001 to −0.25, or about −0.0001 to about −0.25; of −0.0001 to −0.5, or about −0.0001 to about −0.5; of −0.0001 to −1, or about −0.0001 to about −1; of −0.0001 to −1.5, or about −0.0001 to about −1.5; of −0.0001 to −2, or about −0.0001 to about −2; of −0.0001 to −5, or about −0.0001 to about −5; of −0.0001 to −10, or about −0.0001 to about −10; of −0.0001 to −100, or about −0.001 to about −100; of −0.0001 to −1000, or about −0.001 to about −1000; of −0.0001 to −10000, or about −0.001 to about −10000; of −0.0001 to −100000, or about −0.001 to about −100000; of −0.2 to −5, or about −0.2 to about −5; of −0.5 to −4.5, or about −0.5 to about −4.5; of −0.75 to −4.0, or about −0.75 to about −4.0; of −1.0 to −3.5, or about −1.0 to about −3.5; of −1.5 to −3.0, or about −1.5 to about −3.0; of −2.0 to −2.5, or about −2.0 to about −2.5; of −3.0 to −3.5, or about −3.0 to about −3.5; of −3.5 to −4.0, or about −3.5 to about −4.0; of −3.5 to −4.5, or about −3.5 to about −4.5; of −4.5 to −5.5, or about −4.5 to about −5.5; of −5.0 to −6.5, or about −5.0 to about −6.5; of −6.0 to −7.5, or about −6.0 to about −7.5; of −7.0 to −8.5, or about −7.0 to about −8.5; of −8.0 to −9.5, or about −8.0 to about −9.5; of −9.0 to −12.5, or about −9.0 to about −12.5; of −10.0 to −15.5, or about −10.0 to about −15.5. In certain embodiments, a suspension system of the invention has a squat magnitude curve with a slope at a still further point in the suspension travel of 0.0001 to 0.25, or about 0.0001 to about 0.25; of 0.0001 to 0.5, or about 0.0001 to about 0.5; of 0.0001 to 1, or about 0.0001 to about 1; of 0.0001 to 1.5, or about 0.0001 to about 1.5; of 0.0001 to 2, or about 0.0001 to about 2; of 0.0001 to 5, or about 0.0001 to about 5; of 0.0001 to 10, or about 0.0001 to about 10; of 0.0001 to 100, or about 0.001 to about 100; of 0.0001 to 1000, or about 0.001 to about 1000; of 0.0001 to 10000, or about 0.001 to about 10000; of 0.0001 to 100000, or about 0.001 to about 100000; of 0.2 to 5, or about 0.2 to about 5; of 0.5 to 4.5, or about 0.5 to about 4.5; of 0.75 to 4.0, or about 0.75 to about 4.0; of 1.0 to 3.5, or about 1.0 to about 3.5; of 1.5 to 3.0, or about 1.5 to about 3.0; of 2.0 to 2.5, or about 2.0 to about 2.5; of 3.0 to 3.5, or about 3.0 to about 3.5; of 3.5 to 4.0, or about 3.5 to about 4.0; of 3.5 to 4.5, or about 3.5 to about 4.5; of 4.5 to 5.5, or about 4.5 to about 5.5; of 5.0 to 6.5, or about 5.0 to about 6.5; of 6.0 to 7.5, or about 6.0 to about 7.5; of 7.0 to 8.5, or about 7.0 to about 8.5; of 8.0 to 9.5, or about 8.0 to about 9.5; of 9.0 to 12.5, or about 9.0 to about 12.5; of 10.0 to 15.5, or about 10.0 to about 15.5.

Graphical kinematical squat magnitude curves are discussed. Graphical methods can be used to determine suspension kinematical layout used to attain a desired squat magnitude curve for a suspension. For shaft driven, chain driven, and spindle driven vehicles, graphical layout is identical until factoring in the unique features of each powertrain. Any suspended wheel in a vehicle has an axle path that a wheel follows when a suspension is moved through suspension travel. The curvature of this axle path and its layout in relation to specific powertrain components define a squat magnitude curve. A squat magnitude curve is a measurement of the changing magnitude and direction of squat in relation to external elements, such as vehicle attitude in relation to gravity, that define total squat magnitude. For analysis purposes, it is understood that these external elements are well defined, and during analysis remain constant to attain results that can be used to directly compare various systems. With external elements defined and unchanging, squat is developed under powered acceleration, and through changes in internal geometry of the vehicle center of mass location, vehicle suspension, and powertrain, as a suspension system is cycled through suspension travel from its beginning uncompressed point to its ending fully compressed point. Every instantaneous point in a suspension travel has a corresponding instantaneous squat point with a squat magnitude value present. These instantaneous squat points can be measured or graphed as a point on the squat layout line at a perpendicular distance from the lower squat layout line. Squat magnitude value is measured as the perpendicular distance between the lower squat measurement definition line and the squat definition point. Squat magnitude definition value is measured as the perpendicular distance between the lower squat measurement definition line and the squat magnitude definition point. When the desired instantaneous amounts of squat at instantaneous points in the suspension travel are known, squat definition points can be graphed kinematically in conjunction with each other, beginning when a suspension is in its uncompressed state and ending in its fully compressed state, and in relation to the vehicle geometry to obtain a suspension kinematical layout which will attain the desired squat magnitude curve. The squat magnitude curve beginning value is defined by the squat magnitude measured where the suspension system is in its completely uncompressed state. As the suspension is cycled further through suspension travel towards complete compression pausing at a minimum of 5 percent total suspension travel increments, further squat definition values are measured and recorded. At the same intervals, the squat magnitude definition values are recorded. The squat magnitude values are divided by the squat magnitude definition values to attain the percent squat values. The percent squat values are graphed versus their correlating escalating percent total suspension travel increments. Suspension travel displacement is measured in a direction parallel to and against gravity and parallel to the instantaneous squat point measurements when the vehicle is on level ground with the suspension fully extended. This measurement direction is always measured first with the vehicle on level ground with the suspension fully extended, and remains constant to the vehicle chassis when measuring suspension travel under circumstances where the vehicle is not placed on level ground or when suspension is compressed. Critical and known preexisting defining points such as vehicle wheelbase, powertrain location, and center of mass are graphed alongside the squat definition points to obtain a clear picture of vehicle squat performance. Vehicle graphs for obtaining and defining squat performance are always laid out with the vehicle viewed in the side elevational view.

A squat layout line is drawn parallel to and against gravitational force through center of the forward wheel contact patch between the tire and the ground and terminating at further points. A squat definition point, which can be calculated directly from the aforementioned squat magnitude curve or graphed kinematically as described previously will be graphed on this squat layout line. A squat lower measurement definition line is drawn from the center of the driven wheel tire to ground contact patch perpendicular to and terminating on the squat layout line. Squat definition points are drawn on the squat definition line in relation to one another, and in relation to the squat lower measurement definition line. A squat definition point drawn above the squat lower measurement definition line will correlate with an anti squat magnitude. A squat definition point drawn coincident with the squat lower measurement definition line will correlate with a zero squat magnitude. A squat definition point drawn below the squat lower measurement definition line will correlate with a pro squat magnitude. A squat force vector is drawn from the center of the driven wheel tire to ground contact patch to the squat definition point on the squat layout line. As the suspension is moved through instantaneous measured points through suspension travel, the squat force vector is drawn with a beginning point at the center of the rear tire to ground contact patch, and an ending point at its corresponding measured instantaneous squat definition point graphed on the squat layout line. A squat magnitude definition point will be graphed on this squat layout line. A squat lower measurement definition line is drawn from the center of the driven wheel tire to ground contact patch perpendicular to and terminating on the squat layout line. The known vehicle center of sprung mass is graphed in relation to the vehicle. A center of mass intersection vector is drawn from the center of the driven wheel tire to ground contact patch, through the center of mass, and terminating on the squat layout line. The point at which the center of mass intersection vector meets the squat layout line is defined as the 200 percent squat point. The distance between the squat 200 percent squat point and the squat lower measurement definition line is referred to as the 200 percent measurement value. A point halfway between the 200 percent squat point and the squat lower measurement definition line is defined as the squat magnitude definition point. By dividing the 200 percent measurement value by two, the squat magnitude definition value can be obtained. The distance between the squat magnitude definition point and the squat lower measurement definition line is referred to as the squat measurement definition value.

Diversion in graphical method to obtain specific suspension system kinematical layouts from a desired squat magnitude curve must occur when factoring in specifics for different types of power transfer systems such as shaft drive, spindle drive, or chain drive.

A shaft drive system generally uses a power transmission system that can transmit power via rotary motion from a power unit output shaft to a wheel shaft. The two shafts are generally fixed at close to a perpendicular angle in one plane. Power transmission systems can vary from gears to cogs to friction wheels and other types of systems, all herein referred to universally as cogs. These shaft drive systems feature a driving cog which is rotatably attached to the power unit output, a first intermediate cog, which transfers rotational motion from the driving cog to a relatively perpendicular shaft, a second intermediate cog, which transfers rotational motion from the shaft to a driven cog which is rotatably attached to the rotation axis of a wheel.

Shaft drive vehicle powertrains and suspensions typically take one of two forms. These are, a single pivot system, or a multi link system. A simple single pivot system features a driven cog that is fixed to and housed within a wheel carrier link which pivots around a single pivot. In this arrangement, there is only one pivot connecting the wheel carrier link to the vehicle frame structure. The rotating drive torque is acted against by the driven cog housing, which is part of the wheel carrier link. Action against the drive torque in the wheel carrier link causes a torque about the single frame pivot. The addition of this torque plus the driving force imparted through the wheel tire combination to the ground through a tire to ground contact patch totals a squat response. An instantaneous pivot location for a single pivot shaft drive system can be found at any point on a drawn squat force vector that correlates with the desired instantaneous squat response. These single pivot systems are incapable of producing a stable squat magnitude curve.

A multi pivot linkage can be used to alter squat characteristics and obtain a variable squat magnitude curve in a shaft driven wheel suspension system. A multi link shaft drive suspension system isolates the torque passed through the driven cog in the system from the swinging link system. In a 4-bar variation, the driven cog is attached to a wheel carrier link, which pivots at one end of a first swinging link. The first carrier manipulation link is pivotally attached to the vehicle chassis at the end opposite of the wheel carrier link pivot. A torque reaction, like the one discussed in the single pivot shaft drive system works to rotate the wheel carrier link against the first carrier manipulation link. A second carrier manipulation link is also attached to the wheel carrier link. This second carrier manipulation link is attached to the vehicle chassis at a different location from the first swinging carrier manipulation link. The second carrier manipulation link works to inhibit free rotation of the wheel carrier link against the first carrier manipulation link. To find instantaneous carrier manipulation link pivot points which will give a desired instantaneous squat magnitude, its correlating desired squat force vector must be graphed. The two wheel carrier link pivots are next defined. Carrier manipulation link force lines are drawn so that a force line passes directly through the center of the rearward pivots which are coincident with the pivots on the wheel carrier link. The carrier manipulation link force lines are drawn so that they intersect on the desired squat force vector. The first and second vehicle chassis pivots can be positioned upon the corresponding first and second carrier manipulation link force lines to attain the desired instantaneous squat response. Graphing the carrier manipulation link force lines and desired squat force vectors together overlaid at multiple points in the suspension travel will allow the designer to choose pivot point locations and kinematical suspension layout that can attain a desired variable squat magnitude curve.

A spindle driven system generally uses a power transmission system that can transmit power via rotary motion from a power unit output shaft to a wheel shaft spindle. This type of system is useful for multi wheeled vehicles using independently suspended or partially independently suspended driven wheels. The power unit output shaft and wheel shaft spindle are generally fixed at close to a parallel angle in one plane. The power unit output shaft is fixed to the suspended frame member and is rotatably coupled to the wheel shaft spindle so that both the using a constant velocity or universal type joint and wheel shaft spindle rotate in the same direction. Power transmission between the power unit output shaft and wheel shaft spindle for spindle driven suspension systems could incorporate an intermediate shaft that is connected to the power unit output shaft using a constant velocity or universal type joint and to the wheel shaft spindle using a constant velocity or universal type joint. The intermediate shaft and associated constant velocity or universal type joints transfer rotational motion to the wheel shaft spindle which is attached to the driven wheel so that the driven wheel rotates about the driven wheel rotation axis.

Spindle driven vehicle independent and semi independent suspensions typically take one of several forms. These are; a single pivot trailing arm system, a single pivot semi trailing arm system, swing axle system, an A-Arm or H-Arm system, a MacPherson strut system, or a long arm 4-bar semi-parallel link system.

A simple single pivot trailing arm or single pivot semi trailing arm system features a wheel shaft spindle that is rotatably attached to a wheel carrier link which pivots around a single pivot. In this arrangement, there is only one pivot connecting the wheel carrier link to the vehicle frame structure. The wheel carrier link is arranged so that the frame pivot axis project towards the right and left side of the vehicle. In the single pivot trailing arm system, this frame pivot is wide enough to support side loads under vehicle cornering, and the axis about which the wheel carrier link pivots is parallel with the wheel shaft spindle. In the single pivot semi trailing arm system, this frame pivot is wide enough to support side loads under vehicle cornering, and the axis about which the wheel carrier link pivots is parallel with the wheel shaft spindle. The wheel carrier link is arranged so that the frame pivot axis project diagonally towards the right and left side and front and back of the vehicle. As the driven wheel is accelerated, the driving force imparted through the wheel tire combination to the ground through a tire to ground contact patch is transferred through the driven wheel structure, into the wheel shaft spindle. This driving force is transmitted to the wheel carrier link through the rotatable connection between the wheel shaft spindle, and wheel carrier link. The driving force, acting through the wheel carrier link on the single frame pivot totals a squat response. An instantaneous pivot location for a single pivot spindle drive system can be found at any point on a drawn squat force vector that correlates with the desired instantaneous squat response. These single pivot systems are incapable of producing a stable squat magnitude curve.

A swing axle system features a wheel shaft spindle that is rotatably attached to a wheel carrier link which pivots around a single pivot. In this arrangement, there is only one pivot connecting the wheel carrier link to the vehicle frame structure. The wheel carrier link is arranged so that the frame pivot axis project towards the front and back of the vehicle. In the swing axle system, this frame pivot is wide enough to support side loads under vehicle cornering, and the axis about which the wheel carrier link pivots is perpendicular to the wheel shaft spindle. As the driven wheel is accelerated, the driving force imparted through the wheel tire combination to the ground through a tire to ground contact patch is transferred through the driven wheel structure, into the wheel shaft spindle. This driving force is transmitted to the wheel carrier link through the rotatable connection between the wheel shaft spindle, and wheel carrier link. The driving force, acting through the wheel carrier link on the single frame pivot totals a squat response. An instantaneous pivot location for a single pivot spindle drive system can be found at any point on a drawn squat force vector that correlates with the desired instantaneous squat response. These single pivot systems are incapable of producing a stable squat magnitude curve.

An A-Arm or H-Arm system features a wheel shaft spindle that is rotatably attached to a wheel carrier link which is pivotally attached to a frame structure through upper and lower carrier manipulation links. The wheel carrier link and upper and lower carrier manipulation links are arranged so that the link pivot axis project towards the front and back of the vehicle, perpendicular to the wheel shaft spindle. In the A-Arm or H-Arm system, these frame pivots are spaced to support side loads under vehicle cornering. The A-Arm and H-Arm systems dynamically can accomplish nearly identical results, with the variation being that an A-Arm system uses an additional support arm to control wheel turning for steering purposes, and an H-Arm uses an additional pivot on one arm to control wheel turning for steering purposes. As the driven wheel is accelerated, the driving force imparted through the wheel tire combination to the ground through a tire to ground contact patch is transferred through the driven wheel structure, into the wheel shaft spindle. This driving force is transmitted to the wheel carrier link through the rotatable connection between the wheel shaft spindle, and wheel carrier link. The driving force, acting through the wheel carrier link on the upper and lower carrier manipulation links and frame pivots totals a squat response. These A-Arm and H-Arm systems are incapable of producing a stable squat magnitude curve.

A MacPherson Strut system features a wheel shaft spindle that is rotatably attached to a wheel carrier link which is attached to a frame structure through a carrier manipulation link and an axial sliding shaft. The carrier manipulation link and axial sliding shaft are arranged so that the link pivot axis project towards the front and back of the vehicle, perpendicular to the wheel shaft spindle. In the MacPherson Strut system, these frame pivots are spaced to support side loads under vehicle cornering. The MacPherson system uses an additional support arm to control the wheel turning for steering purposes. As the driven wheel is accelerated, the driving force imparted through the wheel tire combination to the ground through a tire to ground contact patch is transferred through the driven wheel structure, into the wheel shaft spindle. This driving force is transmitted to the wheel carrier link through the rotatable connection between the wheel shaft spindle, and wheel carrier link. The driving force, acting through carrier manipulation link and axial sliding shaft and frame pivots totals a squat response. These MacPherson Strut systems are incapable of producing a stable squat magnitude curve.

A long arm 4-bar semi-parallel link system features a wheel shaft spindle that is rotatably attached to a wheel carrier link. The wheel carrier link is supported by two semi parallel upper and lower carrier manipulation links, which each pivot around a fixed frame pivot. In this arrangement, there are a minimum of four pivots connecting the wheel carrier link to the vehicle frame structure. The wheel carrier link and carrier manipulation links are arranged so that the frame pivot axis project towards the right and left sides of the vehicle. In the long arm 4-bar semi-parallel link system the axes about which the wheel carrier link pivots are parallel with the wheel shaft spindle. The long arm 4-bar semi parallel system can dynamically perform identically to a single pivot trailing arm system, but can be useful to overcome some space constraints of the single pivot trailing arm system. As the driven wheel is accelerated, the driving force imparted through the wheel tire combination to the ground through a tire to ground contact patch is transferred through the driven wheel structure, into the wheel shaft spindle. This driving force is transmitted to the wheel carrier link through the rotatable connection between the wheel shaft spindle, and wheel carrier link. The driving force, acting through the wheel carrier link on the upper and lower carrier manipulation links and frame pivots totals a squat response. These long arm 4-bar semi-parallel link systems are incapable of producing a stable squat magnitude curve. To find an instantaneous squat magnitude, its correlating desired squat force vector must be graphed. The two wheel carrier link pivots are defined. Carrier manipulation link force lines are drawn so that a force line passes directly through the center of the two pivot axis of each carrier manipulation link. These two force lines are projected to an intersection point which is called the instant force center. In a long arm 4-bar semi-parallel link system, this instant force center moves downward as the driven wheel suspension is compressed.

A tuned multi pivot linkage can be used to alter squat characteristics and obtain a variable squat magnitude curve in a spindle driven wheel suspension system. A multi link spindle driven suspension system isolates driving force transmitted to the wheel carrier link through the rotatable connection between the wheel shaft spindle and wheel carrier link. In a 4-bar variation, the driven wheel spindle center defines a driven wheel rotation axis, and is attached to a wheel carrier link, which pivots at one end of a first swinging link. The first carrier manipulation link is pivotally attached to the vehicle chassis at the end opposite of the wheel carrier link pivot. A second carrier manipulation link is also attached to the wheel carrier link. This second carrier manipulation link is attached to the vehicle chassis at a different location from the first swinging carrier manipulation link. As the driven wheel is accelerated, the driving force imparted through the wheel tire combination to the ground through a tire to ground contact patch is transferred through the driven wheel structure, into the wheel shaft spindle. This driving force is transmitted to the wheel carrier link through the rotatable connection between the wheel shaft spindle, and wheel carrier link. The driving force, acting through the wheel carrier link on the first and second carrier manipulation links and frame pivots totals a squat response. To find instantaneous carrier manipulation link pivot points which will give a desired instantaneous squat magnitude, its correlating desired squat force vector must be graphed. The two wheel carrier link pivots are defined. Carrier manipulation link force lines are drawn so that a force line passes directly through the center of the rearward pivots which are coincident with the pivots on the wheel carrier link. The carrier manipulation link force lines are drawn so that they intersect on the desired squat force vector. The first and second vehicle chassis pivots can be positioned upon the corresponding first and second carrier manipulation link force lines to attain the desired instantaneous squat response. Graphing the carrier manipulation link force lines and desired squat force vectors together overlaid at multiple points in the suspension travel will allow the designer to choose pivot point locations and kinematical suspension layout that can attain a desired variable squat magnitude curve. To find an instantaneous squat magnitude, its correlating desired squat force vector must be graphed. The two wheel carrier link pivots are defined. Carrier manipulation link force lines are drawn so that a force line passes directly through the center of the two pivot axis of a first carrier manipulation link and second carrier manipulation link. These two force lines are projected to an intersection point which is called the instant force center. In a tuned multi pivot linkage system of the invention, this instant force center moves upwards in relation to gravity or in a direction horizontally closer to the driven wheel rotation axis, or upwards in relation to gravity and in a direction horizontally closer to the driven wheel rotation axis as the driven wheel suspension is compressed.

A chain driven powertrain system uses a chain or belt to transmit power between two reasonably parallel shafts. Chain driven systems are very common in motorcycle, ATV, and bicycle applications because of their light weight, robustness, and simplicity in both manufacturing and use. Simple chain driven systems feature a driving cog and a driven cog, with the driving cog attached to a power source, and a driven cog rotatably attached to the rotation axis of a wheel. A driven chain is used to transmit power from the driving cog to the driven cog. When transmitting power between from the driving cog to the driven cog, the chain forms a relatively straight line between the pitch diameters of the driving and driven cogs. The driven wheel or wheels is/are attached to a swinging link or linkage system via a bearing or bushing system, which allows rotational motion of the driven wheel or wheels in relation to the swinging link or linkage system. More complex chain driven systems feature a driving cog and a driven cog, with the driving cog attached to a power source, and a driven cog rotatably attached to the rotation axis of a wheel. A driven chain is used to transmit power from the driving cog to the driven cog. When transmitting power between from the driving cog to the driven cog, the chain forms a relatively straight line between the pitch diameters of the driving and driven cogs. A driven idler cog is placed at a position intermediate of the driving cog and driven cog. This driven idler cog alters the path of the chain and is used for analysis purposes. The driven wheel or wheels is/are attached to a swinging link or linkage system via a bearing or bushing system, which allows rotational motion of the driven wheel or wheels in relation to the swinging link or linkage system.

Chain driven suspensions typically take one of several forms. These include single pivot systems, multi link systems, cam/track type systems, and flexure type systems. The suspensions can also feature variable chainline type designs, which manipulate a chain force vector line through the use of a pulley system that moves with the suspension. A single pivot system uses a single pivoting suspension link to transmit force between a suspended wheel and a chassis. A multi link system uses an arrangement of pivoting suspension links to transmit force between a suspended wheel and a chassis. A cam/track type system that uses sliding elements but does not use links to attain force transfer from a wheel axle to a chassis is also possible but uncommon in practice. Flexure type systems use flexing elements to transmit power from a suspended wheel to a chassis structure. In all types of the chain driven wheel suspension system mentioned above, the driving force can be represented as a vector drawn perpendicular to the driven wheel axle path. In a chain driven suspension, driving force is always the major force component when compared to chain pull.

There are two internal forces present within a chain driven vehicle chassis that together create a squat response. These two forces are driving force, and chain pull force.

When a chain driven vehicle is accelerated, force is transferred from a power source to a driving cog. This driving cog transmits its force through a chain to a driven cog. The force direction and magnitude present in the tensioned chain are referred to as chain pull force. Fixed chainline type designs are present where at any instantaneous point, a single driving cog is fixed rotationally on a chassis structure, and a driven cog is attached to a suspension member, and force is transmitted from the driving cog to the driven cog through a chain. In this fixed chainline type design, the chainline force vector is always located at one end by the tensioned chainline tangent point where the chain is fixed in relation to the vehicle chassis structure, and by the tensioned chainline tangent point of the moving pulley at the opposite end.

In variable chainline type designs, which manipulate a chain force vector line through the use of a pulley system that moves with the suspension, the chainline force vector can be analyzed at one end by the tensioned chainline tangent point where the chain is fixed in relation to the vehicle chassis structure, and by the tensioned chainline tangent point of the moving pulley at the opposite end. Sliding elements can also be substituted for pulleys in this application.

In variable chainline type designs, which manipulate a chain force vector line through the use of a pulley system that is fixed to the vehicle chassis, the chainline force vector can be analyzed as located at one end by the tensioned chainline tangent point where the chain is fixed in relation to the driven cog at the wheel, and by the tensioned chainline tangent point of the idler pulley fixed at the chassis at the opposite end. Sliding elements can also be substituted for pulleys in this application.

In the chain driven powertrain, the driven cog is rotatably attached to a wheel/tire combination. The wheel pushes against the ground resulting in friction. As the wheel rotates a driving force transmitted from the contact patch through the wheel structure and a force is imparted at the rear hub axle. This pushing force can be transferred to the chassis via a wheel suspension system, ultimately pushes the vehicle forward. This pushing force is referred to as driving force. The driving force direction is measured and represented graphically as a driving force vector drawn from the driven wheel rotation axis, perpendicular to the driven axle path, where the axle path is defined as a line that a suspended wheel rotational axis travels as a suspension is moved through suspension travel. This axle path can be a constant curvature or changing curvature line depending on suspension layout.

A simple single pivot system features a driven cog that is rotatably attached to a wheel, which is rotatably attached to a wheel carrier link which pivots around a singular pivot. In this arrangement, the suspended wheel travels in a constant radius arc. To find the instantaneous swinging link pivot point for a single pivot chain driven system, which will give a desired instantaneous squat magnitude, its correlating desired squat force vector must be graphed. Because there is only one link in the single pivot suspension, the swinging link pivot will lie coincident with the driving force line. Desired vehicle geometry is graphed in a side view. This vehicle geometry will include the size, location, and center points of vehicle tires, powertrain component layout, and the direction of gravitational force. A squat layout line is graphed first. A desired squat force vector is drawn from the center of a rear wheel contact patch to the desired squat layout point on a squat layout line as described previously. Next, the chain force vector is graphed in relation to the powertrain components as described previously. The chain force vector is drawn so that it intersects the squat force vector. Finally, the driving force vector is drawn from the center of the rear wheel axis to the intersection point of the squat force vector and chain pull force vector. The pivot point for the single pivot swinging link suspension arm will lie at any point along the driving force vector to achieve the desired instantaneous squat magnitude. Graphing the chain pull force vector, and squat force vectors together overlaid at multiple points in the suspension travel will allow the designer to find driving force vectors at multiple points through the suspension travel. The crossing point of the overlaid driving force vectors for different points in the suspension travel define the single pivot point location and kinematical suspension layout that can attain the desired squat magnitude curve.

Multi link systems, cam/track (sliding link) type systems, and flexure type systems feature a driven cog that is rotatably attached to a wheel, which is rotatably attached to a wheel carrier link which moves the wheel along an axle path that is defined by a multi element system. To aid the analysis of multi-element systems, it is simplest to define or measure an axle path which will guide a wheel, and then define the elements that will give the desired axle path later, as opposed to trying to define elements first and measure axle path as a byproduct later to attain a desired result. Multi element systems do not have a single hardware defined pivot point like a single fixed pivot system does. The multi element systems use combinations of links or cams to project a virtual or instantaneous pivot point. This pivot point can always be found at a point along a driving force vector, which is drawn perpendicular to a driven wheel axle path as previously described.

To find an axle path which will give a desired instantaneous squat magnitude, its correlating desired squat force vectors must be graphed. Desired vehicle geometry is graphed in a side view. This vehicle geometry will include the size, location, and center points of vehicle tires, vehicle ground plane, powertrain component layout, and the direction of gravitational force. A vehicle wheel suspension system always has a minimum suspension travel point, where the suspended wheel is at its zero compressed suspension travel point, and a maximum suspension travel point, where the suspended wheel is at its 100 percent compressed suspension travel point. Several overlaid graphs must be made to obtain a squat magnitude curve. The minimum increment in suspension compression displacement that can be used to graph an accurate squat magnitude curve from the graphical method using squat force vectors as presented has been found to be 5 percent of total suspension compression displacement between graphed squat force vectors. A squat layout line is graphed first. A desired squat force vector is drawn from the center of a driven wheel contact patch to the desired squat layout point on a squat layout line as described previously. Next, the chain force vector is graphed in relation to the powertrain components as described previously. The chain force vector is drawn so that it intersects the squat force vector. Finally, the driving force vector is drawn from the center of the driven wheel axis to the intersection point of the squat force vector and chain pull force vector. The instantaneous pivot point for the single pivot swinging link suspension arm will lie at any point along the driving force vector to achieve the desired instantaneous squat magnitude. Graphing the chain pull force vector, and squat force vectors together overlaid at multiple points in the suspension travel will allow the designer to find driving force vectors at multiple points through the suspension travel. The crossing point of the overlaid driving force vectors for different points in the suspension travel define the instantaneous pivot point movement through the suspension travel, and kinematical suspension layout that can attain the desired squat magnitude curve. For multi element systems, there are several methods that can define element layout based on a desired axle path, for example, by using kinematical analysis computer software. Software that can perform this specific function is marketed under the names SyMech, which is available from SyMech Inc, 600 Townsend Street, San Francisco, Calif., 94107, USA, and SAM, which is available from ARTAS—Engineering Software, Het Puyven 162, NL-5672 RJ Nuenen, The Netherlands. This software allows a user to define an axle path, and set parameters such as mechanical element type, number of mechanical elements, and desired location of anchor components. The software will then suggest multiple link layout choices that will meet all of the set forth parameters. Graphical analysis can also be performed by hand. In a hand graphical analysis, the mechanical components of a multi element system are measured at multiple points through the suspension travel. At each point in the suspension travel, the instant force center of the link system is graphed. A common 4-bar linkage suspension system features a driven cog that is rotatably attached to a driven wheel, which is rotatably attached to a wheel carrier link which is pivotably attached to two separate carrier manipulation links. The swinging links are pivotably attached to a vehicle chassis at their other ends. The instant force center in a 4 bar pivoting linkage system such as shown in FIG. 1a, is found by projecting individual link force lines through both pivots of each of the two carrier manipulation links that support the wheel carrier link. The two carrier manipulation link force lines are projected so that they intersect each other. This intersection point is commonly known at the instant force center. A driving force line can be drawn directly from the rotation axis of the driven wheel to this instant force center. As the carrier manipulation links rotate on their pivots, the instant force center position changes in relation to the driven wheel rotation axis and the vehicle chassis. This causes the driving force line to move in relation to the chain force line. Because the squat force line is defined in part by the location of the driven wheel contact patch, and the intersection between the driving force vector and the chain force vector, a change in squat vector direction can occur. The perpendicular distance from the lower squat definition line to the point at which this squat direction vector intersects the drawn squat layout line to is measured and recorded.

Four bar sliding link suspension systems are analyzed identically to 4 bar pivoting systems, but the identification of the instant force center is performed in a slightly different manner due to the constraints of the sliding link system. Four bar sliding link systems feature a driven cog that is rotatably attached to a driven wheel, which is rotatably attached to a wheel carrier link which is pivotably attached to two separate sliding carrier manipulation sliding blocks. The individual carrier manipulation sliding blocks move on individual sliding rails. The instant force center in a 4 bar sliding linkage system is found by projecting individual sliding link force lines centered at the pivots of each of the two carrier manipulation sliding block that support the wheel carrier link. The carrier manipulation sliding block force lines are projected perpendicular to the sliding rail so that the two carrier manipulation sliding black force lines intersect each other. This intersection can be referred to as the instant force center. A driving force line can be drawn directly from the rotation axis of the driven wheel to this instant force center. As the carrier manipulation sliding blocks slide on their respective sliding rails, the instant force center position changes in relation to the driven wheel rotation axis and the vehicle chassis. This causes the driving force line to move in relation to the chain force line. Because the squat force line is defined in part by the location of the driven wheel contact patch, and the intersection between the driving force vector and the chain force vector, a change in squat vector direction can occur. The perpendicular distance from the lower squat definition line to the point at which this squat direction vector intersects the drawn squat layout line to is measured and recorded.

Measurement of multi element systems to determine axle path can be done graphically, or by using measurement equipment. Using measurement equipment, the vehicle can be rigidly mounted and oriented so that the suspended wheel can be moved freely through measured points in its suspension travel while the chassis stays stationary. In a side view orientation, the horizontal and vertical distance from the suspended wheel rotation axis to a fixed point on the vehicle frame at multiple points in the suspension travel is taken. As the suspension is cycled through suspension travel, the corresponding measurements of horizontal and vertical distance form a wheel rotation axis travel path in relation to the vehicle chassis. This path is referred to as the axle path.

Common graphical kinematical method requires that the display of a driving cog 27 as its driving cog pitch diameter 47 for the accurate calculation of force lines.

Analysis has shown that most vehicles accelerate during a finite percentage of their driven wheel travel distance. For the majority of vehicles analyzed, the majority of acceleration occurs within a range of 25 percent of the total driven wheel travel distance.

Analysis has shown that a vehicle with a compressible suspension system using a chain driven suspended wheel achieves the squat magnitude curve 17 of the current invention and as shown in FIG. 9 and FIG. 10, by having a layout that features a driven cog that is rotatably attached to a driven wheel, which is rotatably attached to a wheel carrier link which is pivotably attached to separate upper and second carrier manipulation links. The upper and second carrier manipulation links are pivotably attached to a vehicle chassis at their other ends. The upper and second carrier manipulation links rotate in the same rotational direction about their respective fixed axis at the vehicle chassis as shown in FIGS. 1a, 1b, 1c, and 1d. The first carrier manipulation link is arranged in relation to the second carrier manipulation link so that the instant force center 24 projected by the two carrier manipulation links, follows an instant force center path 45 as the suspension is moved through its driven wheel suspension travel distance 15. The location of this instant force center path 45 in relation to the driving cog pitch diameter 47 is important in creating a stable squat magnitude curve 17. The instant force center path 45 has a defined instant force center path focus 46 which is the geometrically graphed as the intersection point of two lines which lie coincident to two points on the same path, and perpendicular to said path. Greater graphing accuracy of the instant force center path focus 46 location can be achieved when the two said points on the said path are closer together. Because the majority of acceleration for the majority of vehicles analyzed happens within 25 percent of the driven wheel suspension travel distance, the instant force center path focus 46 of the invention will lie within the driving cog pitch diameter 47 during at least 25 percent of the driven wheel suspension travel distance.

Analysis has shown that a vehicle with a compressible suspension system using a chain driven suspended wheel achieves the squat magnitude curve 17 of the current invention and as shown in FIG. 11 and FIG. 12, by having a layout that features a driven cog that is rotatably attached to a driven wheel, which is rotatably attached to a wheel carrier link which is pivotably attached to separate upper and second carrier manipulation links. The upper and second carrier manipulation links are pivotably attached to a vehicle chassis at their other ends. The upper and second carrier manipulation links rotate in opposite directions about their respective fixed axis at the vehicle chassis as shown in FIGS. 4a and 4b. The first carrier manipulation link is arranged in relation to the second carrier manipulation link so that the instant force center 24 projected by the two carrier manipulation links, follows an instant force center path 45 as the suspension is moved through its driven wheel suspension travel distance 15. The location of this instant force center path 45 in relation to the driving cog pitch diameter 47 is important in creating a stable squat magnitude curve 17. The instant force center path 45 has a defined instant force center path focus 46 which is the geometrically graphed as the intersection point of two lines which lie coincident to two points on the same path, and perpendicular to said path. Greater graphing accuracy of the instant force center path focus 46 location can be achieved when the two said points on the said path are closer together. Because the majority of acceleration for the majority of vehicles analyzed happens within 25 percent of the driven wheel suspension travel distance, the instant force center path focus 46 of the invention will lie within a driving cog pitch diameter 47 during at least 25 percent of the driven wheel suspension travel distance.

Kinematical analysis shows that a shaft driven wheel suspension of the invention can be attained by arranging suspension components in a method that will project an instant force center 24 that moves in an upward direction, or in a direction horizontally closer to the driven wheel rotation axis, or in an upward in relation to gravity and in a direction horizontally closer to the driven wheel rotation axis as the driven wheel moves compressively through its driven wheel suspension travel distance. Movement of an instant force center 24 in an upward direction in relation to gravity or in a direction horizontally closer to the driven wheel rotation axis, or in an upward in relation to gravity and in a direction horizontally closer to the driven wheel rotation axis as the driven wheel moves compressively through its driven wheel suspension travel distance can attain a stable squat magnitude of the invention because a driven wheel moves compressively through its driven wheel suspension travel distance in an or partially in an upward direction against gravity.

Kinematical analysis shows that a spindle driven wheel suspension of the invention can be attained by arranging suspension components in a method that will project an instant force center 24 that moves in an upward direction, or in a direction horizontally closer to the driven wheel rotation axis, or in an upward in relation to gravity and in a direction horizontally closer to the driven wheel rotation axis as the driven wheel moves compressively through its driven wheel suspension travel distance. Movement of an instant force center 24 in an upward direction in relation to gravity or in a direction horizontally closer to the driven wheel rotation axis, or in an upward in relation to gravity and in a direction horizontally closer to the driven wheel rotation axis as the driven wheel moves compressively through its driven wheel suspension travel distance can attain a stable squat magnitude of the invention because a driven wheel moves compressively through its driven wheel suspension travel distance in an or partially in an upward direction against gravity.

Analysis has shown that a vehicle with a compressible suspension system using a shaft driven suspended wheel achieves the squat magnitude curve 17 of the current invention and as shown in FIGS. 5, 6, 7, and 8, by having a layout that features a driven cog that is rotatably attached to a driven wheel, which is rotatably attached to a wheel carrier link which is pivotably attached to separate upper and second carrier manipulation links. The upper and second carrier manipulation links are pivotably attached to a vehicle chassis at their other ends. The upper and second carrier manipulation links rotate in a contra rotational direction about their fixed axes at the vehicle chassis as shown in FIGS. 2a, 2b, 2c, and 2d. The first carrier manipulation link is arranged in relation to the second carrier manipulation link so that the instant force center 24 projected by the two carrier manipulation links, moves in an upward direction in relation to gravity, or in a direction horizontally closer to the driven wheel rotation axis, or upward in relation to gravity and in a direction horizontally closer to the driven wheel rotation axis as the driven wheel moves compressively through its driven wheel suspension travel distance. This upward, or rearward, or upward and rearward movement of the instant force center 24 as the suspension rear wheel rotation axis moves compressively through its driven wheel suspension travel distance 15 along its axle path 14 achieves the squat magnitude curve 17 of the current invention.

Analysis has shown that a vehicle with a compressible suspension system using a shaft driven suspended wheel achieves the squat magnitude curve 17 of the current invention and as shown in FIGS. 5, 6, 7, and 8, by having a layout that features a driven cog that is rotatably attached to a driven wheel, which is rotatably attached to a wheel carrier link which is pivotably attached to separate upper and second carrier manipulation links. The upper and second carrier manipulation links are pivotably attached to a vehicle chassis at their other ends. The upper and second carrier manipulation links rotate in the same rotational direction about their fixed axes at the vehicle chassis as shown in FIGS. 5a and 5b. The first carrier manipulation link is arranged in relation to the second carrier manipulation link so that the instant force center 24 projected by the two carrier manipulation links, moves in an upward direction in relation to gravity, or in a direction horizontally closer to the driven wheel rotation axis, or upward in relation to gravity and in a direction horizontally closer to the driven wheel rotation axis as the driven wheel moves compressively through its driven wheel suspension travel distance. This upward, or rearward, or upward and rearward movement of the instant force center 24 as the suspension rear wheel rotation axis moves compressively through its driven wheel suspension travel distance 15 along its axle path 14 achieves the squat magnitude curve 17 of the current invention.

Analysis has shown that a vehicle with a compressible suspension system using a spindle driven suspended wheel achieves the squat magnitude curve 17 of the current invention and as shown in FIGS. 5, 6, 7, and 8, by having a layout that features a driven cog that is rotatably attached to a driven wheel, which is rotatably attached to a wheel carrier link which is pivotably attached to separate upper and second carrier manipulation links. The upper and second carrier manipulation links are pivotably attached to a vehicle chassis at their other ends. The upper and second carrier manipulation links rotate in a contra rotational direction about their fixed axes at the vehicle chassis as shown in FIGS. 2a, 2b, 2c, and 2d. The first carrier manipulation link is arranged in relation to the second carrier manipulation link so that the instant force center 24 projected by the two carrier manipulation links, moves in an upward direction in relation to gravity, or in a direction horizontally closer to the driven wheel rotation axis, or upward in relation to gravity and in a direction horizontally closer to the driven wheel rotation axis as the driven wheel moves compressively through its driven wheel suspension travel distance. This upward, or rearward, or upward and rearward movement of the instant force center 24 as the suspension rear wheel rotation axis moves compressively through its driven wheel suspension travel distance 15 along its axle path 14 achieves the squat magnitude curve 17 of the current invention.

Analysis has shown that a vehicle with a compressible suspension system using a spindle driven suspended wheel achieves the squat magnitude curve 17 of the current invention and as shown in FIGS. 5, 6, 7, and 8, by having a layout that features a driven cog that is rotatably attached to a driven wheel, which is rotatably attached to a wheel carrier link which is pivotably attached to separate upper and second carrier manipulation links. The upper and second carrier manipulation links are pivotably attached to a vehicle chassis at their other ends. The upper and second carrier manipulation links rotate in the same rotational direction about their fixed axes at the vehicle chassis as shown in FIGS. 5a and 5b. The first carrier manipulation link is arranged in relation to the second carrier manipulation link so that the instant force center 24 projected by the two carrier manipulation links, moves in an upward direction in relation to gravity, or in a direction horizontally closer to the driven wheel rotation axis, or upward in relation to gravity and in a direction horizontally closer to the driven wheel rotation axis as the driven wheel moves compressively through its driven wheel suspension travel distance. This upward, or rearward, or upward and rearward movement of the instant force center 24 as the suspension rear wheel rotation axis moves compressively through its driven wheel suspension travel distance 15 along its axle path 14 achieves the squat magnitude curve 17 of the current invention.

Analysis has shown that a squat magnitude curve 17 as shown in FIGS. 5, 6, 7, and 8 can be produced by the shaft driven vehicle suspension layouts shown in FIGS. 2a, 2b, 2c, 2d, 3a, 3b, 3c, 3d, 5a, 5b 6a, and 6b.

Analysis has shown that a squat magnitude curve 17 as shown in FIGS. 9 and 10 can be produced by the chain driven vehicle suspension layout shown in FIGS. 1a, 1b, 1c, and 1d.

Analysis has shown that a squat magnitude curve 17 as shown in FIGS. 11 and 12 can be produced by the chain driven vehicle suspension layout shown in FIGS. 4a and 4b.

Analysis has shown that a squat magnitude curve 17 as shown in FIGS. 11 and 12 can be produced by the chain driven vehicle suspension layout shown in FIG. 38.

The present invention is not to be limited in scope by the specific embodiments described herein, which are intended as single illustrations of individual aspects of the invention, and functionally equivalent methods and components are within the scope of the invention. Indeed, various modifications of the invention, in addition to those shown and described herein, will become apparent to those skilled in the art from the foregoing description. Such modifications are intended to fall within the scope of the appended claims. All cited publications, patents, and patent applications are herein incorporated by reference in their entirety.

What is claimed is:

1. A vehicle suspension system for a driven wheel suspension comprising a driven wheel, a wheel carrier link, a wheel carrier manipulation link, a second carrier manipulation link, a first link fixed pivot, a second link fixed pivot, a first link floating pivot, a second link floating pivot, and a damper unit, wherein said suspension system projects an instant force center, wherein the suspension system achieves a stable squat magnitude curve with a percent squat magnitude variation value from about 0 to about 25 percent as said suspension is compressed from a point of 0 percent suspension compression to 100 percent suspension compression and wherein the length of said wheel carrier manipulation link and said second carrier manipulation link are selected to result in said percent squat magnitude variation value from about 0 to about 25 percent.

2. The vehicle suspension system of claim 1, said suspension comprising a shaft driven wheel suspension, wherein said suspension system projects an instant force center which moves in a direction horizontally closer to the rotation axis of the driven wheel as the vehicle suspension is compressed.

3. The vehicle suspension system of claim 1, said suspension comprising a shaft driven wheel suspension, wherein said suspension system projects an instant force center which moves in an upward direction in relation to gravity as the vehicle suspension is compressed.

4. The vehicle suspension system of claim 1, said suspension comprising a shaft driven wheel suspension, wherein said suspension system projects an instant force center which moves in an upward direction in relation to gravity and in a direction horizontally closer to the rotation axis of the driven wheel as the vehicle suspension is compressed.

5. The vehicle suspension system of claim 1, said suspension comprising a spindle driven wheel suspension, wherein said suspension system projects an instant force center which moves in an upward direction in relation to gravity and in a direction horizontally closer to the rotation axis of the driven wheel at all points from 0 percent to 100 percent suspension compression as the vehicle suspension is compressed.

6. The vehicle suspension system of claim 1, said suspension comprising a chain driven rear wheel suspension, with a driving cog, where said driving cog has a pitch diameter, wherein said suspension system projects an instant force center which moves in an upwards direction as the vehicle suspension is compressed and said instant force center follows an instant force center path, and said instant force center path describes an instant force center path focus, and said instant force center path focus lies within the area described by the driving cog pitch diameter at a point or points during the suspension compression.

7. The suspension system of claim 1, wherein the suspension system achieves a stable squat magnitude curve with a percent squat magnitude variation value from about 0 to about 15 percent.

8. The suspension system of claim 1, wherein the suspension system achieves a stable squat magnitude curve with a percent squat magnitude variation value from about 0 to about 10 percent.

9. The suspension system of claim 1, wherein the suspension system achieves a stable squat magnitude curve with a percent squat magnitude variation value from about 0 to about 5 percent.

10. The suspension system of claim 1, wherein the suspension system achieves a stable squat magnitude curve with a percent squat magnitude variation value from about 0 to about 1 percent.

11. The suspension system of claim 1, wherein the suspension system achieves a stable squat magnitude curve with a slope from about −0.0001 to about −10 in the beginning of suspension travel, wherein said beginning is from about 0 to about 30 percent of suspension travel.

12. The suspension system of claim 1, wherein the suspension system achieves a stable squat magnitude curve with a slope from about 0.0001 to about 10 in the end of suspension travel, wherein said end is from about 70 to about 100 percent of suspension travel.

13. The suspension system of claim 1, wherein the suspension system achieves a stable squat magnitude curve with a slope from about 0.0001 to about 10 in the beginning of suspension travel, wherein said beginning is from about 0 to about 30 percent of suspension travel.

14. The suspension system of claim 1, wherein the suspension system achieves a stable squat magnitude curve with a slope from about −0.0001 to about −10 in the end of suspension travel, wherein said end is from about 70 to about 100 percent of suspension travel.

15. The suspension system of claim 1, wherein the suspension system achieves a stable squat magnitude curve with a slope from about −0.0001 to about −10 in the beginning of suspension travel, wherein said beginning is from about 0 to about 30 percent of suspension travel, and where said slope is from about −0.0001 to about −10 at a further point in suspension travel.

16. The suspension system of claim 1, wherein the suspension system achieves a stable squat magnitude curve with a slope from about −0.0001 to about −10 in the beginning of suspension travel, wherein said beginning is from about 0 to about 30 percent of suspension travel, and where said slope is from about 0.0001 to about 10 at a further point in suspension travel.

17. The suspension system of claim 1, wherein the suspension system achieves a stable squat magnitude curve with a slope from about 0.0001 to about 10 in the beginning of suspension travel, wherein said beginning is from about 0 to about 30 percent of suspension travel, and where said slope is from about 0.0001 to about 10 at a further point in suspension travel.

* * * * *